(12) United States Patent
Menaker et al.

(10) Patent No.: US 12,008,839 B2
(45) Date of Patent: Jun. 11, 2024

(54) GOLF CLUB AND OTHER OBJECT FITTING USING QUANTITATIVE BIOMECHANICAL-BASED ANALYSIS

(71) Applicant: Sportsbox.ai Inc., Bellevue, WA (US)

(72) Inventors: Samuel Menaker, Bellevue, WA (US); Jeehae Lee, San Francisco, CA (US); Michael Rye Kennewick, Sr., Bellevue, WA (US)

(73) Assignee: Sportsbox.ai Inc., Bellevue, WA (US)

( * ) Notice: Subject to any disclaimer, the term of this patent is extended or adjusted under 35 U.S.C. 154(b) by 0 days.

(21) Appl. No.: 18/516,185

(22) Filed: Nov. 21, 2023

(65) Prior Publication Data

US 2024/0087367 A1   Mar. 14, 2024

Related U.S. Application Data

(63) Continuation-in-part of application No. 18/189,857, filed on Mar. 24, 2023, which is a continuation of
(Continued)

(51) Int. Cl.
*G06V 40/20* (2022.01)
*A63B 24/00* (2006.01)
(Continued)

(52) U.S. Cl.
CPC .......... *G06V 40/23* (2022.01); *A63B 24/0006* (2013.01); *A63B 24/0062* (2013.01);
(Continued)

(58) Field of Classification Search
CPC ............ A63B 24/0006; A63B 24/0062; A63B 24/0087; A63B 69/36; A63B 69/3605;
(Continued)

(56) References Cited

U.S. PATENT DOCUMENTS

| 4,375,887 A * | 3/1983 | Lynch ................ A63B 24/0003 473/409 |
| 5,148,477 A | 9/1992 | Neely |

(Continued)

FOREIGN PATENT DOCUMENTS

| CN | 104298353 | 1/2015 |
| EP | 2843621 | 3/2015 |

OTHER PUBLICATIONS

"Xsens Extends Industrial Motion Tracking Products with New Rugged Modules for harsh Environments", retrieved from the Internet at <URL: https://www.xsens.com/press-releases/xsens-extends-industrial-motion-tracking-products-with-new-rugged-modules-for-harsh-environments>, May 20, 2021 (Year: 2021), retrieved from the Internet on Nov. 8, 2022, 3 pages.

(Continued)

*Primary Examiner* — Joshua Lee
(74) *Attorney, Agent, or Firm* — Sheppard Mullin Richter & Hampton LLP

(57) ABSTRACT

Systems and methods are disclosed for generating a 3D avatar and object fitting recommendations using a biomechanical analysis of observed actions with a focus on representing actions through computer-generated 3D avatars. Physical quantities of biomechanical actions can be measured from the observations, and the system can analyze these values, compare them to target or optimal values, and use the observations and known biomechanical capabilities to initiate a payment transaction for an object offered by a merchant that corresponds with the recommendation.

19 Claims, 35 Drawing Sheets

Related U.S. Application Data application No. 17/721,318, filed on Apr. 14, 2022, now Pat. No. 11,620,858.

(60) Provisional application No. 63/194,308, filed on May 28, 2021.

(51) Int. Cl.
  *A63B 69/36* (2006.01)
  *A63B 71/06* (2006.01)
  *G06T 13/40* (2011.01)
  *G06V 10/34* (2022.01)

(52) U.S. Cl.
  CPC ...... *A63B 24/0087* (2013.01); *A63B 69/3605* (2020.08); *A63B 71/0622* (2013.01); *G06T 13/40* (2013.01); *G06V 10/34* (2022.01); *A63B 2024/0009* (2013.01); *A63B 2024/0015* (2013.01); *A63B 2024/0096* (2013.01); *A63B 69/36* (2013.01); *A63B 2071/063* (2013.01); *A63B 2071/0636* (2013.01); *A63B 2071/0647* (2013.01); *A63B 2220/05* (2013.01); *A63B 2220/806* (2013.01)

(58) Field of Classification Search
  CPC ........ A63B 71/0622; A63B 2024/0009; A63B 2024/0015; A63B 2024/0096; A63B 2071/063; A63B 2071/0636; A63B 2071/0647; A63B 2220/05; A63B 2220/806; G06T 13/40; G06V 10/34; G06V 40/23
  See application file for complete search history.

(56) References Cited

U.S. PATENT DOCUMENTS

| | | | |
|---|---|---|---|
| 5,249,967 A | 10/1993 | O'Leary | |
| 5,623,428 A | 4/1997 | Kunii | |
| 5,772,522 A * | 6/1998 | Nesbit | A63B 69/36 473/409 |
| D400,196 S | 10/1998 | Cameron, Sr. | |
| 6,083,123 A * | 7/2000 | Wood | A63B 69/3605 473/409 |
| D467,251 S | 12/2002 | Platz | |
| D467,253 S | 12/2002 | Platz | |
| 7,041,014 B2 * | 5/2006 | Wright | A63B 69/3632 702/182 |
| 7,200,266 B2 | 4/2007 | Ozer | |
| 7,317,836 B2 | 1/2008 | Fujimura | |
| 7,847,808 B2 | 12/2010 | Cheng | |
| 7,887,440 B2 * | 2/2011 | Wright | A63B 69/3632 473/223 |
| 7,967,695 B2 * | 6/2011 | Voges | A63B 24/0021 473/223 |
| 8,189,866 B1 | 5/2012 | Gu | |
| 8,506,425 B2 * | 8/2013 | Wright | A63B 60/42 473/223 |
| RE44,862 E * | 4/2014 | Wright | A63B 69/3632 473/223 |
| 8,696,497 B2 * | 4/2014 | Voges | A63B 69/3623 473/223 |
| 8,950,236 B2 * | 2/2015 | Ishii | G01B 5/0023 73/12.02 |
| 8,979,665 B1 | 3/2015 | Najafi | |
| 9,161,708 B2 | 10/2015 | Elliott | |
| 9,211,439 B1 | 12/2015 | Pedenko | |
| 9,248,361 B1 * | 2/2016 | Jones | G06Q 10/0639 |
| D752,646 S | 3/2016 | Miles | |
| 9,311,789 B1 | 4/2016 | Gwin | |
| 9,358,456 B1 | 6/2016 | Challinor | |
| 9,480,883 B2 * | 11/2016 | Ishii | A63B 37/0003 |
| 9,589,207 B2 | 3/2017 | Holohan | |
| 9,600,717 B1 | 3/2017 | Dai | |
| D785,656 S | 5/2017 | Bramer | |
| 9,656,121 B2 | 5/2017 | Rose | |
| 9,830,951 B2 * | 11/2017 | Bose | G01P 13/00 |
| D807,400 S | 1/2018 | Lagreca | |
| D807,918 S | 1/2018 | Cohen | |
| 9,878,206 B2 | 1/2018 | Rowe | |
| 9,898,675 B2 | 2/2018 | Yee | |
| 9,978,425 B2 | 5/2018 | Kirk | |
| 10,008,126 B1 | 6/2018 | Linderman | |
| 10,010,753 B2 | 7/2018 | Brothers | |
| 10,076,698 B2 | 9/2018 | Spivak | |
| 10,080,941 B2 * | 9/2018 | Brekke | G01S 19/19 |
| D835,145 S | 12/2018 | Cashner | |
| D836,123 S | 12/2018 | Pillalamarri | |
| 10,186,041 B2 | 1/2019 | Chang | |
| 10,188,324 B2 | 1/2019 | Matsunaga | |
| 10,213,645 B1 | 2/2019 | Wu | |
| 10,271,773 B2 | 4/2019 | Chang | |
| 10,339,978 B2 * | 7/2019 | Bose | G06V 20/42 |
| 10,410,359 B2 | 9/2019 | Marks | |
| 10,478,689 B2 * | 11/2019 | Brekke | A63B 71/0622 |
| 10,748,581 B2 * | 8/2020 | Bose | G06V 40/23 |
| 10,755,466 B2 | 8/2020 | Chamdani | |
| 10,799,781 B1 | 10/2020 | Means | |
| 10,828,549 B2 * | 11/2020 | Li | G06V 20/40 |
| 10,885,691 B1 | 1/2021 | Parker | |
| D917,564 S | 4/2021 | Indorf | |
| D918,932 S | 5/2021 | Gkanatsios | |
| D922,423 S | 6/2021 | Frueh | |
| D922,424 S | 6/2021 | Frueh | |
| 11,040,260 B1 | 6/2021 | Isgar | |
| D928,189 S | 8/2021 | Giannino | |
| D936,678 S | 11/2021 | Frueh | |
| 11,276,196 B2 | 3/2022 | Bickerstaff | |
| D953,348 S | 5/2022 | Barnes | |
| 11,348,255 B2 | 5/2022 | Tamir | |
| D954,108 S | 6/2022 | Kawano | |
| 11,355,160 B2 * | 6/2022 | Bose | G06T 7/20 |
| 11,373,354 B2 | 6/2022 | Tamir | |
| 11,426,099 B2 * | 8/2022 | Barr | G06V 20/20 |
| 11,450,053 B1 | 9/2022 | Georgis | |
| D975,721 S | 1/2023 | Arima | |
| D982,032 S | 3/2023 | Putnam | |
| 11,645,873 B1 | 5/2023 | Lui | |
| 11,716,629 B2 | 8/2023 | Devine | |
| D999,244 S | 9/2023 | Indorf | |
| D999,245 S | 9/2023 | Indorf | |
| 2001/0029207 A1 | 10/2001 | Cameron | |
| 2002/0001449 A1 | 1/2002 | Sato | |
| 2002/0114493 A1 | 8/2002 | McNitt | |
| 2003/0008731 A1 * | 1/2003 | Anderson | A63B 60/42 473/407 |
| 2003/0054327 A1 | 3/2003 | Evensen | |
| 2004/0131254 A1 | 7/2004 | Liang | |
| 2004/0162154 A1 | 8/2004 | DeJohn | |
| 2005/0261073 A1 | 11/2005 | Farrington, Jr. | |
| 2006/0059426 A1 | 3/2006 | Ogikubo | |
| 2007/0135225 A1 | 6/2007 | Nieminen | |
| 2008/0144964 A1 | 6/2008 | Soinio | |
| 2008/0318682 A1 | 12/2008 | Rofougaran | |
| 2009/0002316 A1 | 1/2009 | Rofougaran | |
| 2009/0094555 A1 | 4/2009 | Viitala | |
| 2009/0111602 A1 | 4/2009 | Savarese | |
| 2010/0081116 A1 | 4/2010 | Barasch | |
| 2010/0121227 A1 * | 5/2010 | Stirling | A63B 24/0006 600/595 |
| 2010/0302257 A1 | 12/2010 | Perez | |
| 2010/0303303 A1 | 12/2010 | Shen | |
| 2011/0054870 A1 | 3/2011 | Dariush | |
| 2011/0182469 A1 | 7/2011 | Ji | |
| 2011/0276153 A1 | 11/2011 | Selner | |
| 2011/0306398 A1 | 12/2011 | Boch | |
| 2012/0052971 A1 | 3/2012 | Bentley | |
| 2012/0070070 A1 | 3/2012 | Litvak | |
| 2012/0116548 A1 | 5/2012 | Goree | |
| 2012/0149483 A1 | 6/2012 | Donahue | |
| 2012/0236027 A1 | 9/2012 | Ogata | |
| 2013/0089845 A1 | 4/2013 | Hutchison | |

(56) References Cited

U.S. PATENT DOCUMENTS

| | | | |
|---|---|---|---|
| 2014/0079290 A1 | 3/2014 | Nakano | |
| 2014/0143183 A1 | 5/2014 | Sigal | |
| 2014/0193132 A1 | 7/2014 | Lee | |
| 2014/0200094 A1 | 7/2014 | Parke | |
| 2014/0257538 A1 | 9/2014 | Rose | |
| 2014/0337177 A1 | 11/2014 | Pitts | |
| 2015/0363644 A1 | 12/2015 | Wnuk | |
| 2016/0049089 A1 | 2/2016 | Witt | |
| 2016/0059103 A1 | 3/2016 | Han | |
| 2016/0148054 A1 | 5/2016 | Han | |
| 2016/0246370 A1 | 8/2016 | Osman | |
| 2016/0256740 A1 | 9/2016 | Rowe | |
| 2016/0370854 A1 | 12/2016 | Steele | |
| 2017/0001072 A1* | 1/2017 | Brekke | G16H 20/30 |
| 2017/0043228 A1 | 2/2017 | Hunter | |
| 2017/0228587 A1 | 8/2017 | Zhang | |
| 2017/0274256 A1* | 9/2017 | Brekke | A63B 60/42 |
| 2017/0316578 A1 | 11/2017 | Fua | |
| 2017/0354859 A1 | 12/2017 | Okazaki | |
| 2017/0365085 A1 | 12/2017 | Moll | |
| 2018/0050255 A1 | 2/2018 | Maani | |
| 2018/0216155 A1 | 8/2018 | Son | |
| 2018/0256962 A1 | 9/2018 | Kudirka | |
| 2018/0357472 A1 | 12/2018 | Dreessen | |
| 2018/0360383 A1 | 12/2018 | Ishikura | |
| 2018/0369678 A1 | 12/2018 | Yang | |
| 2019/0043240 A1 | 2/2019 | Finegold | |
| 2019/0046836 A1 | 2/2019 | Starkey | |
| 2019/0114690 A1 | 4/2019 | Paquette | |
| 2019/0130602 A1 | 5/2019 | Hall | |
| 2019/0224528 A1* | 7/2019 | Omid-Zohoor | A61B 5/6806 |
| 2019/0347826 A1 | 11/2019 | Zhang | |
| 2019/0362506 A1 | 11/2019 | Leroyer | |
| 2020/0005544 A1 | 1/2020 | Kim | |
| 2020/0005670 A1 | 1/2020 | Iwao | |
| 2020/0047029 A1 | 2/2020 | Bentley | |
| 2020/0058137 A1 | 2/2020 | Pujades | |
| 2020/0222757 A1 | 7/2020 | Yang | |
| 2020/0273229 A1* | 8/2020 | Thielen | G06T 19/006 |
| 2020/0312037 A1 | 10/2020 | Kopeinigg | |
| 2020/0396411 A1 | 12/2020 | Hattori | |
| 2020/0398110 A1 | 12/2020 | Kosowsky | |
| 2021/0004981 A1 | 1/2021 | Song | |
| 2021/0089761 A1 | 3/2021 | Tyomkin | |
| 2021/0097768 A1 | 4/2021 | Malia | |
| 2021/0117661 A1 | 4/2021 | Iqbal | |
| 2021/0255826 A1 | 8/2021 | Lynne | |
| 2021/0311546 A1 | 10/2021 | Kodama | |
| 2021/0385417 A1 | 12/2021 | Park | |
| 2022/0023730 A1* | 1/2022 | Howenstein | A63B 69/3685 |
| 2022/0036052 A1* | 2/2022 | Prince | G06T 7/246 |
| 2022/0111275 A1 | 4/2022 | Bryson | |
| 2022/0241642 A1* | 8/2022 | Halevy | A61B 5/744 |
| 2022/0245836 A1* | 8/2022 | Halevy | G06T 19/006 |
| 2022/0266091 A1* | 8/2022 | Yuen | G16H 20/30 |
| 2023/0017367 A1 | 1/2023 | May | |

OTHER PUBLICATIONS

Barcenas, Tere, "Rare Golf Mobile App MVP design", Tere Barcenas—UX Designer, published Feb. 2021, Retrieved from the Internet Oct. 31, 2023 at <URL: https://www.terebarcenas.com/projects/rare-golf> (Year: 2021), 5 pages.

Ke, Shian-Ru, et al., "A Review on Video-Based Human Activity Recognition", Computers, vol. 2, doi: 10.3390/computers2020088, 2013, pp. 88-131.

Kennedy, Jamie, "SkyPro Swing Analyser Review", Golfalot, published Sep. 4, 2013, Retrieved from the Internet Oct. 31, 2023, at <URL: https://www.golfalot.com/equipment-reviews/skypro-swing-analyser-review-2555.aspx> (Year: 2013), 2 pages.

Lemire, Joe, "Track160's New App Lets Players Share Video and Advanced Analysis, Creating New Fan Engagement Opportunities", SportTechie | Sports Business Journal, Jul. 27, 2022, 5 pages.

Wei et al., "Intuitive Interactive Human-Character Posing with Millions of Example Poses", IEEE Computer Society, Jul./Aug. 2011 (Year: 2011), pp. 78-88.

* cited by examiner

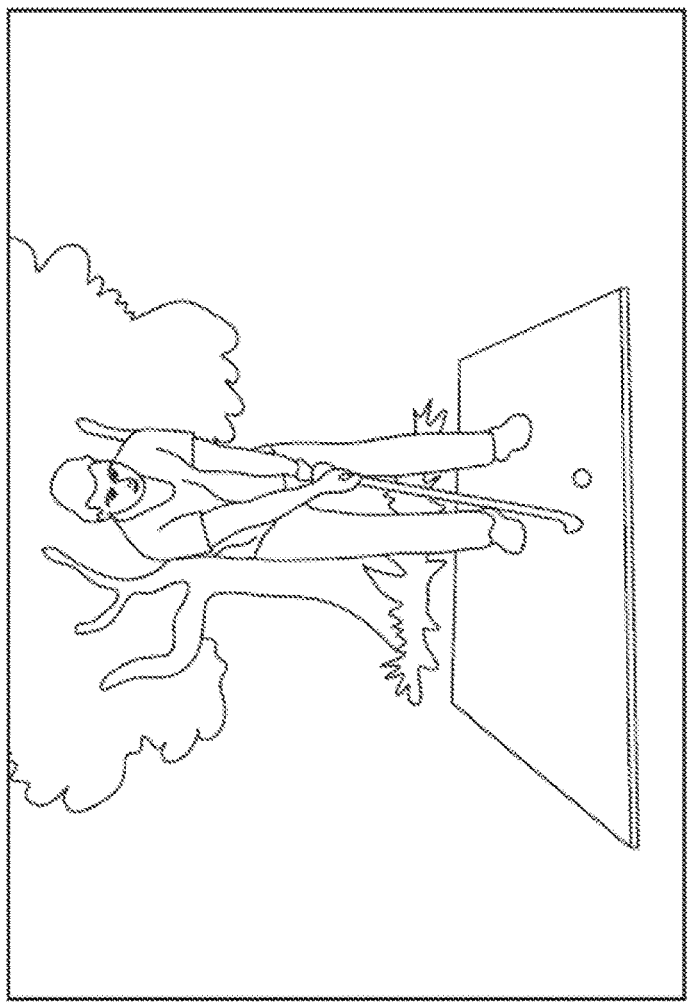
FIG. 5

| | Name | Type | Required | Descriptions |
|---|---|---|---|---|
| 1 | uid | String | | Autogenerated ID from firebase |
| 2 | userId | String | Yes | Reference to user into associate user details |
| 3 | score | String | | What is your target score you want to achieve |
| 4 | date | Date | Yes | Date when you inserted your tracker into watchlist. |
| 5 | POV | String | Yes | Avatar position |
| 6 | zoom | Int | | Zoom Level |
| 7 | trackers | String | Yes | Lists of tracker for watchlist item. (Valid Json String) |

FIG. 12

| | Name | Type | Required | Descriptions |
|---|---|---|---|---|
| 1 | uid | String | | Autogenerated ID from firebase |
| 2 | name | String | Yes | Tracker name |
| 3 | category | Constant | Yes | Category name (constant) for tracker |
| 4 | descriptions | String | Yes | short description to define tracker |
| 5 | trackerType | String | Yes | Static or Dynamic ways of tracking. |
| 6 | measureUnit | String | Yes | What format do you measure each trackers. Like: degrees, inches, … |

FIG. 13

| name | type | required |
|---|---|---|
| uid | String | Yes |
| watchlistId | | |
| trackerId | | |
| min | | |
| max | | |
| position | | |

FIG. 14

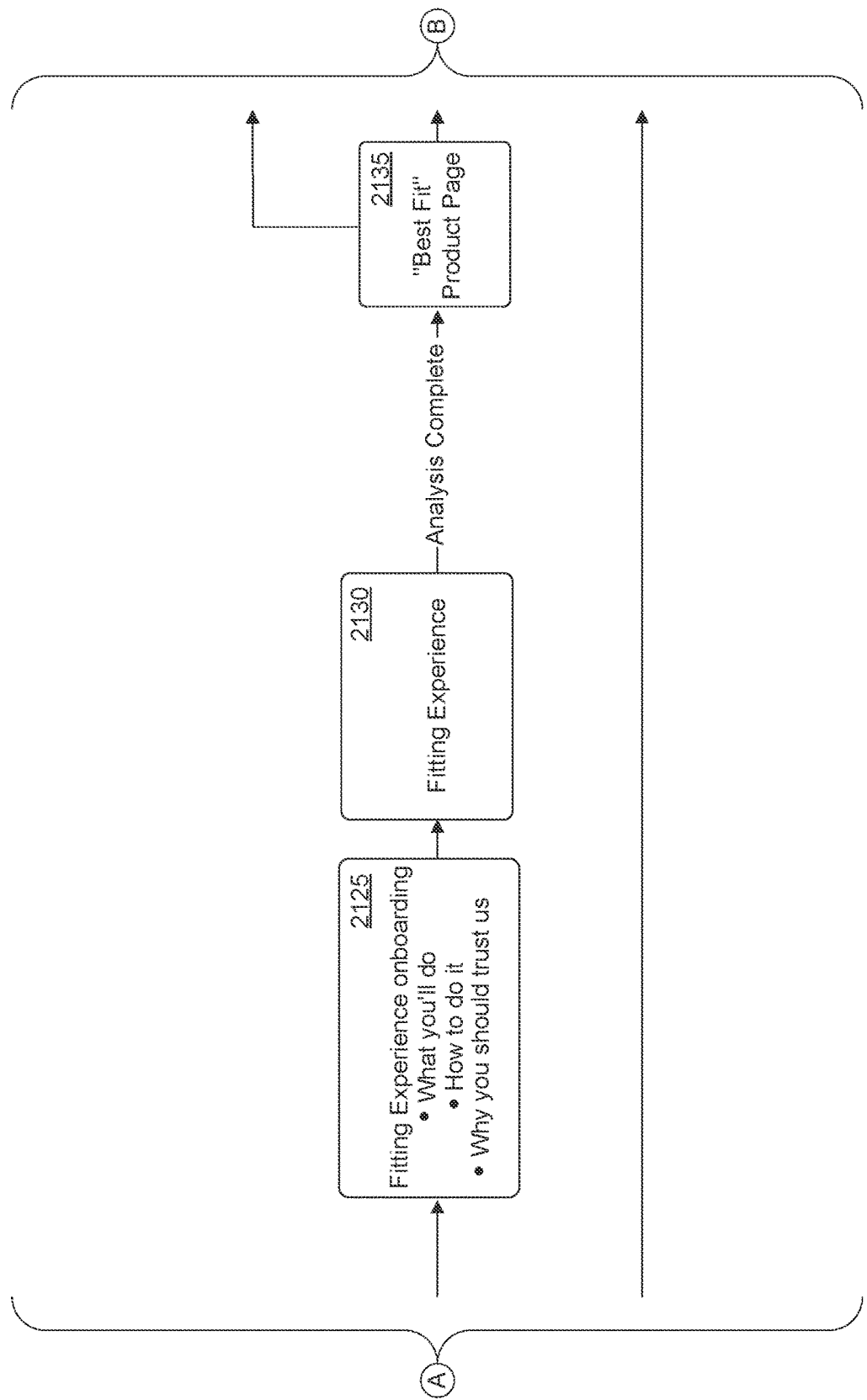

| 3D INDICATOR | MEASUREMENT |
|---|---|
| INDICATOR_A | FLOAT |
| INDICATOR_B | FLOAT |
| . | . |
| . | . |
| . | . |

— 2510

| EI_FACTOR_A | EI_FACTOR_B | EI_FACTOR_C |
|---|---|---|
| FLOAT | FLOAT | FLOAT |

| OBJECT | EI_FACTOR_A | EI_FACTOR_B |
|---|---|---|
| OBJECT_ID | FLOAT | FLOAT |
| OBJECT_ID | FLOAT | FLOAT |
| . | . | . |
| . | . | . |
| . | . | . |

| OBJECT | SCORE_EI_FACTOR_A | SCORE_EI_FACTOR_B |
|---|---|---|
| OBJECT_ID | FLOAT | FLOAT |
| OBJECT_ID | FLOAT | FLOAT |
| . | . | . |
| . | . | . |
| . | . | . |

| OBJECT | SCORE_EI |
|---|---|
| OBJECT_ID | FLOAT |
| OBJECT_ID | FLOAT |
| . | . |
| . | . |
| . | . |

GOLF CLUB AND OTHER OBJECT FITTING USING QUANTITATIVE BIOMECHANICAL-BASED ANALYSIS

REFERENCE TO RELATED APPLICATIONS

This application is a continuation-in-part of U.S. patent application Ser. No. 18/189,857 filed Mar. 24, 2023, which is a continuation of U.S. patent application Ser. No. 17/721,318 filed Apr. 14, 2022, issued as U.S. Pat. No. 11,620,858, which claims the benefit under 35 U.S.C. § 119(e) of U.S. Patent Application No. 63/194,308, filed May 28, 2021, which is hereby incorporated by reference in its entirety.

This application is related to U.S. patent application Ser. Nos. 17/721,305, 17/721,314, 18/309,849, and 18/189,839, the contents of each of these applications are incorporated by reference in their entirety for all purposes.

TECHNICAL FIELD

The disclosed technology relates to object fitting and other recommendations for golf clubs or other objects using quantitative biomechanical-based analysis of observed actions and a predetermined set of relationships between swing pattern components, e.g., various swing motion data such as swing speed, transition style, and release style (among others) and golf club (or other object) parameters. The swing pattern components may be matched with golf club (or component) parameters such as a specific club type and/or components (e.g., shaft weight, shaft flex and kick point, etc.). The use of quantified swing motion data provides a more reliable basis to perform object fitting and leads to more accurate and scientific results rather than guess work.

BACKGROUND

Traditional custom fitting of sports equipment (e.g., golf clubs or other sports equipment) often requires a person to visit a shop for an in person assessment by a fitting professional. For example, in the case of golf club fitting, often the person must visit a shop and swing a golf club. Often the assessment relies heavily on the club fitting professional's qualitative assessment (e.g., you swing fast or slow). In some cases, a person can get remote assistance, but often this remote "fitting" is based on user questions and answers but no swing assessment. Due to these and other limitations of traditional custom fitting processes it is not practical to perform meaningful custom fitting without the in person visit. This prevents a meaningful opportunity to integrate custom fitting into an online and/or mobile ecommerce experience. This is a significant drawback.

Another technical limitation of prior fitting processes is that they typically are not based on relevant data regarding different portions of a person's movement. For example, in those situations where a user visits a fitting location, the person may be required to swing a golf club and complex equipment may be used to measure the club head speed and other parameters at and after impact with a golf ball. In some cases a launch monitor is used, This equipment is expensive, requires careful setup and does not measure other relevant aspects of the person's swing. Swing pattern data prior to impact often is not quantified.

BRIEF SUMMARY OF EMBODIMENTS

One aspect of the disclosure is to analyze a user's movement (e.g., hand speed, hand path at key phases of a swing (e.g., a golf swing or other swing) like takeaway, backswing, transition from backswing to downswing and downswing, along with other factors (such as impact, height, wing span, range of motion of upper and lower bodies, etc.) in relation to products or other objects that would be used with the movement. The objects may include golf clubs or other objects (e.g., a baseball bat, tennis racket, other rackets). Object components may also be considered. For example in the case of golf, these components may include shaft length and other shaft characteristics, head size and other golf club head characteristics, grips, and other components). The objects and/or object components may be analyzed for optimizing or improving performance metrics (e.g., consistency, distance, accuracy, etc.) of the user's movement by matching or recommending an object (e.g., golf club) and/or specific object components (e.g., shaft characteristics) to the user based on their analyzed movement. Using objects measurements and user motion trackers, the user's movement may be analyzed, labeled, and/or optimized the user's measured movements (among other things), and an appropriate object/components can be identified and recommended to the user. The recommendations can be more detailed than just use a stiff shaft based on swing speed, as detailed herein.

Systems, methods, and computer readable media are also disclosed for applying biomechanical analysis of observed actions, with a focus on representing actions through computer-generated three-dimensional (3D) avatars. Physical quantities of biomechanical actions can be measured from the observations, and the system can analyze these values, compare them to target or optimal values, and use the observations and known biomechanical capabilities to generate object fittings and recommendations. The system can take measurements of quantifiable aspects of an actor's performance, including particular movements relating to particular body parts (e.g., mid hands sway, lift, speed, arm angular speed, shaft speed, pelvis and chest turn speed). For example, a user may move a secondary object at a particular speed and the system can match the speed or other components of the movement with a particular object that optimizes the accuracy or distance of the swing based on the user's movements (e.g., assigning a "style" label to a user's performance or average performance based on watch list analysis).

The system may use watch lists and motion trackers. A watch list is a list of measurable attributes of the performance that the system is monitoring (that is, measuring throughout the performance of the action), while a motion tracker is the sequence of measurements—the actual values—taken throughout the performance. As detailed herein, the watch lists and motion trackers can be domain specific. The system may enable the creation of one or more motion trackers comprising specific kinematic parameters and/or sequences of motion. The kinematic parameters may comprise position, velocity, acceleration, and/or higher-order derivatives of the position with respect to time. The behavior of higher order derivatives may be implicated in the real or perceived smoothness of motions. For example, the third order derivative (e.g., the derivative after acceleration) may correspond with "jerk" and can amount to smoothing out changes in acceleration. The fourth order derivative may correspond with "snap." In some examples, higher order derivatives may be recognized by the system. The system may determine and/or incorporate various orders of derivatives that may be incorporated with a given domain.

Another aspect of the invention relates to developing a biomechanical understanding of an actor (e.g., a user) using a neural network. This may be used, for example, to measure human movement such as bending at the waist (forward and back), lifting (up and down movement), sway (side to side movement), or thrusting (forward and backward movement). From this the system can automatically generate 3D avatars of the actor from a single-viewpoint recording and detect multiple joints through 3D pose estimation, or the conversion of a 2D pose estimation into a 3D space. The system can connect those joints to assess kinematic parameters and sequences (e.g., via motion trackers) relative to a specific domain such as sports performance, physical therapy, assessing well-being and/or other domains. For example, to determine the posture of an individual, the kinematic parameters of the joints connected to the torso may be measured and temporally tracked according to short-term degree of bend, lift and thrust across frames as well as the kinematic sequence that is observed and then statistically compared to a database to determine likely meanings of the movement. Kinematic parameters may correspond with measurable attributes of a performance, sometimes limited to a particular context. In some examples, a kinematic parameter is a quantity relating to an actor's performance of an action that is of interest to the biomechanical analysis and that can be derived from observations of the performance.

The system may tailor the component structures of 3D avatars based on domain-specific criteria (i.e. for some domains the system may track more points on the body than for others. For example, in baseball the system may track what the hands are doing in some detail to accurately capture the nuances of throwing, catching, and batting motions, while for soccer the system may track much less detail in the hands).

The creation of a watch list may be customized relative to each domain. This may include a weighting of the kinematic parameters and sequences based on various objectives (e.g., which are the most relevant for fault-correction within the domain). The watch list's weighting of which kinematic parameters and sequences are the most relevant within a domain may be as measured against a reference ideal for each respective motion tracker. The watch list may also determine the rank of importance for each watch list item relevant to the domain.

Various techniques may be used to create and/or manage motion trackers and watch lists. In some embodiments, this may be done dynamically through a UI by clicking, tapping, or otherwise selecting an actor's components (e.g., body parts, clothing, spacing between limbs, etc.) or context objects (e.g., sports equipment, juggling objects, umpire, etc.) in order to select motion trackers that track the kinematic parameters (e.g., position, velocity, acceleration, etc.) of those components and context objects, individually or in groups. Such a tracker or group of trackers may comprise a watch list to assess a performance of an action. Watch lists enable tracking of, and analytics on, the kinematic parameters for the indicated components throughout the actor's performance of actions against an ideal or some other reference (e.g. viewing a trace of the line between a user's elbows, wrists, and the head of a golf club throughout a golf swing, etc.).

Various UI features may be provided to select one or more components for tracking, grouping selected components into a watch list for subsequent use or analysis, etc. Various UI features may be provided for automatically determining a set of components constituting a watch list, such as through comparison of a user's performance of an action to a recording of an example performance. In some examples, the set of components may be automatically determined through automated processes in the system and described throughout the disclosure. Various UI features may be provided for authoring a watch list through programming and editing tools, such that the watch list can be saved, loaded, built into or imported into applications, selected and activated by users, etc.

The system may use the watch list to record the kinematic parameters (e.g., positions, angles, velocities, etc.) of the components in the watch list during the performance of an action. It may use the recorded kinematic parameters (KPs) to drive analysis of the performance, present information to the user based on the results of watch list analysis, correlate the results of watch list analysis with additional context data to affect what information is presented to the user.

As another example, the system may model performances by applying KP sequences or changes to ranges of motion of a user's avatar in conjunction with physical simulation techniques (physics engines). This may be done in connection with altering values in the KP sequence to simulate changes in performance of an action and the results of those changes (e.g. increasing the user's swing speed by 10% to simulate how far they could drive the ball) or altering range of motion limitations for an avatar to simulate reduced performance under injury or, in physical therapy scenarios, improvements to performance that could be expected with healing from injury.

As another example, the system may assess a user's change in performance over time. This may be used to gauge improvement vs. different training regimens or techniques, gauge performance loss (when to bench a player, either temporarily due to fatigue, semi-permanently due to injury, or permanently because they are unable to compete), compare measurements of motion trackers against experts or other users and ranking the user's performance against such experts or other users based on closest measurements of kinematic parameters and sequences against a target measurement or outcome (e.g. which MLB player really had the "sweetest swing" of all time?).

As another example, the system may model or simulate performances by applying KP sequences with different context objects (i.e. use simulation to show what the user could do, using the user's own motions, if they had different golf shoes, different clubs, a low-drag swimsuit, etc.).

According to another aspect, the system may blend KP sequence data from multiple sources to generate a fused avatar and/or KP sequence. In some cases, the system may combine multiple KP sequences from the same user to determine an average performance for that user (e.g., "Your typical tee shot looks like this"), combine KP sequences from multiple users to determine an average performance for some action in general, combine portions of KP sequences from selected users to create a hybrid (e.g., tee-shot that's Tiger Woods from the waist up, Jack Nicklaus from the waist down), blend KP sequence data from multiple sources to derive generalized insights relating to the factors affecting performance and/or combine or blend for other purposes.

The user's movements may be classified. For example, a machine learning model may be trained to group or cluster users by their similar movements. Users with a similar backswing may be grouped in a first classification and users with a similar serve may be grouped in a second classification. The similarities may be grouped by a range of motion (e.g., all swings between 80-82 miles per hour (mph), movement (e.g., 5-degrees north, then switch to 10-degrees west), or other direction, velocity, or speed shared commonalities.

Objects may also be analyzed and classified. For example, the shaft of the object may have different stiffness or kick point profiles. These characteristics of the objects may correlate with different outcomes. For example, a thicker shaft may create more power transferred from a user's swing movement that holds the top of the shaft, and the power may be transferred through the middle of the shaft to moving a second object at the end of the shaft.

In some examples, the recommended objects are correlated to the user's movements by computing the distance between an ideal equipment index (IEI) and a product equipment index (PEI). For example, the user's movement may be measured in accordance with each of the KPs/trackers along the 3D planes. The value for each of the KPs/trackers may be stored in a table, where the KPs/trackers may be correlated with the type of activity/movement. A temporary IEI table may be generated (and stored) for the user from the KP/tracker measurements. In some examples, the temporary IEI table may provide theoretical measurements that adjust the values from the user's recorded/analyzed movement in order to maximize the effectiveness of the movement (e.g., hit the ball farther or more accurately toward the hole/goal). The temporary IEI table may be generated by a trained machine learning (ML) model that provides adjustments for some or all of the values of the KPs/trackers to improve the overall movement. These adjustments may be made based on storing historical data that correlates movements (e.g., a golf swing) and performance (the resulting distance and accuracy of the golf swing). Once the temporary IEI table is determined, a PEI table may be retrieved. In some examples, the PEI table may include a database of values associated with a set of products and/or components of the products). The PEI table may be used to identify products/components having desired values based on the user's IEI. The PEI table may be manually-generated or in an automated fashion. The system may compute the distance values between the values in the IEI table and the PEI table values to identify recommended objects. The distance values may be provided as input to a second machine learning (ML) model, where the second ML model applies weights to values corresponding with each KPs/trackers that may provide greater or lesser effect on the overall recommendation of the object. A list of recommended objects may be provided as output for the second ML model, where each object corresponds with a confidence score. The recommended objects may be sorted/filtered using the confidence score and provided to the user as recommended objects.

Once the user movement and objects are analyzed, a specific version of an object (e.g., a specific golf club) may be recommended to optimize or improve to the user based on their analyzed movements. In some cases, specific components for the specific object may be recommended. For example, a specific brand/version of a golf club may be available with different components as options. For example, the specific club may be available with different shafts having different shaft characteristics (e.g., shafts having different thickness, stiffness/flex, weight, kick point profile and/or other shaft characteristics). The analysis of the user's measured swing movements can be assessed against the products/product components to identify ones that may be more appropriate to accommodate for the user's swing. The trained machine learning model may correlate the KPs and trackers to maximize the outcome. The recommendation may be provided to the user for various purposes, including providing a visual notification (e.g., the recommendation can identify a club/shaft for maximizing ball distance or accuracy) or preventing a future injury (e.g., the recommendation can identify a club that is light enough so that the user's back is not strained when swinging the club). Other components such as, grip characteristics, head size and other head characteristics among other things can be factored into the analysis for golf clubs.

In some examples, the components of the user swing or movement may correlate with other items other than tools, including coaches or environments. For example, a particular coach may be identified as improving overall swing when the users initial swing matches the identified movement, based on tracking players progress and outcomes though time that were coached by the coach. The identification of a particular coach may be provided as a visual notification to the user. In another example, a particular course or court may be recommended to the user based on their analyzed movement, in hopes of optimizing performance based on the correlated environment and analyzed movement. The environment can be analyzed using computer vision algorithms and metadata (e.g., weather information at the location, third party data, etc.) as described herein. The recommendation for the course may be provided as a visual notification to the user.

In some examples, the system may leverage the software and systems described herein to enable integration with an online ecommerce system. For example, a user may visit a website that offers a set of products (the golf clubs available from a particular retailer). Product information for these products may be stored in a database. This stored information may include PEI information. The products may also have a product identifier (stock keeping unit or SKU) which is also stored. When a user visits the online ecommerce system, the system may present a prompt for the user to download an app (as described herein) to their phone or other mobile device (if they do not already have the app) and prompt the user to use the app to record one or more golf swings. The app may capture the swings and the captured swing may be analyzed as described herein to perform a quantitative biomechanical-based analysis of the user's swing(s). This may be done on the device on which the app resides or on a server associated with the ecommerce system. Either way, the results of the quantitative biomechanical-based analysis can be used to make one or more club fitting or other recommendations to the user, based on the products/components available from that ecommerce system. The recommendation(s) may be presented to the user via one or more graphical user interfaces (GUIs). The presented recommendations may include product identifier information (e.g., a SKU) such that if the user selects a recommendation (e.g., by clicking on a GUI element associated with the recommendation, the ecommerce system may reference the product identifier and automatically add the associated product/components to a shopping cart from the user. This integration enables customized club fitting and purchase through an online ecommerce site, without the user being required to visit a store or other fitting location.

As a further example, the system for object recommendation may be accessible from a merchant website or other online source. The user may perform the activity (e.g., a number of swings or a threshold number of swings, pre-shot routine, practice swings, or other movement associated with the activity) and the app on the user device may capture a series of images of the user's movement. The system may perform the quantitative biomechanical-based analysis and correlate the components of the swing with an object recommended to optimize/improve the analyzed movement. The system can provide a product detail page associated with the recommended object to initiate the purchase transaction. For example, the system can provide a description of the recommended object and its characteristics, in addition to a price. The user can select the recommended object and it can be added to an electronic shopping cart from which the user can purchase the object. When the purchase transaction is submitted, the system may issue a transfer of funds request from the user's account to the merchant's account, and also instruct the merchant's account to initiate a shipping/fulfillment process to provide the recommended object to the user. The system may update the user interface to provide a confirmation of the purchase transaction and initiation of the shipping/fulfillment process. The system may redirect the user back to the user interface to capture additional images of the user's performance of the activity or other activities for more recommendations.

In some examples, the user may be directed to an equipment page to initiate a purchase transaction for objects other than the recommended object. Other objects may include, for example, popular objects, new objects, objects that are similar to the recommended object, or objects that were purchased in the past by the user in accordance with a purchase history of the user or other user with similar swing characteristics and/or IEls.

One aspect of the invention relates to a unique system and technical process for custom fitting of objects such as golf clubs or components thereof (golf club shafts) or other objects. For simplicity, various examples explained herein will focus on custom fitting a golf club or components thereof, but the invention is not so limited. The system and processes described herein can be used to fit other objects. For example, in the case of golf equipment, the process may determine a custom fitting of an object (e.g., a golf club) and/or components thereof (e.g., a golf club shaft or club head). Other objects can includes sports objects or non-sports objects.

In some aspects of the invention, the process is based on science not art and relies on predetermined relationships of identified object parameters and quantitative measurements of the person's performance during different portions of a person's movement during performance of an activity (e.g., a golf swing prior to impact). However, impact data and post impact data (e.g., from a launch monitor may also be used in conjunction with the quantitative measurements of the person's performance during the swing.

In some aspects of the invention, the process relies on predetermining a set of relationships between swing pattern components and golf club parameters. These swing pattern components, golf club parameters and their relationships may be stored in a memory of the system. For example the swing pattern components may include various swing motion data such as swing speed, transition style, and release style (among others). At least some of the swing pattern components may be components of the swing prior to impact with a golf ball. The swing patterns components may be matched with golf club parameters such as shaft weight, shaft flex and kick point. Other swing pattern components and/or golf club (or component) parameters may be used. The use of quantified swing motion data provides a more reliable basis to perform object fitting and leads to more accurate and scientific results rather than guess work. Rules and/or machine learning models may be used and updated over time to further increase the results of the recommendations.

The system may be used for different sets of equipment or objects. For example, if a first retailer, manufacturer or other entity offers a certain set of golf clubs (or other objects) the system may store for that entity, the set of objects available (golf clubs), an object (e.g., product) identifier (model name and version, SKU or other identifier) along with the object parameters (e.g., golf club parameters such as shaft weight, shaft flex and kick point) for the objects. A person may visit an online website or otherwise remotely access the system associated with that entity. The website may present a webpage with an option for the user to browse the objects available via that entity. The website may display one or more options for the user to obtain a remote custom fitting. Upon selecting that option, the user may be prompted to download an application to a phone or other mobile device if the user does not already have the applications. The website or application may prompt the user to perform one or more swings which can be captured by the application as described herein.

The app may process the swing data to make a quantitative biomechanical-based analysis of observed actions and a predetermined set of relationships between swing pattern components, e.g., various swing motion data such as swing speed, transition style, and release style (among others) with the golf club (or other object) parameters. The swing patterns components may be matched with golf club (or component) parameters such as shaft weight, shaft flex and kick point of the set of objects available (golf clubs), available from that entity. Based on the analysis, the system may recommend one or more of the objects to the user. Through the application or the website, the user can select one or more of the recommended objects and the website or app can display an option for the user to purchase the one or more selected objects. Based on at least the product identifier of the selected objects, the system can initiate a transaction for those objects to facilitate the user's purchase of the objects.

In addition to the recommendation process itself being advantageous, the features of the system enable a meaningful opportunity to integrate custom fitting into an online and/or mobile ecommerce experience. This enables entities to offer this process to a user remotely, greatly enhancing the opportunities for the entity and facilitate the ability for the user to receive a custom fitting and recommendations without the need physically visit a physical club fitting location.

Some aspects of the invention are based on the recognition by applicant that certain some club fittings and recommendations are improved when quantitative assessments are performed. For example, the relevant swing pattern components (e.g., swing speed, transition style and release style) cannot be accurately assessed without quantitatively measuring the swing motion data regardless of how many years of experience a club fitting professional has.

The device (e.g., a smartphone or other mobile device) running an application enables the user to capture video of their swings and process the swing data in real-time and/or store the swings in a storage device associated with the system on the device.

The application may integrate a set of functions that enables the club fitting processes described herein. For example, the app may present a user interface with an option for the user to browse the objects available from a specific entity. The app may display one or more user interface options for the user to obtain a remote custom fitting. The application may guide the user on how to collect the swing data needed to perform the assessment (e.g., prompt the user to perform one or more swings which can be captured by the application as described herein).

The app may provide the user the ability to search for objects and make certain selections to narrow down the types of objects/components in which the user is interested.

For example, the user can select a golf club driver or just a golf club shaft. Based on the users selection(s) the application will process the swing data including the swing pattern components and the associated parameters of the objects relevant to the user selection(s) to provide object fitting recommendations from the set of objects available from the entity and which meet the user's selection(s).

The system of the invention has numerous other advantages. In some cases, a person may not know when they should acquire new equipment. One aspect of the invention relates to a system to proactively determine when a person (e.g., a golfer) should change equipment (e.g., a golf club, shaft, golf ball or other equipment) based on an objective measurement of the person's performance based, in part, on an analysis of one or more quantitative measurements (e.g., golf swings) over time.

For example, for users who use the application to record quantitative measurements of biomechanical properties of their golf swings (e.g., to improve their swings), the measurements may be stored in the system. The system may be programmed to analyze the person's swing data over time and based on predetermined factors (e.g., rules or other factors) determine when to recommend to the person that they should change equipment and what equipment is recommended. An explanation of the reason for the recommendation can also be provided.

For example, according to another aspect of the invention, the system can provide an object recommendation to a person (e.g., a new golf club, shaft or other object) along with a quantifiable justification of the basis for the recommendation. The quantifiable justification can include information relating to quantitative measurements of the persons swing patterns components and the predetermined relationships between swing pattern components and the golf club (or component) parameters. This enables a display of the basis for the recommendation rather than a club fitting professionals best "guess" on a recommendation. Providing a quantifiable justification can give a user greater understanding of and confidence in the recommendation leading to a greater likelihood the person will act on the recommendation.

Another aspect of the invention is an application (mobile or web app) that includes a first module to capture a user's golf swing to quantitatively analyze and visually display the user's swing performance to help enhance the user's golf swing (as described herein). The first module may enable the user to record one or more performances or movements (e.g., golf swings) or access one or more previously recorded performances or movements (e.g., golf swings). The app may for apply a biomechanical analysis of observed actions and generate a display representing actions through computer-generated three-dimensional (3D) avatars. The app may include a second module to assess the user's equipment (e.g., golf clubs, balls, and other equipment) using the same swing performance data to make object fitting recommendations. The same app may also include a third module (or as part of the second module) one or more user interfaces that present display options to a user to enable the user to act on one or more recommendations through the app. The integration of these functions (and/or other functions described herein) into a single application provides advantages and synergies not found in other applications.

In another aspect of the invention, the application is provided through a non-mobile computing platform, such as a desktop Windows platform. The computing platform can be communicatively coupled with one or more cameras through which the a user can record one or more performances or movements. A non-mobile computing platform may be useful in established settings, such as at a sporting goods store, where a fitter can help a customer with object fitting recommendations, a coaching facility, where a coach can help an athlete with biomechanical analysis and object fitting recommendations, or other enterprise facility. For example, a coach can use the application to perform a biomechanical analysis on performances or movements of athletes recorded at a coaching facility. The coach can use the application to determine whether the athletes need new equipment and provide object fitting recommendations for the new equipment. This allows the coach to provide more services to the athletes and avoid sending the athletes to a different location for the new equipment. Furthermore, through repeated coaching sessions and biomechanical analyses of the athletes, the application can indicate to the coach that the performances or movements of the athletes have changed, potentially warranting an object fitting recommendation for new equipment. In this way, the application not only provides advantages in object fitting, but can provide advantages as a supplement to techniques in coaching athletes.

According to another aspect of the invention, the app may generate a simulation of the user's swing and/or determine a difference in performance for one or more recommendations. For example, if the user selects a club fitting for a golf club driver, the system may use one or more prior swings of the user to make the recommendation using the user's existing driver. The system may generate a simulation of the user's swing using one or more of the recommended drivers. Based on the simulation the app can generate a display of the user's swing (e.g., via a 3D avatar) with the existing driver and a display of the user's simulated swing (e.g., via a 3D avatar) with the recommended driver. These displays may be presented simultaneously via a user interface so the user can see the difference(s). Additionally, the system may use performance measuring equipment to assess that actual result of a user swinging an existing golf club and generate a simulation of the user's performance to assess that actual result of a user swinging the recommended golf club to project the performance increase for the user.

In some examples, the system may initiate a purchase transaction of the recommended object. For example, the system for object recommendation may be accessible from a merchant website or other source. The user may perform the required activity (e.g., five swings or a threshold number of swings, pre-shot routine, practice swings, or other movement associated with the activity) and the user device may capture a series of images. The system may correlate the components of the swing with an object recommended to optimize and improve the analyzed movement. The system can provide a product detail page associated with the recommended object to initiate the purchase transaction. For example, the system can provide a description of the recommended object and its characteristics, in addition to a price. The user can add the recommended object to an electronic shopping cart and provide account information to purchase the object. When the purchase transaction is submitted, the system may issue a transfer of funds request from the user's account to the merchant's account, and also instruct the merchant's account to initiate a shipping/fulfillment process to provide the recommended object to the user. The system may update the user interface to provide a confirmation of the purchase transaction and initiation of the shipping/fulfillment process. The system may redirect the user back to the user interface to capture additional images of the user's performance of the activity.

In some examples, the recommended objects are correlated to the user's movements by computing the distance between an ideal equipment index (IEI) and a product equipment index (PEI). For example, the user's movement may be measured in accordance with each of the KPs/trackers along the 3D planes. The value for each KPs/trackers may be stored in a table, where the KPs/trackers may be correlated with the type of activity/movement. A temporary IEI table may be generated for the user from the KP/tracker measurements. In some examples, temporary IEI table may provide theoretical measurements that adjust the values from the user's recorded/analyzed movement in order to maximize the effectiveness of the movement (e.g., hit the ball farther or more accurately toward the hole/goal). The temporary IEI table may be generated by a trained machine learning (ML) model that provides adjusted each of the values of the KPs/trackers to improve the overall movement. Once the temporary IEI table is determined, a PEI table may be retrieved. In some examples, the PEI table may identify the values of each potentially recommended object that are ideal for that object. The PEI table may be manually-generated or automated. The system may compute the distance values between the values in the IEI table and the PEI table values for the potentially recommended objects. The distance values may be provided as input to a second machine learning (ML) model, where the second ML model applies weights to values corresponding with each KPs/trackers that may provide greater or lesser effect on the overall recommendation of the object. A list of recommended objects may be provided as output for the second ML model, where each object corresponds with a confidence score. The recommended objects may be sorted/filtered using the confidence score and provided to the user as recommended objects. The IEI table and the PEI table can be generated based on various equipment databases. In this way, the recommended objects can be adapted to an available set of equipment, such as those that are currently in stock at a sporting goods store.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 5 is an illustrative human movement, in accordance with the embodiments disclosed herein.

FIG. 12 illustrates a data store storing watch list data for a 3D avatar, in accordance with the embodiments disclosed herein.

FIG. 13 illustrates a data store storing tracker data for a 3D avatar, in accordance with the embodiments disclosed herein.

FIG. 14 illustrates a data store storing watch list and tracker data for determining 3D movements by the biomechanical analytics computer system, in accordance with the embodiments disclosed herein.

Figure 1:
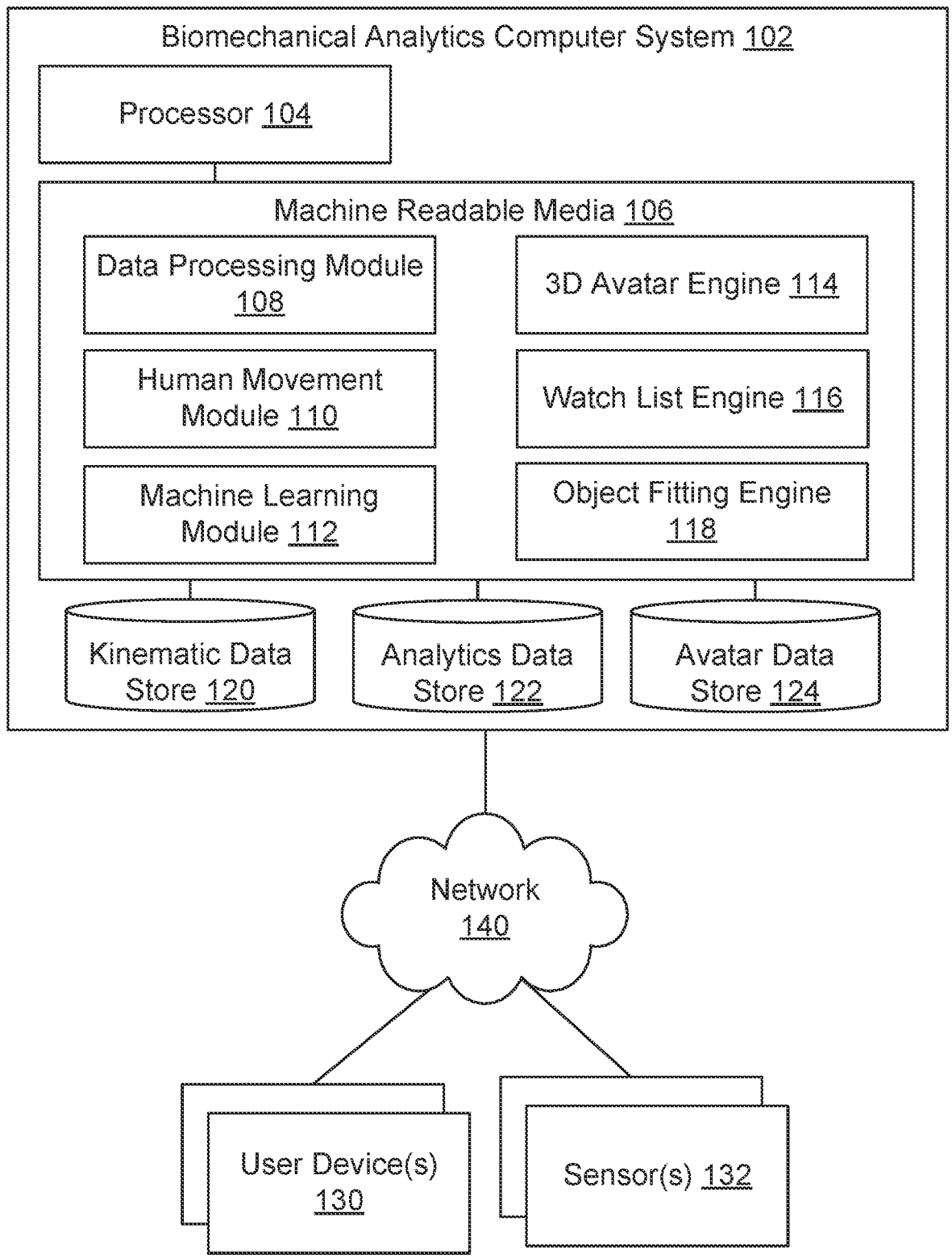
FIG. 1 illustrates a biomechanical analytics computer system, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments disclosed herein describe systems and methods for performing biomechanical analysis of observed actions through 3D avatars and quantification of physical attributes of the actions for comparison to target or optimal values. The physical quantities associated with the actions can be measured from the recorded observations, analyzed, compared to target or optimal values (which may be previously stored) and used for other purposes. The analysis may include analyzing the actions observed by the system to take measurements of quantifiable aspects of the performance. As used herein, the term "performance" includes a single actor's production of an activity at or over a specific point or period of time and/or space. The performance measurements can be used to perform a biomechanical analysis of the performance. The system may further generate 3D avatars to visualize the performance, different aspects of it, or modified versions of it.

Another aspect of the invention relates to the generation of and applications of 3D avatars with biomechanical understanding. Biomechanical understanding is based on a domain that an activity relates to, and to points on the body that are important for performance of that action in that domain. As detailed below, the system and methods described herein can create watch lists and motion trackers. A watch list can be a list of measurable attributes of a performance for a given domain that the system is programmed to monitor or watch for. For example, the watch list may include a list of attributes that the system may measure (e.g., throughout the performance of the action). A motion tracker may include the sequence of measurements (e.g., the actual values, etc.) made throughout the performance.

Among other improvements, these aspects of the invention build on technology that just recognizes a movement or an action by analyzing the actions observed by the system to take measurements of quantifiable aspects of the performance. Those measurements can then drive biomechanical analysis of the performance and generation of 3D avatars to visualize the performance, different aspects of it, or modified versions of it. Watch lists and motion trackers can be pre-authored, created at runtime through a user interface, loaded, saved, modified and otherwise used in connection with various aspects of the invention.

Another aspect of the invention relates to developing a biomechanical understanding of an actor using a neural network. This may be used, for example, to measure human movement such as bending at the waist (forward and back), lifting (up and down movement) and sway (side to side movement). From this the system can automatically generate 3D avatars of the actor from a single-viewpoint recording and detect multiple joints through 3D pose estimation, or the conversion of a 2D pose estimation into a 3D space. The system can connect those joints to assess kinematic parameters and sequences (e.g., via motion trackers) relative to a specific domain such as sports performance, physical therapy, assessing well-being and/or other domains. For example, to determine the posture of an individual, the kinematic parameters of the joints connected to the torso may be measured and temporally tracked according to short-term degree of bend, lift and thrust across frames as well as the kinematic sequence that is observed and then statistically compared to a database to determine likely meanings of the movement.

The system may tailor the component structures of 3D avatars based on domain-specific criteria. (i.e. for some domains the system may track more points on the body than for others. For example, in baseball the system may track what the hands are doing in some detail to accurately capture the nuances of throwing, catching, and batting motions, while for soccer the system may track much less detail in the hands).

The creation of a watch list may be customized relative to each domain. This may include a weighting of the kinematic parameters and sequences based on various objectives (e.g., which are the most relevant for fault-correction within the domain). The watch lists weighting of which kinematic parameters and sequences are the most relevant within a domain may be as measured against a reference ideal for each respective motion tracker. The watch list may also determine the rank of importance for each watch list item relevant to the domain.

The weights for each domain may be determined by a machine learning model. For example, a plurality of sequential image frames or videos may be provided as input to the model. For a first domain (e.g., swimming, etc.), a kinematic parameter corresponding with a measurement of a quantifiable aspect of an actor's performance may be correlated with a ranking of a performance of the activity (e.g., the speed of swimming, etc.). Various measurements may be determined as well (e.g., moving legs more, moving wrist/arms less, etc.). The body parts, action accessories (e.g., swimsuit, cap, goggles, etc.), or actions corresponding with the greatest performance may be weighted greater than other performances. Body parts and motion sequences corresponding with the greatest performances for the domain may be added to the watch list and/or motion tracker to identify in future input to the trained, swimming-specific machine learning model. For a second domain (e.g., golf, etc.), a kinematic parameter corresponding with a measurement of a quantifiable aspect of an actor's performance may be correlated with a ranking of a performance of the activity (e.g., the accuracy of the golf swing, etc.). Various measurements may be determined as well (e.g., twisting more at the hips, following through with the golf club at the end of the golf swing, etc.). The body parts, action accessories (e.g., hat, glove, etc.), or actions corresponding with the greatest performance may be weighted greater than other performances. Body parts and motion sequences corresponding with the greatest performances for the domain may be added to the watch list and/or motion tracker to identify in future input to the trained, golf-specific machine learning model.

For purposes of example only, various aspects of the description will refer to and use the sporting examples (e.g., golf swing, etc.) as an example action. The invention is not limited to these actions and the principles and concepts may be applied to other sports or movements, including soccer, baseball, or human movements in other domains. This may include dance and other performance arts, physical therapy, or wellness assessments.

Various technical improvements are described throughout the application.

FIG. 1 illustrates a biomechanical analytics computer system, in accordance with various embodiments disclosed herein. In this example, biomechanical analytics computer system 102 may communicate with one or more user devices 130, sensors 132 via network 140 and/or other hardware and software. Biomechanical analytics computer system 102 may include processor 104 and machine-readable storage medium 106 in communication with one or more data stores, including kinematic data store 120, analytics data store 122, and avatar data store 124. Additional embodiments of biomechanical analytics computer system 102 and one or more user devices 130 are provided with FIG. 9.

Processor 104 may be one or more central processing units (CPUs), semiconductor-based microprocessors, and/or other hardware devices suitable for retrieval and execution of instructions stored in machine-readable storage medium 106. Processor 104 may fetch, decode, and execute instructions to control processes or operations for optimizing the system during run-time. As an alternative or in addition to retrieving and executing instructions, processor 104 may include one or more electronic circuits that include electronic components for performing the functionality of one or more instructions, such as a field programmable gate array (FPGA), application specific integrated circuit (ASIC), or other electronic circuits.

Machine readable media 106 may be any electronic, magnetic, optical, or other physical storage device that contains or stores executable instructions. Thus, machine-readable storage medium 106 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 106 may be a non-transitory storage medium, where the term "non-transitory" does not encompass transitory propagating signals. As described in detail below, machine-readable storage medium 106 may be encoded with executable instructions for running various processes and engines described throughout the disclosure.

Machine readable media 106 may comprise one or more applications, engines, or modules, including data processing module 108, human movement module 110, machine learning module 112, 3D avatar engine 114, watch list engine 116, and object fitting engine 118.

Data processing module 108 may receive data from user device(s) 130, sensor(s) 132, or other sources. The data may be stored in analytics data store 122 in association with the human user that is performing a human movement.

Data processing module 108 may adjust the quality of the image or video from user device(s) 130, sensor(s) 132, or other sources. For example, the image quality may be measured against a threshold value to determine if the image is too bright, too dark, etc. Data processing module 108 may adjust various camera characteristics and camera positions for the image or video data including, but not limited to, angle, tilt, or focal length.

Data processing module 108 may adjust the image or video by automatically changing the frames per second input value. For example, the image quality can be determined to be above the threshold value. Data processing module 108 may initiate down-sampling, compression, or decimation to resample the image or video and reduce the image quality and/or match a predetermined frames per second value.

Data processing module 108 may determine one or more derivative values (e.g., third order or jerk, fourth order or snap, etc.). The measurement of values in the motion trackers from the input images may be used to calculate the derivation of kinetic parameters from motion tracker recordings.

Data processing module 108 may also determine data based on watch list items. The watch lists and/or motion trackers can be pre-authored, created at runtime through a user interface, loaded, saved, etc.

Data processing module 108 may also determine predicted outcome data. This may include a trajectory and direction calculation of where an object would have landed after a swing is performed by the user. Other outcome data may be determined, including trajectory information, height of ball as it traveled, or other data that can be used to correlate an athlete user's actions with the outcome it produces.

Data processing module 108 may collect pre-shot data. For example, pre-shot data may comprise pre-shot thoughts or internal thoughts (intentional or unintentional) by the athlete user to identify thoughts while the user was swinging or performing some movement. The data may be collected by providing a predefined list of shots to the user interface at the user device 130, including movements/shots corresponding with laying up, shaping the shot around the obstacles, shot over, under, or around obstacles, compensating for the wind, slope of the terrain, grass type and height, landing area condition, distance to the hole and club type. The user interface may provide a text box or audio recording tool to accept comments from the user (e.g., by typing or dictating). The pre-shot thoughts or internal thoughts may be provided to machine learning module 112 to correlate as input, similar to physical movements by the user, and corresponding with mental data of the user.

Data processing module 108 may collect third party data. For example, the athlete user may provide data to a third party fitness application or device. The data from the fitness application or device may be transmitted (via near field communication, Bluetooth®, etc.) to user device 130 or via network to 140 biomechanical analytics computer system 102.

Human movement module 110 may access the images or video stored in analytics data store 122 and identify a human movement that is closest to the movement performed in the images or video. The available human movements may be stored in kinematic data store 120. In some examples, the available human movements may be stored in kinematic data store 120 may be compared with the received images or video stored in analytics data store 122. Human movement module 110 may determine the human movement with the highest likelihood of matching (e.g., the greatest percentage match, the percentage match above a threshold value, etc.).

Human movement module 110 may identify objects other than the user in the images, track kinematic parameters of the objects in the images, and generate context data based on the tracked kinematic parameters of the objects. The objects identified may vary based on the domain. For example, a juggling domain may track more than one non-user object (e.g., each of the objects that the human user is tossing and catching, etc.), while soccer may track a single object in the domain (e.g., the soccer ball, etc.).

The objects may be identified within a bounding box. For example, human movement module 110 may identify a rectangular space around the domain specific objects, including a user's body parts that correspond with the domain and any relevant non-user objects for the domain. Coordinates of the bounding box may be identified in the first image frame. As the movement progresses, the outline of the bounding box may be adjusted for subsequent image frames to encompass the same user's body parts and relevant non-user objects for the domain that were identified in the initial image frame. The objects that are captured within each bounding box may be added to the watch list and the objects that are outside the bounding box may be removed from the watch list (e.g., to help limit clutter and irrelevant objects as input to the machine learning model, etc.).

In some examples, human movement module 110 may identify pre-shot routines. For example, in a pre-shot routine, the athlete user may swing but not hit the ball (e.g., in order to warm up or practice moving the club as if the user were swinging to hit the ball). The pre-shot routing may determine actions over time, including how many steps the user took to step into the shot, the wait time before starting the swing, or number of practice swings.

In some examples, human movement module 110 may correspond with machine learning module 112 to determine a standard pre-shot routine over time. The standard pre-shot routine may be determined by calculating how many seconds did it take to complete the pre-shot routine (e.g., and hit the ball) and the relative consistency across a plurality of movements corresponding with the pre-shot routine. This can help determine when the pre-shot routine deviates from the standard pre-shot routine, including whether the pre-shot routine was consistent across different movements or shots.

Human movement module 110 may identify a movement classification. For example, once the swing is analyzed, the swing may correspond with a grouping for associating a swing of the user with other users that have similar swings. The swing may be broken down into phases of the swing (e.g., address, backswing, downswing, impact, follow-through) and each of the phases may correspond with a grouping, and/or the overall swing may correspond with a grouping.

The "best fit" swing type can be correlated with an identifier (e.g., Swing Score) or other movement classification mechanism. This determined identifier for a swing type may be based on using the "best fit" reference swing's kinematic parameter values at key swing positions and how closely the user's swing KP values match the grouped swings that also correspond with that category. In some examples, a different identifier may be determined for different phases of the swing (e.g., address, backswing, downswing, impact, follow-through) or body parts (e.g., lower, upper, foot, hands).

The identifier (Swing Score) may also correspond with a numerical value that can be used to rank each phase of the swing in a scale from "bad" to "good" for that phase (e.g., when compared to an average or threshold value). Each of the numerical values can be aggregated for a total swing score (e.g., how good/bad is the swing overall) or may be a weighted average of sub-swing numerical values.

Human movement module 110 may also compare user movements across classifications. For example, the Swing Score identifier/grouping and Swing Score value/ranking may be used to compare and rank the user against other users by peer groups (e.g., gender, age, skill level, swing type, etc.). For example, swing phases (e.g., setup, backswing, downswing, and impact) may be used to determine a Swing Score value. For every phase, compute the hand speed. If hand speed above some threshold value (e.g., threshold from the coaches), system will add 50 points to the Swing Score value/ranking.

In some examples, a leaderboard of scores may be generated (e.g., for providing to user device 130). The leaderboard may correspond with all users, regardless of identifier grouping or location. Other leaderboards are available as well, including a global leaderboard of high scores for each of these groups or a local leaderboard by location. When generating the grouping leaderboard, the leaderboard may be associated with another user (e.g., a professional golfer). For example, if "Athlete A" was representative of Swing Type 1, then there would be a "Athlete A" leaderboard of the best swing scores that most closely resembles his swing.

Human movement module 110 is also configured to measure repeated movements of the user and other movement tendencies. An illustrative example can include "3D on the Go" to measure swing tendencies, combine with the user's bio data (e.g., height, weight, etc.), and when they are playing on the golf course. The system may identify patterns that cause bad outcomes for the user (e.g., distance below a threshold value or accuracy off of a threshold value). The bad outcomes may be measured subjectively and based on the user's ability.

Human movement module 110 and object fitting engine 118 may determine an object to help mitigate bad outcome that may result from repeated movements. The recommendation may include a different shaft profile or club head set-up based on the user's movement that the system determines to be causing the bad outcome. For example, if we know that the user tends to slice the ball when under pressure on the golf course (even though he hits it perfectly straight on the range during a "traditional" club-fitting session), and we know that it's because of his tendency to turn too fast in his downswing transition), we can mitigate the slice with a club that's set up more for a draw.

Machine learning module 112 may access analytics data store 122 and learn dependencies between limbs and joints using a large set of images and video of human movements captured from user devices 130 and sensors 132. The machine learning model may be, for example, a deep convolution neural network. The mapping may be stored as a representation of available human movement kinematic data store 120.

Machine learning module 112 can determine input data needed to maximize an output value. For example, an output value may be a distance value that originates from a swinging location. The trained ML model may determine the biomechanical data that should be adjusted relative to the context data (e.g., headwind) in order to maintain a desired outcome (e.g., distance that the ball travels).

Machine learning module 112 may train one or more ML models by correlating examples of swing motions, human movements, or other performances with the outcome that were produced. Data Processing Module 108 and/or Watch List Engine 116 (described below) may record the user movement, outcome data, and context data (e.g., measurements of environmental factors) simultaneously to correlate the data with each other to create a cause and effect relationship by the model to a relatively high confidence determination.

In some examples, training the ML model may use coaches and golfing experts to identify how to improve general swings for distance and accuracy. The ML models may not be trained on previous golf swings. In this example, machine learning module 112 with data processing module 108 may provide a video or image of a golf swing to a user interface of one or more coach user devices 130. The coaches may provide instruction on which body parts to reposition or rotate at a different angle, velocity, etc. than the initial swing. The correlation between kinematic parameters (KPs) and outcome may be used to drive the training of the ML model. Once the ML model is trained (e.g., using the coach feedback), the trained ML model may receive new input images or video from an athlete user and provide output on how to adjust the swing to improve the outcome (e.g., farther swing distance, closer location to the hole, etc.).

The ML training process may also determine a weighted correlation between movement adjustment (e.g., over time) and outcome. For example, a movement of a first body part may have a higher weight value in the training than a movement of a second body part value, which causes a greater change in the outcome (e.g., greater effect on the ball distance or accuracy overall). In another example, the weighted correlation may be based on environmental factors by analyzing recorded performances captured with various environmental data to determine how the outcome changes. This can help enable biomechanical analytics computer system 102 to teach athletes how to compensate for various environmental factors using particular movement changes.

Machine learning module 112 may generate a 3D model from a 2D model. For example, data processing module 108 receives a stream of images or video from user device(s) 130, sensor(s) 132, or other sources and sends them frame by frame to machine learning module 112 as a 2D image. Machine learning module 112 may generate a 2D frame for each image frame. In some examples, each 2D frame may contain 2D coordinates for each body part or some subset thereof (e.g., the body parts or limbs that are moving in a particular context, etc.). Machine learning module 112 may collect the 2D frames and start streaming these frames to a 3D ML model. In addition to set of 2D frames, machine learning module 112 may send the 3D ML model various parameters, including body measurements, camera settings or intrinsic values, environment conditions, and the like. The output of this process may comprise a set of frames with 3D coordinates.

Machine learning module 112 may implement an inference process based on a machine-learned model. For example, the body parts included in the watch list may be tracked for movement, angle, rotation, and the like. These changes in position may be data points that are input to a machine learning model that are used to infer a resulting action in the context (e.g., jumping over a hurdle, hitting a ball with a racquet, etc.).

Figure 2:
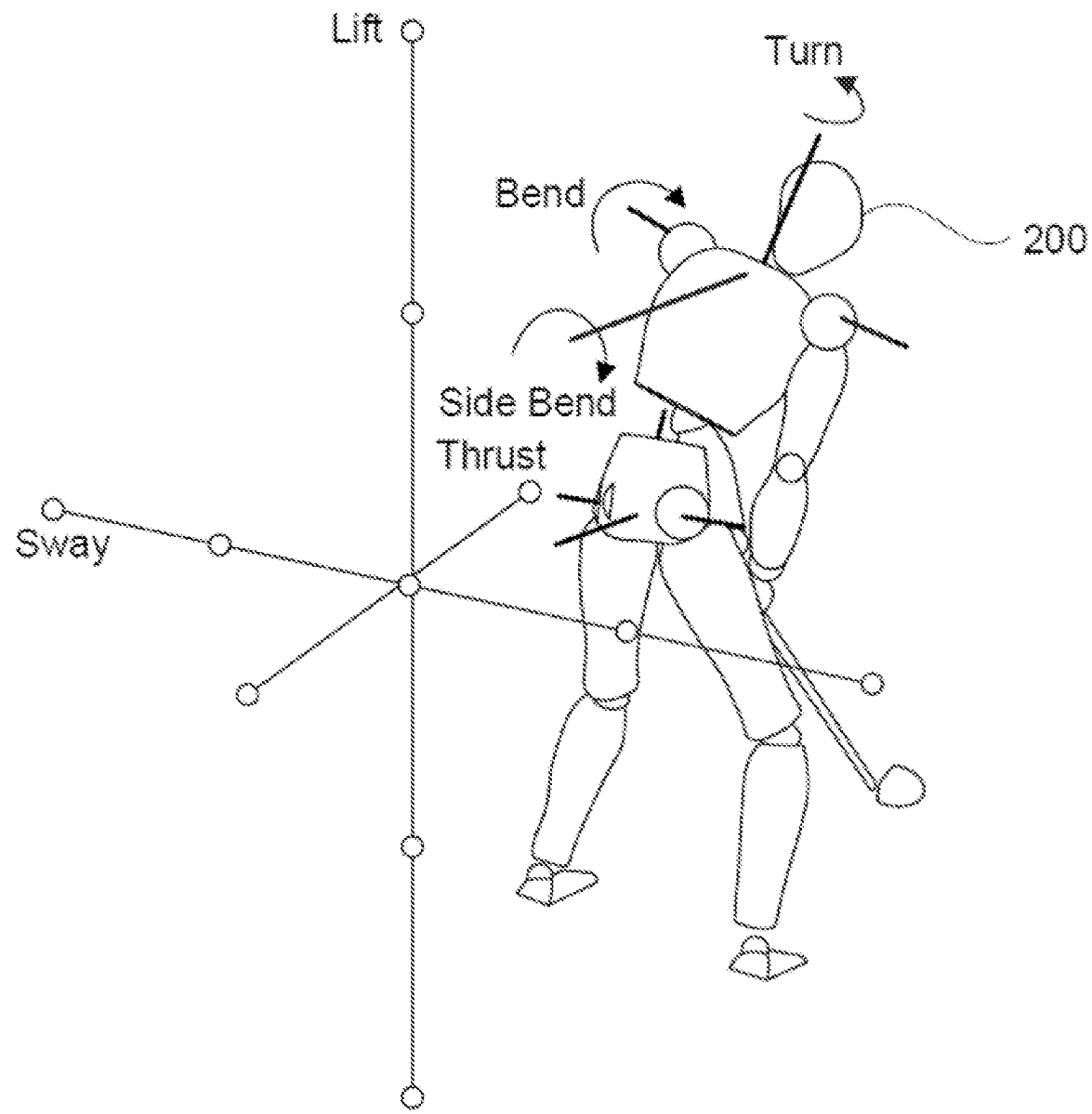
FIG. 2 illustrates 3D avatar generated by a biomechanical analytics computer system, in accordance with the embodiments disclosed herein.

Machine learning module 112 may determine the coordinates of the bounding box. For example, the bounding box may be determined based on objects identified in the image frame and/or based on similar images in the same domain during the ML training process. 3D avatar engine 114 may automatically generate a 3D avatar from images or video stored in analytics data store 122 (e.g., a single-viewpoint recording from one or more sensors 132, etc.). This may include detecting multiple joints through a 3D pose estimation. For example, a 3D pose estimation may produce a 3D pose that matches the spatial position of the depicted human (e.g., bending at the waist, twisting, etc.). An illustrative 3D avatar 200 is provided with FIG. 2.

3D avatar 200 may mimic human movement based on biomechanical limitations of the human body as well as human movement based on images and/or video received from user device 130 or sensors 132. 3D avatar 200 may be generated to comply with motion limitations that are reflective of the actual capabilities of the user. 3D avatar 200 may move along one or more three-dimensional planes, axes, or space, including an X-axis (e.g., swaying movement, etc.), Y-axis (e.g., lifting movement, etc.), or Z-axis (e.g., thrusting movement, etc.). The three-dimensional layout may correspond with a geometric layout, using the terms axes, space, and planes interchangeably. In the context of motion, "axis" or "axes" may be used since motion may be inherently one-dimensional along a direction. A combination of axes may be identified as well for a particular movement, including turning (e.g., X-axis and Z-axis, etc.), bending (e.g., Y-axis and Z-axis, etc.), and the like.

In some examples, the 3D pose estimation may correspond with a model-based generative method. For example, 3D avatar engine 114 may treat the human body as an articulated structure with a model that includes each human body part and the spatial relationship between adjacent parts. The model may remain in 3D to standardize limbs. For example, the perceived length of a limb in 2D can vary as the three-dimensional limb is projected into a 2D viewing plane, but the limb length in 3D can be constant relative to other limbs and their movements.

In some examples, the 3D pose estimation may correspond with a discriminative method or regression. After extracting features from the image, a mapping may be learned (e.g., via machine learning module 112, etc.) from the feature space to the pose space. Using the articulated structure of the human skeleton (e.g., stored in kinematic data store 120, etc.) the joint locations may be highly correlated and predictable based on the limitations of each limb/joint.

In some examples, the 3D pose estimation may predict a motion of objects in the context as well. For example, when a ball is hit, the trajectory of the ball may be mapped with the pose space performed by the avatar. The motion of other domain objects may correspond with the movement of the 3D avatar in conjunction with the limitations of the biomechanical analysis.

In some examples, 3D avatar engine 114 may detect multiple joints through a conversion of a 2D pose estimation into a 3D space and connecting those joints to assess kinematic parameters and sequences (e.g., motion trackers, etc.) relative to a specific domain.

For example, to determine the posture of an individual, the kinematic parameters of the joints connected to the torso may be measured and temporally tracked according to short-term degree of bend, lift, and thrust. The temporal tracking may be identified across frames as well as the kinematic sequence that is observed. The data may be statistically compared to kinematic data store 120 (e.g., available movements of joints and limbs, etc.) determine likely meanings of the movement. For example, a threshold amount of forward bend in the torso followed by a return to a vertical, no-bend posture may be determined to have the meaning of a "polite bow."

3D avatar engine 114 may generate a 3D avatar by tailoring the component structures of 3D avatars based on domain-specific criteria. The generation of specific criteria for domains, exceptions, and/or subdomains can enable the system to process information more efficiently. The component structures of 3D avatars may include body points that correspond with pose, movement, alignment, and other features that are related to the domain or activity.

For example, for some domains it may be desirable to track more points on the body than for others. For example, in the domain of baseball, it may be desirable to track what the hands are doing in some detail to accurately capture the nuances of pitching, throwing, catching, and batting motions. In contrast, in the domain of soccer activity, it may be desirable to track what the feet and head are doing in some detail to accurately capture the nuances of kicking and heading a ball, whereas the hands are generally not relevant. However, the system may provide for exceptions (or sub-domains). For example, in the soccer domain, the hands are generally not relevant to the action. An exception relates to the goalie or when a player is doing a throw in.

These exceptions or subdomains may be handled by the system by detecting context. For example, by detecting a player who is in the goal area with their back to the goal, the system can identify this object (person) as a goal tender and it may be desirable to track what the goal tender's hands are doing in some detail to accurately capture the nuances of goal tending. When a player is doing a throw-in from a sideline, the system may use context (e.g., the fact that a player has a ball and is outside the field of play and other items of context) identify this object (person) as a player doing a throw-in and it may be desirable to track what the player's hands are doing in some detail to accurately capture the nuances of the throw-in.

In some generic systems, the movement tracking body points may correspond with generic body movements. For example, with walking, the generic system may track the movement of a user's feet, knees, arms, and shoulders that may swing forward and backward when a person walks down the street. In the improved domain-specific system, the points on the body (e.g., corresponding with the watch list, etc.) may correspond with additional points that can effect the power, speed, efficiency, accuracy, and other magnitudes of the performed movement (e.g., the distance, accuracy, height of the baseball hit by the bat, the speed of the long distance runner, the height and distance of the hurdle jumper, etc.).

In some examples, the additional body points can be used to generate a 2D model prior to generating the 3D model. As discussed herein, machine learning module 112 may generate a 2D frame for each image frame. In some examples, each 2D frame may contain 2D coordinates for each body part or some subset thereof (e.g., the body parts or limbs that are moving in a particular context, etc.). Machine learning module 112 may collect the 2D frames and start streaming these frames to a 3D ML model.

3D avatar engine 114 may generate a 3D avatar by incorporating kinematic parameters and sequences so that the 3D avatar is biomechanically representative of the intended activity. This may include accessing kinematic data store 120 to identify available human movements for the activity and associating the images/video from analytics data store 122 (e.g., using human movement module 110, etc.).

3D avatar engine 114 may apply recorded 3D motion data from a user to an avatar for various purposes. Some non-limiting example uses include the following: i) playback of the user's own performances (e.g., their own golf swing) to enable the user to watch their own performance (e.g., golf swing) from any angle so they can see what they may be doing wrong; ii) apply one user's recorded kinematic parameter sequence to another avatar, to enable a first user (e.g., a golf coach, whose swing is recorded) to model performances for a second user (the student, whose avatar is then animated using the coach's kinematic parameter sequence).

In another example, 3D avatar engine 114 may apply recorded 3D motion data from a reference video to an avatar. For example, human movement module 110 can derive a kinematic parameter sequence from a video of a reference performance of an action (e.g., a golf professional's tee shot on a 350 yard hole that breaks to the left). 3D avatar engine 114 can apply this derived kinematic parameter sequence to the user's avatar (e.g., to show the user how they should tee off on that hole).

In some examples, additional sensor data may be incorporated with 3D avatar 200 at runtime to improve the accuracy or visual appearance of 3D avatar 200, or to incorporate additional kinematic parameters/sequences (e.g., 3D motion, etc.). For example, the 3D avatar 200 can play back the user's own performances (e.g., their own golf swing) to enable the user to watch their own performance (e.g., golf swing) from any angle so they can see what they may be doing wrong. In another example, the 3D avatar 200 can perform human movement in the user's recorded kinematic parameter sequence. The movement can be used to generate a second 3D avatar to enable a first user (e.g., a golf coach, whose swing is recorded) model performances for a second user (e.g., the student, whose avatar is then animated using the coach's kinematic parameter sequence).

In some examples, data may be augmented. For example, previously recorded actions may be provided as input to the machine learning (ML) model for training. The previously recorded actions may be domain-specific, such that the ML model may be trained on the previously recorded actions to correlate how kinematic parameters/sequences can generate different results. The trained ML model may be used to analyze the user's input from user device 130 or sensors 132 and generate a motion sequence for 3D avatar 200 as output.

In some examples, performances may be modeled by 3D avatar 200 by applying kinematic parameter sequences or changes to ranges of motion in conjunction with physical simulation techniques (e.g., physics engines). For example, this may include altering values in the kinematic parameter sequence to simulate changes in performance of an action and the results of those changes (e.g., increasing the user's swing speed by 10% to simulate how far they could drive the ball). In some examples, this may include altering range of motion limitations for 3D avatar 200 to simulate reduced performance under injury or, in physical therapy scenarios, improvements to performance that could be expected with healing from injury.

In some examples, performances may be modeled by 3D avatar 200 by applying kinematic parameter sequences or changes to ranges of motion to help assess a user's change in performance over time. This may be used to gauge improvement vs. different training regimens or techniques, gauge performance loss (when to bench a player, either temporarily due to fatigue, semi-permanently due to injury, or permanently because they are unable to compete), compare measurements of motion trackers against experts or other users and ranking the user's performance against such experts or other users based on closest measurements of kinematic parameters and sequences against a target measurement or outcome (e.g. which MLB player really had the "sweetest swing" of all time?).

In some examples, performances may be modeled or simulated by 3D avatar 200 by applying kinematic parameter sequences with different context objects. For example, the simulation may be altered to show what the user could do, using the user's own motions, if they had different golf shoes, different clubs, a low-drag swimsuit, etc.

3D avatar engine 114 may generate an optimal or best avatar corresponding with a body type. For example, the system may generate a generic avatar for a subset of body types (e.g., nine general body types, etc.), age ranges, or capability thresholds. Each generic avatar may correspond with kinematic parameter sequence data that can perform optimally for that body type. For example, for users taller than six-foot, five-inches weighing less than 150 pounds, the rotation of the wrist may correspond with a first value and for users taller than six-foot, five-inches weighing between 151-200 pounds, the rotation of the wrist may correspond with a second value and the rotation of the left knee may correspond with a third value. In another example, the avatar corresponding with users over sixty-five may have a limited range of motion.

3D avatar engine 114 may generate an optimal or best avatar corresponding with a user. In some examples, the system may generate an specialized avatar for a particular user based on similar body types or a pro user with a similar body type. In other examples, the system may generate an specialized avatar for a particular user based on historical data from the user (e.g., your best swing in 2021, etc.).

3D avatar engine 114 may combine 3D avatar renderings with recorded video. For example, 3D avatar engine 114 may overlay a time-synchronized 3D avatar rendering (e.g., 3D avatar 200) with a video recording of a user's performance. This may allow the user to compare a current performance illustrated by 3D avatar 200 with a past performance (e.g., to compare this swing versus my best swing, etc.). In some examples, 3D avatar engine 114 may overlay a time-synchronized 3D avatar rendering with a video recording of a reference performance (e.g., to compare my best swing to a golf professional, etc.). In some examples, 3D avatar engine 114 may automatically detect and highlight differences between two performances.

3D avatar engine 114 may blend kinematic parameter sequence data from multiple sources to generate a fused avatar and/or kinematic parameter sequence. In some examples, 3D avatar engine 114 may combine multiple kinematic parameter sequences from the same user to determine an average performance for that user (e.g., "Your typical tee shot looks like this"). In some examples, 3D avatar engine 114 may combine kinematic parameter sequences from multiple users to determine an average performance for some action in general. In some examples, 3D avatar engine 114 may combine portions of kinematic parameter sequences from selected users to create a hybrid (e.g., tee-shot that corresponds with Tiger Woods from the waist up and Jack Nicklaus from the waist down).

3D avatar engine 114 may blend kinematic parameter sequence data from multiple sources to derive generalized insights. This may include a repetitive position or motion of a body part that is identified in a threshold number of image frames. This may include generating a generalized 3D avatar 200 relating to various factors affecting performance.

3D avatar engine 114 may generate 3D avatar 200 as a hologram. This may include applying 3D avatar technology to the hologram, virtual reality (VR), augmented reality (AR), and/or mixed-reality (MR) space. In some examples, 3D avatar engine 114 may incorporate 3D avatars into virtual reality environments (e.g., your coach's avatar can be with you at a VR Pebble Beach to demonstrate how to approach each shot). In some examples, 3D avatar engine 114 may incorporate 3D avatars into augmented reality environments (e.g., bring Tiger Woods' avatar as a hologram golfing partner to play against, while the user plays at Pebble Beach in real life). In some examples, 3D avatar engine 114 may incorporate 3D avatars as part of a mixed-reality experience (e.g., one in which the experience is an arbitrary combination of virtual and real objects and environments).

3D avatar engine 114 may transmit 3D avatar 200 to a user device. For example, 3D avatar engine 114 may send a user's performance of an action to be viewed or replayed by someone else in another location (e.g., sending your recordings to your coach).

3D avatar engine 114 may initiate a simulation. For example, 3D avatar engine 114 may initiate a competition between a human user (in real life) and a 3D avatar of the human user in VR/AR/MR (e.g., you vs. your best performance). In another example, 3D avatar engine 114 may initiate a competition between a human user against other avatars (e.g., run the 400 meters vs. Usain Bolt).

3D avatar engine 114 may use one or more 3D avatars to project a human user or a particular performance of an action into a different environment (e.g., see yourself play soccer in Wembly Stadium). In other examples, 3D avatar engine 114 may use 3D avatars for live or recorded distant messaging (e.g., appear as a 3D avatar in real time a meeting in a different city, or appear as a recorded message sent to a soldier on deployment sending an avatar message back home).

3D avatar engine 114 may communicate with machine learning module 112 to determine one or more relationships between the context of the action or other environmental factors (e.g. temperature, humidity, wind speed and direction), the biomechanical data, and the determined outcome of the action. The relationships between data and ML output may be provided as feedback to the user interface of user device 130. In some examples, user-provided feedback on their swing thoughts, psychological state, breathing, biomechanical data (e.g., leading up to and in the moment of the execution of the action) may be added as input to the ML model to determine the relationship between the context data, user provided data, and the outcome.

Watch list engine 116 may generate a watch list and/or motion tracker. The watch list may correspond with a list of measurable attributes of a performance that the system is programmed to monitor or watch for (e.g., in images or video from user device 130 or sensors 132, etc.). For example, the watch list may include a list of attributes that the system may measure (e.g., throughout the performance of the action). A motion tracker may include the sequence of measurements or actual values that are generated throughout the performance.

Watch list engine 116 may create one or more watch lists relative to each domain. This may include weighting which kinematic parameters and sequences are the most relevant for analysis within that domain. As one example, the analysis may be used to aid in fault-correction. As a result, the weighting of which kinematic parameters and sequences are the most relevant for analysis within that domain may take into account the common faults within the domain.

Watch list engine 116 may incorporate the watch lists and motion trackers with 3D avatars. Motion trackers track the movement of domain-specific kinematic parameters and sequences. The movement may include, for example, sway, thrust, and lift as well as the rotational movement of each kinematic parameter. This may help track human-like movement including bend, turn, rotation velocity, rotational angles, rotational space, or rotational sequence of kinematic parameters. Watch lists may include a weighting of which kinematic parameters and sequences are the most relevant for fault-correction within the domain as measured against a reference ideal for each respective motion tracker. The watch list may also include a ranking or a relative ranking of importance for each watch list item relevant to the domain.

Watch list engine 116 may incorporate additional information with 3D avatar 200. In some examples, the watch list can include temporal measurements to track time-related concepts such as tempo, beat, and rhythm. The temporal measurements can be incorporated with 3D avatar 200 to further correspond with human movement.

Watch list engine 116 may generate a dynamic watch list. Dynamic watch lists may be created dynamically through a user interface at user device 130 by selecting (e.g., by selecting, tapping on, etc.) an actor's components and/or on context objects. Once the actor's components and/or on context objects are selected, one or more motion trackers may determine the kinematic parameters (e.g., position, velocity, acceleration, etc.) of those components and context objects, individually or in groups. The motion trackers may form a dynamic watch list as a list of things the system is watching in order to assess a performance of an action. Watch lists can enable tracking of, and analytics on, the kinematic parameters for all indicated components throughout the actor's performance of some action. In some examples, the actor's performance may be compared with a stored performance (e.g., viewing a trace of the line between the user's elbows, wrists, and the head of a golf club throughout a golf swing, etc.).

Object fitting engine 118 is configured to analyze object components (e.g., a golf club, skis, shaft length, head size, grips, balls, etc.). For example, in the sport of golf, the object components of a golf club may comprise a shaft angle (e.g., face on and down the line), club head speed, club face angle, attack angle, swing direction, or club path. Each of these object components may correspond with a weight, angle, size, or other measurement value.

Object fitting engine 118 is also configured to analyze movements associated with each of the object components. For example, the KPs associated with a user, like sway, thrust, lift, or various velocities, may be determined at positions or throughout the full activity to determine the best outcome. The best outcome may correspond with one or more optimal ranges for each KP (e.g., based on a model) in conjunction with object component measurements.

The object components may be correlated to an outcome. For example, an object with a weight above a first threshold value (e.g., a club head weighing more than 5 ounces) may correspond with a distance above a second threshold value (e.g., a ball hit to travel more than 400 yards). In another example, club type may correspond with golfer characteristics (gender, height, type, etc.).

Object fitting engine 118 and machine learning module 112 may determine the correlation between a set of inputs (e.g., the object components and user movements) and the outcome (e.g., performance of the user's movement, consistency, distance, etc.). The training may tune the weights of the machine learning model to correlate the user movement with the object components and the outcomes over time.

Kinematic data store 120 may comprise a plurality of the available human movements that can be performed by human users. These limitations may correspond with the movement of joints and limbs in the human body and identify a range of motion.

Analytics data store 122 may comprise images of human users captured by sensors 132. In some examples, the data may also comprise interactions and/or feedback from human users as provided to a user device 130 and transmitted via network 140 to biomechanical analytics computer system 102. In some examples, the feedback may include a comment from a user or coach (e.g., voice or text) or comments on a session from other users (e.g., a session corresponds with a plurality of actions associated with a user during a time frame, etc.). An illustrative user interface providing information from one or more sessions is provided with FIG. 17.

Avatar data store 124 may comprise 3D avatars that are generated by the system. The 3D avatars may simulate human movement based on machine readable instructions that correspond with biomechanical limitations determined by the system. The avatar data store 124 may also comprise objects (defined by the object components and measurements determined by data processing module 108 and human movement module 110) that can be illustrated as being used by the avatars.

User device(s) 130 may comprise one or more processors, machine-readable storage media, interfaces, and/or sensors. For example, the interface may display information (e.g., generated and transmitted by biomechanical analytics computer system 102, etc.) and may receive feedback from the user through interactions with the interface. The feedback may be transmitted to biomechanical analytics computer system 102 and processed by data processing module 108.

Sensor(s) 132 may comprise one or more cameras for capturing images and video of human movement. The human movement may include bending (e.g., at the waist, forward and backward, etc.), lifting (e.g., up and down movement, etc.), swaying (e.g., side to side movement, etc.), and various other movements that may be performed. The images and video may be transmitted to biomechanical analytics computer system 102 and processed by data processing module 108.

Sensor(s) 132 may comprise accelerometers, stress or strain gauges, or other sensors that can measure motion or activity. These sensor values can be helpful for measuring kinematic parameters that may be difficult to assess visually (e.g., through camera images, etc.). Network 140 may comprise a two-way communication network for transmitting signals that carry digital data streams representing various types of information.

Figure 3:
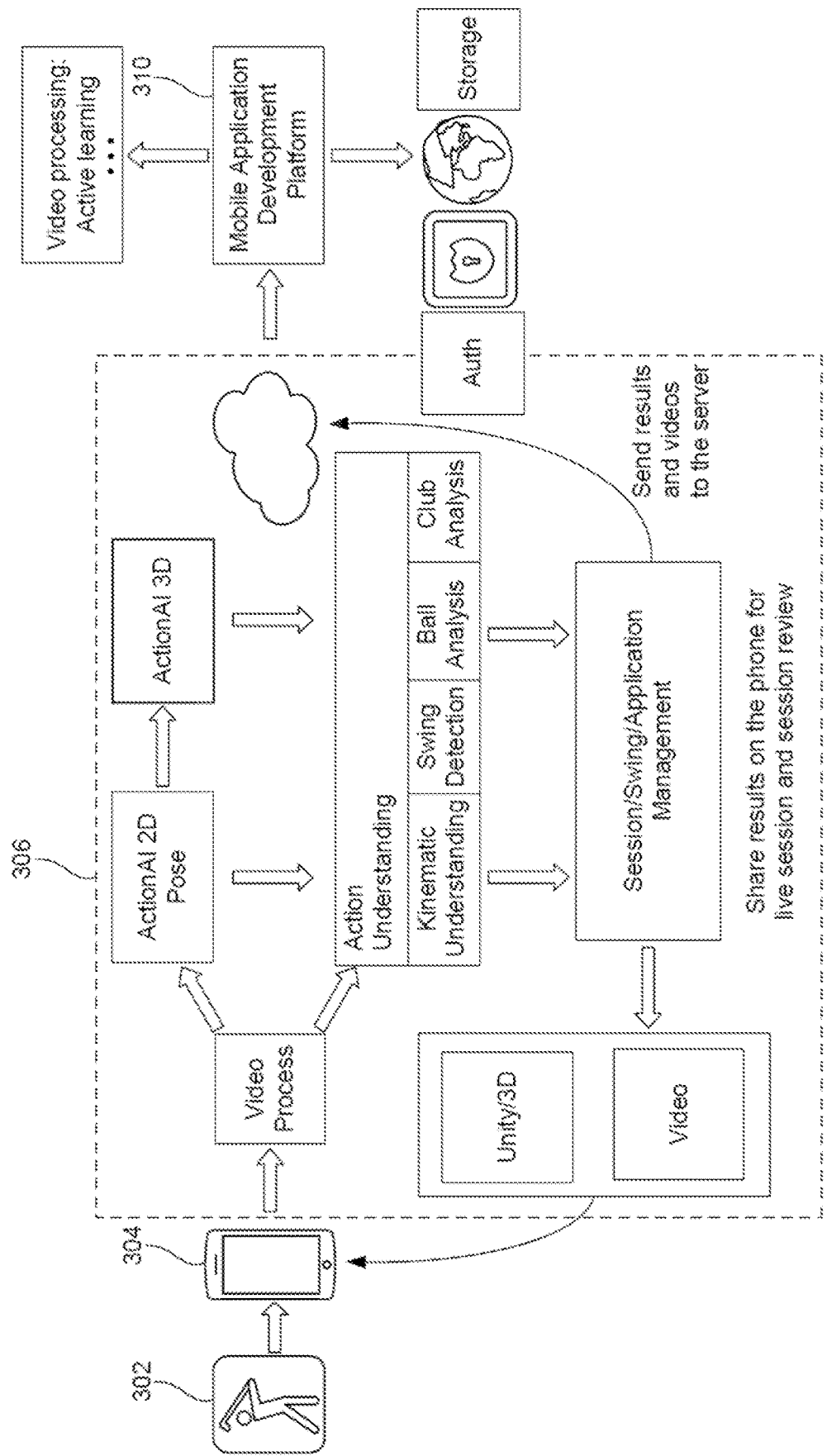
FIG. 3 is an illustrative process for determining 3D human movement, in accordance with the embodiments disclosed herein.

FIG. 3 is an illustrative process for determining 3D human movement, in accordance with the embodiments disclosed herein. In the illustrative process, an actor's performance 302 may be recorded by user device 304 and transmitted to biomechanical analytics computer system 306. The performance may be processed and analyzed, and a 3D avatar may be generated. User device 304 and biomechanical analytics computer system 306 may be similar to one or more user devices 130 and biomechanical analytics computer system 102 illustrated in FIG. 1.

A user may operate user device 304 to access a registration or sign-up portal. A user profile may be generated and stored with the system. User device 304 may access a login network document to provide user credentials and/or password to gain access to the system.

User device 304 may start a new recording of the action comprising the human movement. The camera may be configured to record the action and to help improve 2D and 3D accuracies. In some examples, the system may determine camera characteristics such as type of the camera, focal length, angle, and/or tilt using a Software Development Kit (SDK) and/or Application Programming Interface (API) to determine the camera characteristics from the user device. In some examples, a camera setup or other instructional video may be provided to the human user to help setup the camera.

In some examples, user device 304 may execute a camera application to capture a set of different movements. For example, the camera application may determine a magnitude of an object within an image frame. This data may be used by the camera application (or transmitted to biomechanical analytics computer system 102) to correct balance, shutter speed, light, focal length, etc. to captured objects.

In some examples, the camera may start recording automatically once the camera set-up is completed. The camera may record continuously. In some examples, user device 304 may keep only store frames from the start of a "real" action (as detected by user device 304) to the end of action. Practice actions or performances may be discarded. A "real" action may be defined as when contact with the ball/equipment has been made or when music starts.

In some examples, the camera application may be optimized to capture objects that are recognized in the particular context. For example, objects in the image frame may be compared with a data store of known objects, including various types of sports equipment, accessories, and the like. When an object is identified, the corresponding context may be associated with the image frame as including the equipment or accessory corresponding with the domain/activity.

In some examples, the camera measurements may be used to generate 3D model coordinates. For example, the known distance between a user and a camera may be used to determine a distance between two shoulders on a user or the length of a golf club. This information may be transmitted to the artificial intelligence (AI) library or data store to compute the kinematic parameters.

Human characteristics may be determined as well. Human characteristics may include body measurements (e.g., height, weight, shoulder size, pelvis size, etc.) to improve 2D and 3D accuracies. To determine the body measurements, user device 304 may request the information (e.g., what is your height, etc.). In some examples, the body measurements may be determined programmatically using high definition photos and computer vision algorithms (e.g., using a vanishing point calculation, using a reference height, etc.). In some examples, a bounding box may be determined around the human user before the human movement is recorded. The system may provide feedback to the human user via user device 304 if bounding box is in the view. If it is not, the feedback may include instructions where to move so that the bounding box is in view (e.g., move left, move right, step backward or forward, etc.).

User device 304 (or biomechanical analytics computer system 306) may update the user interface with a confirmation that user device 304 is ready to record and/or instruction for the user to begin their performance of an action (e.g., jump, swing, juggle, etc.). The user interface may give confirmation (e.g., that the recording was successful) after every performance when the performance is captured (e.g., audio and visual).

In some examples, the user may provide visual or audible information about the action. For example, a user may confirm with hand gesture whether the swing was good, bad, or average. The hand gesture may be captured in an image frame at user device 304 and provided as input to a trained machine learning model to determine the command/action corresponding with the gesture.

In some examples, user device 304 may register the action data based on user confirmation (e.g., the hand gesture is compared with a predetermined movement identifying a confirmation within a threshold value, etc.). In some examples, the registration of the action data may include transmitting the action data to biomechanical analytics computer system 306.

User device 304 may receive one or more interactions from the user. The interactions may select one or more components for tracking, including clicking or tapping on pictures, video, or other representations of an actor or context object, or selecting components or context objects from lists presented to the user. In some examples, the interactions may include selecting components or context objects through natural language requests (e.g., "watch my elbows, wrists, and the club head").

Figure 4:
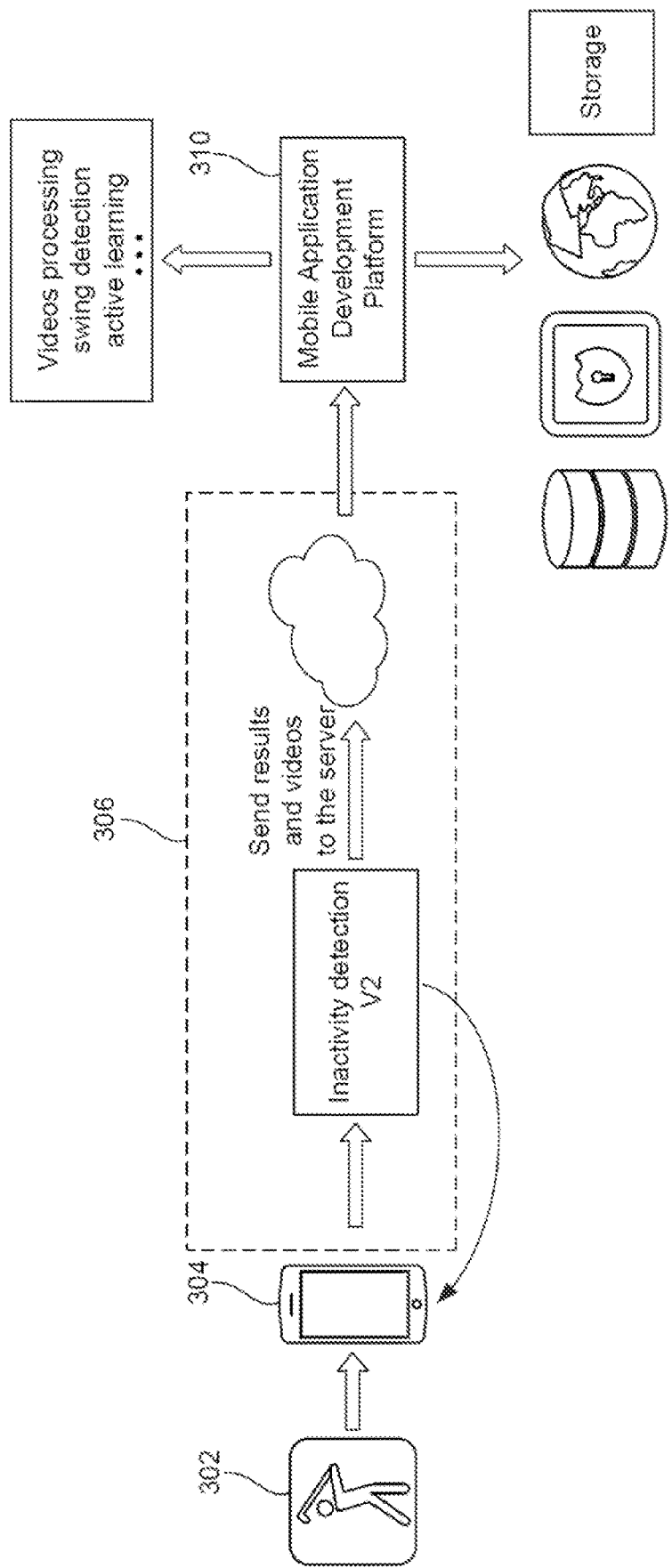
FIG. 4 is an illustrative process for interacting with a user device, in accordance with the embodiments disclosed herein.

In some examples, user continues to perform the action (e.g., swing). After each performance, a user confirmation may be provided to user device 304. The action may be ended when the user moves (e.g., walks, etc.) out the camera scope. User device 304 may stop capturing once user leaves the screen or other inactivity is identified, as illustrated with FIG. 4. In some examples, rather than a live action video, the action may be performed in a recorded or existing video (e.g., from user device data store, from an online data store accessible by a uniform resource location (URL), etc.). The swing analysis may be transmitted to user device 304 when user returns to viewing user device 304.

In some examples, the user may be asked to align the golf ball with a white circle on the screen. This can determine the distance of the camera from the ball. There may also be a white line to help adjust the tilt of the camera to the correct level. Voice (text to speech vs recorded) prompts may guide the user to adjust the camera or move left, right, closer or away until a "ready" textual or audio signal. From that field of view, the camera parameters may automatically be determined, including the zoom setting, shutter speed, and ISO parameters (e.g., the camera sensor's sensitivity to light).

Biomechanical analytics computer system 306 may group selected components into a watch list for subsequent use or analysis. For example, the system may automatically determine a set of components constituting a watch list through comparison of a user's performance of an action to a recording of an example performance. The watch list may be authored through programming and editing tools, such that the watch list can be saved, loaded, built into or imported into applications, selected and activated by users, and the like.

The watch list may be used to record the kinematic parameters (e.g., positions, angles, velocities, etc.) of the components in the watch list during the performance of the action. The analysis of the performance may use the recorded kinematic parameters, for example, by measuring quantities of interest of the performance (e.g. speed of the club head), generating visualizations of the performance (e.g. a graph of club-head-speed vs. time), generating graphical overlays representing aspects of the performance, to be displayed over or along with images, video recordings, or digital renderings of the performance, and/or automatically determining best or worst performances by comparing a kinematic parameter sequence to a reference sequence or other prior sequences.

Information may be provided back to user device 302 based on the results of watch list analysis. For example, the information may include advertisements, coupons, or other commercial opportunities such as purchase recommendations. As an illustration, if analysis of the user's performance shows that a certain kinematic parameter (e.g., a foot position, etc.) moves beyond a desirable range, the advertisement may include golf shoes with cleats for better grip. In another example, the information may include recommendations for corrective actions from analysis of the recorded kinematic parameters. As an illustration, the system may generate a suggestion on how the user should alter their performance to bring their kinematic parameters into better agreement with reference or idealized kinematic parameters for that action (e.g., within a threshold value between the recorded action and the parameters, etc.). In another illustration, the system may observe general performance degradation that indicates the user should rest or get food/water.

Figure 6:
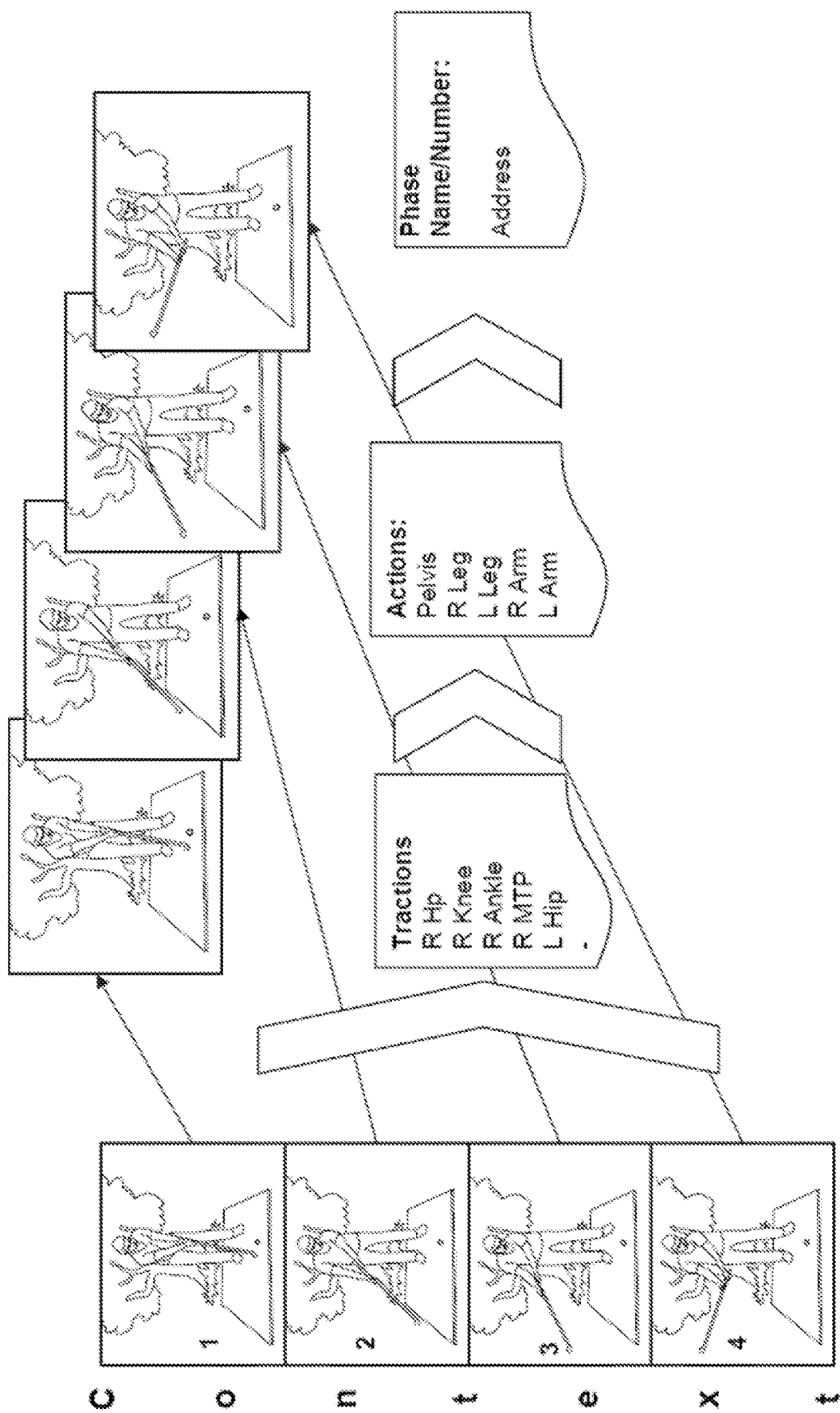
FIG. 6 illustrates a process for determining human movement, in accordance with the embodiments disclosed herein.

The suggestions may correspond with the kinematic parameters (e.g., positions, angles, velocities, etc.) of the components in the watch list during the performance of an action. For example, the positions of the action for golf may include a top of the swing, an end of the swing, tracking movements of the user's wrist, a golf club position at particular swing location, and the like, as illustrated in FIG. 6. The suggestions may offer changes to the positions identified for the domain.

In some examples, the suggestions may correspond with changing inputs to data processing module 108. The suggestions may correspond with adjusting various camera characteristics and camera positions for the image or video data at user device 304 including, but not limited to, angle, tilt, or focal length. In some examples, different camera angles may be suggested based on swing location (e.g., to see the changes at the most visible angle, etc.). In some examples, additional sensors may be recommended to capture data in addition to image date (e.g., magnitude, speed, direction, etc. using a gyroscope).

In some examples, biomechanical analytics computer system 306 may correlate the results of watch list analysis with additional context data to affect what information is presented to the user (e.g., correlating the likely detection of fatigue in the user with GPS information to surface advertisements for nearby restaurants or cafes where the user could rest and obtain food/drink before their next round of golf). Categories of context information can include, for example, historical records from the user's prior performances (e.g., in golf, the results of the user's previous shot, their prior performance on this same hole, etc.), environmental data like geographic location data (e.g., where the user is at the time of the analysis pursuant to presenting information, etc.), nearby objects or terrain features (e.g., in golf, trees, water hazards, sand traps, pin distance/direction/ elevation, local topography, other players, golf carts, etc.), type and intensity of ambient or nearby noises, weather conditions (e.g., wind direction, wind speed, temperature, humidity, precipitation, sun angles, cloud cover, etc.), user's physiological state (e.g., heart rate, respiration, temperature, perspiration, etc.), or other information applicable to the action and/or the user's situation. Other categories may include user-generated context, comprising a self-reported mental state, determined information about the user, or potentially arbitrary information (e.g., in golf, "swing thoughts" such as "in this swing, I am focusing on my left knee flexion in the start of the downswing"; or pre-shot routines such as how many steps the user took to step into the shot, wait time before starting the swing, number of practice swings, etc.). Other categories may include domain-specific information in other categories that are context specific. For example, in golf, the par rating for the hole, which is a domain-specific piece of environmental/geographic data, or an opponent's or playing partner's current score on the hole or in the round. The watch lists and/or motion trackers can be pre-authored, created at runtime through a user interface, loaded, saved, etc.

User device 304 may access an analyzed session, human movement, action, or other information generated by biomechanical analytics computer system 306 and present the information to the user interface of user device 304. For example, to find an analyzed session, the user may access a "Swings" tab and default land on the "Sessions" tab. The user may review the list of sessions (e.g., with the most recent session on top, etc.) through a search feature. The search feature may include a filter or sort feature to organize the sessions or other information.

In some examples, user device 304 may access a 3D avatar that can switch between 2D (e.g., image frames, video, etc.) and suggestions on improving actions. For example, the user interface may be updated to show functions of action tips (e.g., "swing genius" on or off), 2D/3D mode, and video play controls. The interface may be updated with a 3D avatar analysis, 2D avatar, point of view (POV), change 2D to 3D, or other information. In some examples, user device 304 may create a watch list by first identifying a reference action in 2D or 3D and then identifying joints or other human movements.

The analyzed information may be provided back to a machine learning model for post analysis training. For example, the user may generate the watchlist item from a previous session stored in a data store or a current action provided within a session. The watchlist item and/or action may be provided to the machine learning model. In another example, the user may set up the camera or other sensor and start recording. When the user is practicing the action and not providing a confirmation, the actions may not be uploaded to biomechanical analytics computer system 306. When the user is practicing the action and providing a confirmation (e.g., thumbs up, etc.), the actions may be uploaded to biomechanical analytics computer system 306. Once analyzed, biomechanical analytics computer system 306 may transmit a summary of the analysis to show progress, areas of improvement, whether the user did well with the watchlist item or not, or other information. After each shot, the user interface may be updated to provide the summary (e.g., watchlist item 1, 2, 3 at 40%, next shot should be 50%, etc.). After a threshold number of actions (e.g., after 5 actions), when the user is not improving a threshold value (e.g., not twisting 5% more, etc.), the system may suggest the user review additional information (e.g., watch an instructional drill video, etc.) or perform particular actions (e.g. do a practice drill).

User device 304 may provide access to historical actions, statistics, and determined information for the user's actions or a different user's actions (e.g., expert user, friend, model action, etc.). The information may be provided through the user interface.

In some examples, user device 304 may provide access to action statistics. The statistics screen may automatically disappear when the user starts swinging. The user may hear the key statistics in a text to speech prompt. This may also signal that the action was successfully captured. The audio prompt may be cut short if the user starts performing the action again. If the user is out of frame in their subsequent actions, user device 304 may use voice prompts to direct them back into the frame. The user may have the option to indicate their satisfaction with the shot with hand signals or voice command after every action. This may be used in the session summary and tied to the user's analytics (e.g., action score and/or quality, watchlist item score, consecutive good performances, etc.).

Mobile application development platform 310 may determine and/or store a user's interactions and session information with biomechanical analytics computer system 306. In some examples, mobile application development platform 310 may determine and/or store raw data like videos, images, environment conditions, and the like. The data may be received by biomechanical analytics computer system 306 data for various analytics reports or other processing.

FIG. 5 is an illustrative human movement, in accordance with the embodiments disclosed herein. In the illustration, a human movement is performed relating to a sport of golf, although any context may be applicable. The human user may be centered in an image frame (e.g., through feedback from the registration and setup process, etc.) and the user device may record one or more image or video frames of the human movement.

In some examples, the user may register with the system. This may include determining one or more objects in the image frame to identify the context/domain of the activity, determining the distance between the user and the camera using a known item measurement (e.g., placing a golf ball between the user's feet and using that measurement to determine measurements for the rest of the body, etc.), or other human characteristics (e.g., questioning the user on their height, weight, shoulder size, etc.).

The video processing may occur at user device 304, biomechanical analytics computer system 306, or a hybrid approach. In the hybrid approach, user device 304 may record the video and biomechanical analytics computer system 306 may process video (e.g., if the network connection is faster than a threshold value to permit streaming media with minimal delay, etc.). Biomechanical analytics computer system 306 may store all generated and raw data, which can be used for improving the system, generating analytics, and providing information to the user about past sessions and actions.

FIG. 6 illustrates a process for determining human movement, in accordance with the embodiments disclosed herein. In the illustration, the image frames are analyzed through the progression of the human movement. A context or domain may be determined through an image analysis process. The image frames may be separated into a set of movements and each movement in the set of movements may be compared to determine which body parts are participating in the human movement.

The image frames may be captured in a predetermined time interval (e.g., every half-second, every 10 milliseconds, etc.). The sensor(s) used to capture the action may be triggered along the time interval. This may include visual characteristics of the image captured by a camera, motion or magnitude values captured by a motion sensor (e.g., to determine speed, direction, etc.), or other values described throughout the disclosure. As illustrated, four images are captured to determine the context of the action, including four different positions of a swing in the activity/domain of golf.

Figure 7:
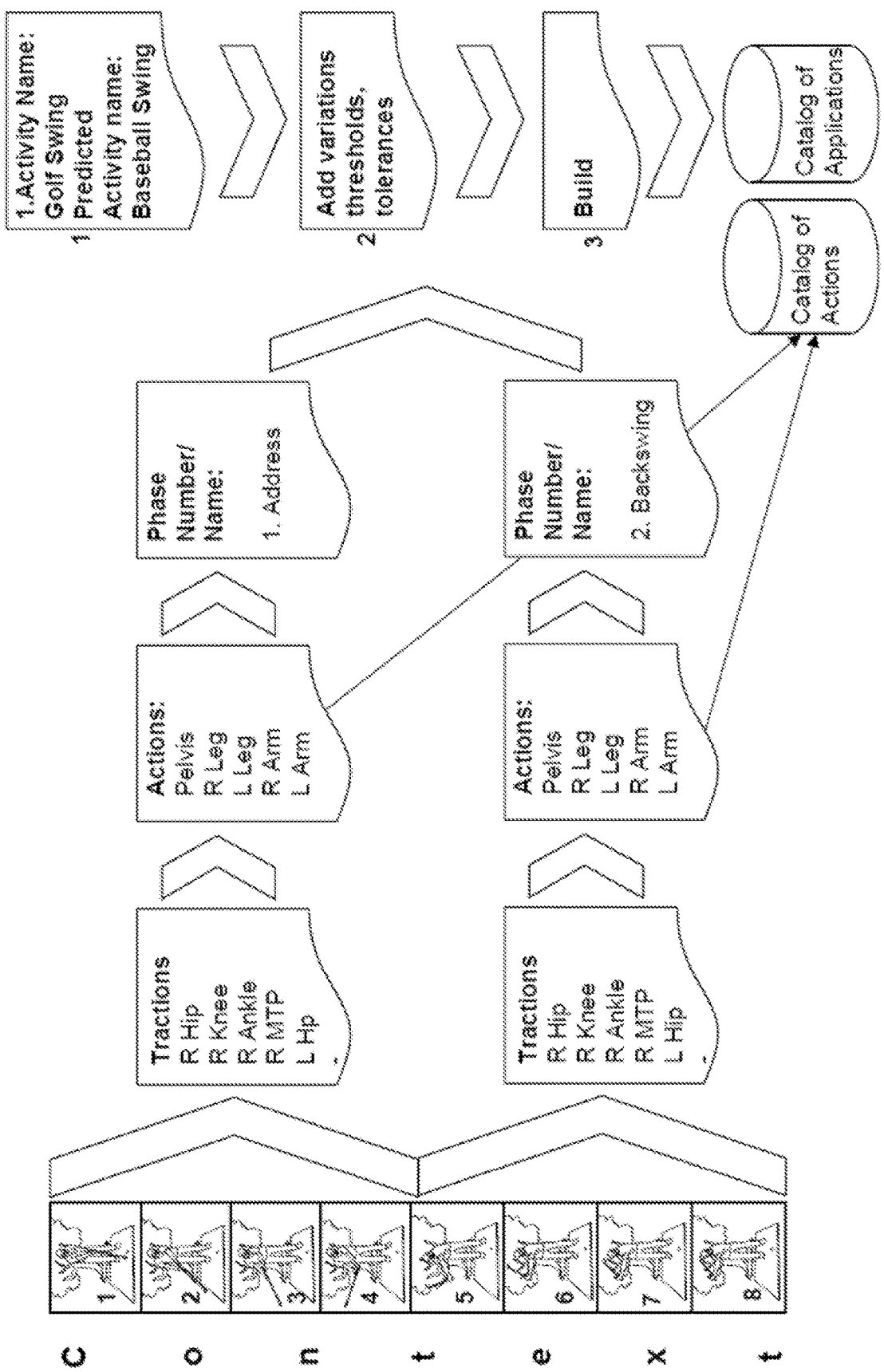
FIG. 7 illustrates a process for determining human movement in a particular context, in accordance with the embodiments disclosed herein.

FIG. 7 illustrates a process for determining human movement in a particular context, in accordance with the embodiments disclosed herein. In the illustration, each movement in the set of movements is compared with a pre-determined human movement stored with biomechanical analytics computer system 306. For example, the system may measure the human movement such as bending at the waist (forward and back), lifting (up and down movement) and sway (side to side movement) to detect multiple joints through 3D pose estimation. From this, biomechanical analytics computer system 306 can automatically generate 3D avatars of the actor from a single-viewpoint recording and detect multiple joints through 3D pose estimation, or the conversion of a 2D pose estimation into a 3D space.

Figure 8:
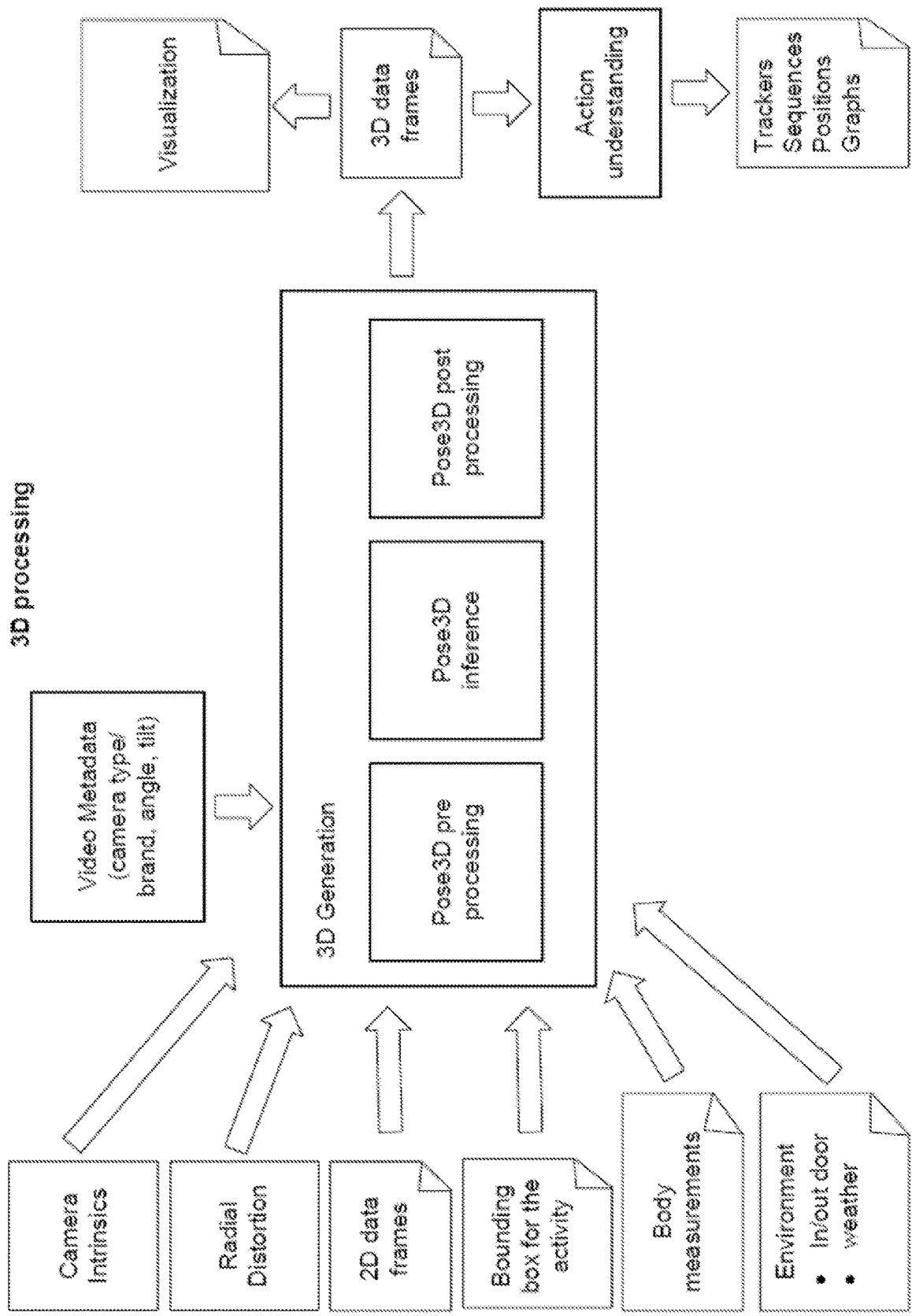
FIG. 8 provides illustrative 3D processing, in accordance with the embodiments disclosed herein.

FIG. 8 provides illustrative 3D processing, in accordance with the embodiments disclosed herein. In the illustration, data points are received from various sources, including video metadata (e.g., camera type, camera brand, angle, tilt, etc.), camera intrinsic details, radial distortion 2D data frames, bounding box for the activity, body measurements, and/or environmental data.

In some examples, the human movement is determined (e.g., golf swing) and various other human movements in a similar context can be compared. The origin of the other human movements can include, for example, various golf videos, the watch lists, context information, and the like. These similar human movements can be compared to generate a 2D post estimation in a 3D space, or a 3D avatar performing a representation of the human movement. In some examples, the kinematic parameter sequences from each analyzed human movement may combine portions of kinematic parameter sequences from selected users to create a hybrid (e.g., tee-shot that corresponds with Tiger Woods from the waist up and Jack Nicklaus from the waist down) or from the same user to determine an average performance for that user (e.g., "Your typical tee shot looks like this").

In some examples, once the context and image frames are processed and analyzed, the activity and/or context may be determined (e.g., golf swing). If the activity can be identified, the user interface at user device 304 may be updated with relevant information. If the activity cannot be identified, further analysis of the activity may be performed.

The 3D generation process may include pre-processing, inference, and/or post-processing. For example, the data pre-processing can include the data cleansing process performed by data processing module 108. Some examples for data pre-processing includes outlier detection, missing value treatments, and removal of the unwanted or noisy data. In some examples, post-processing may comprise real-time 3D rendering to generate the 3D avatar and/or additional effects (e.g., domain object, environment data, etc.).

The 3D generation process may generate one or more 3D data frames. For example, the 3D avatar may be adjusted into a 3D movement that are limited by biomechanical data. Each movement may be stored as a 3D data frame.

In some examples, the 3D avatar movement in 3D data frames can generate a visualization of human movement. For example, a sequence of KP and/or coordinates of the 3D avatar may be provided to an open source software application. The open source software application may generate an animation that the 3D avatar may follow to follow with the sequence of KP and/or coordinates.

In some examples, the 3D avatar movement in 3D data frames can generate an action understanding of human movement. For example, the 3D image frames may be correlated as forming an activity for the domain. The action understanding may correspond with recognizing several individual movements as belonging to one action.

The action understanding may provide input data for motion trackers, sequences, positions, graphs, or other information. In some examples, the identified action may be compared with an ideal action or some other reference.

Figure 9:
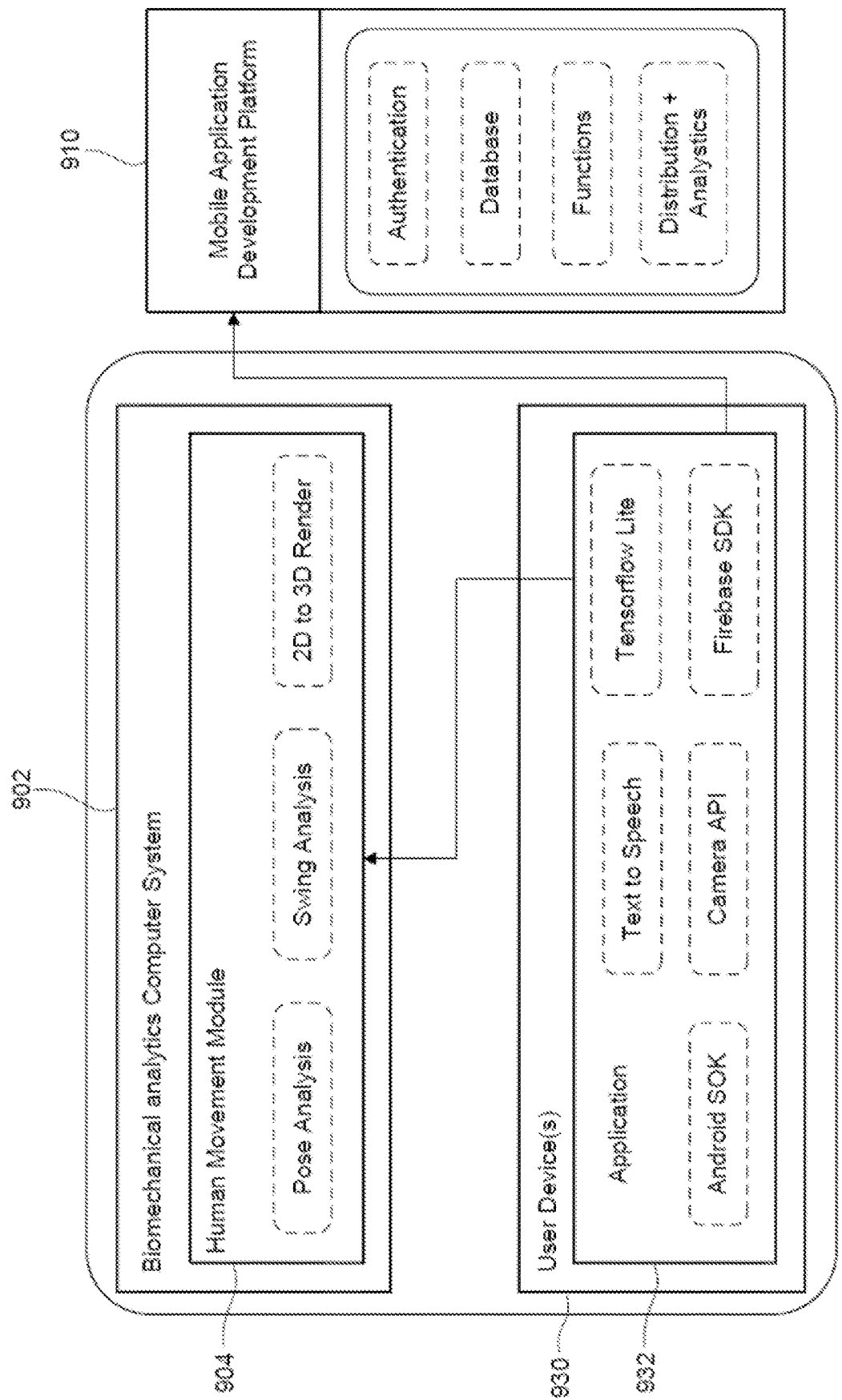
FIG. 9 illustrates a biomechanical analytics computer system, user device, and mobile application development platform, in accordance with the embodiments disclosed herein.

FIG. 9 illustrates a biomechanical analytics computer system, user device, and mobile application development platform, in accordance with the embodiments disclosed herein. In this illustration, biomechanical analytics computer system 902, mobile application development platform 910, and user device(s) 930 may be in communication to analyze and generate 3D avatars using biomechanical analysis. Biomechanical analytics computer system 902 and user device(s) 930 in FIG. 9 may correspond with biomechanical analytics computer system 102 and user device(s) 130 in FIG. 1.

Biomechanical analytics computer system 902 may comprise human movement module 1004. Human movement module 1004 may implement a pose analysis, action (e.g., swing, etc.) analysis, and a 2D to 3D model rendering. These operations may be limited based on biomechanical limitations of the human body, human movement, and object tracking. The pose analysis, action analysis, and a 2D to 3D model rendering may be generated using machine learning and/or computer vision processes.

User device(s) 930 may receive one or more image frames from a human movement using an application 932 installed with the user device. One or more tools may be incorporated with the user devices as well, including text to speech, a data library for numerical computation and machine learning, SDK, and/or APIs to run components described with the human movement module 1004.

Mobile application development platform 910 may comprise cloud resources for storing and/or executing operations. The data structure and/or operations may support biomechanical analytics computer system 902 in a cloud computing environment. For example, mobile application development platform 910 may comprise authentication, one or more databases, machine-readable instructions and/or functions, and distribution or analytics data to perform persistence and storage operations.

Figure 10:
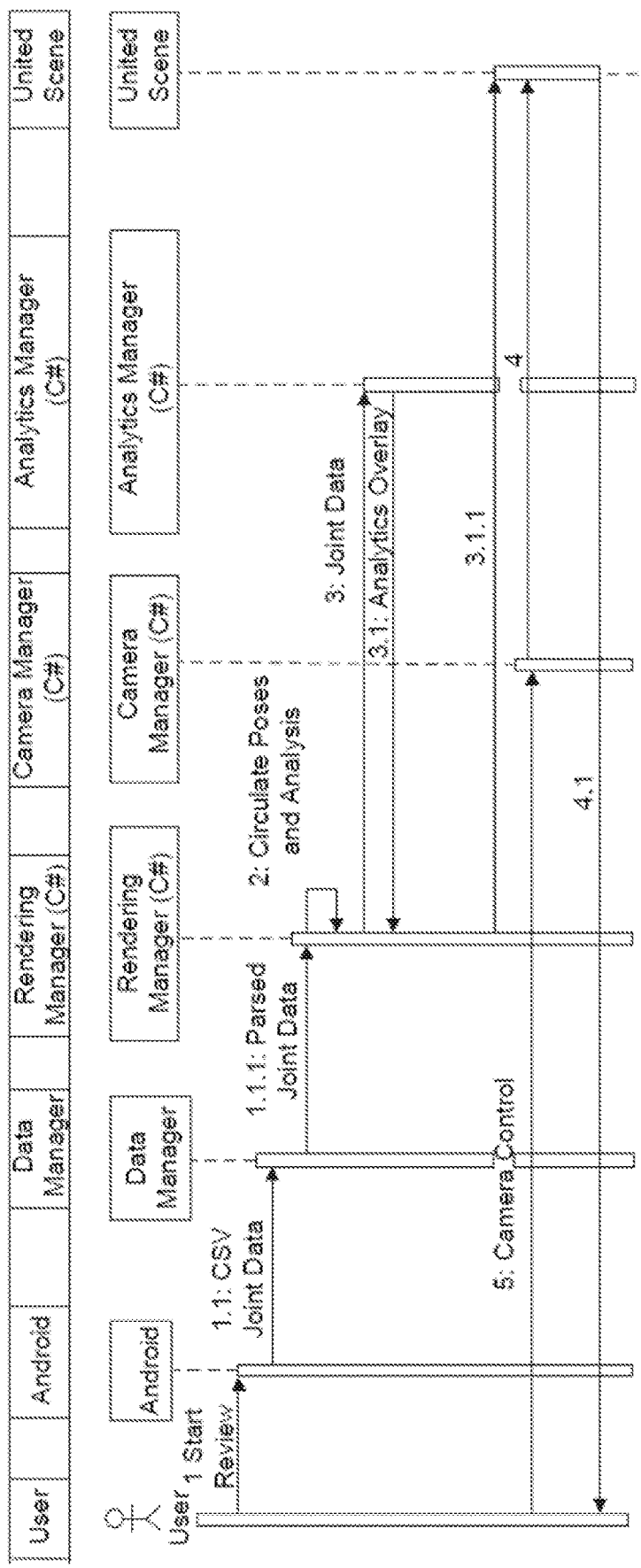
FIG. 10 illustrates receiving a 3D avatar at a user device, in accordance with the embodiments disclosed herein.

FIG. 10 illustrates receiving a 3D avatar at a user device, in accordance with the embodiments disclosed herein.

At block 1, a user may review an application at a user device. The user device may capture one or more images or videos of the user. The image frames may comprise biomechanical values, body parts or joints, or other data corresponding with the user or other characteristics of the image frame. The image frames may be stored at the user device.

At block 1.1, the image frames, biomechanical values, and other data may be transmitted to a data manager. The data may be transferred as a machine-readable file (e.g., comma separated value (CSV), etc.). The data manager may be incorporated with biomechanical analytics computer system 102 (e.g., data processing module 108).

At block 1.1.1, the data may be parsed and/or otherwise cleaned by biomechanical analytics computer system 102. The parsed data may be transmitted to a rendering manager. Rendering manager may be incorporated with biomechanical analytics computer system 102 (e.g., data processing module 108, human movement module 110, etc.).

At block 2, the rendering manager may determine poses or other analysis associated with the motion sequences identified in the image frames. In some examples, the joints used to perform the poses may be determined.

At block 3, the rendering manager may transmit the joint data and/or other pose data to an analytics manager. The analytics manager may determine an overlay corresponding with the joints that perform the poses. The analytics manager may be incorporated with biomechanical analytics computer system 102 (e.g., human movement module 110).

At block 3.1, the overlay may be transmitted from the analytics manager back to the rendering manager. The rendering manager may generate a time-synchronized 3D avatar rendering and overlay the 3D avatar with additional data. The additional data may include, for example, a video recording of a user's performance, to allow the user to compare current performance with past performances (e.g., "show this swing versus my best swing"), a video recording of a reference performance (e.g., "show my best swing versus a specific pro golfer"), and/or automatically detecting and highlighting differences between two performances.

At block 3.1.1, the rendering and overlay may be transmitted by the rendering manager to a unity scene device. The unity scene device may combine the multiple layers (e.g., avatar, overlay, etc.) with newly recorded video (e.g., blocks 4 and 5, etc.).

At block 4.1, the rendering, overlay, and/or additional image frames may be provided back to the user via the user device.

Figure 11:
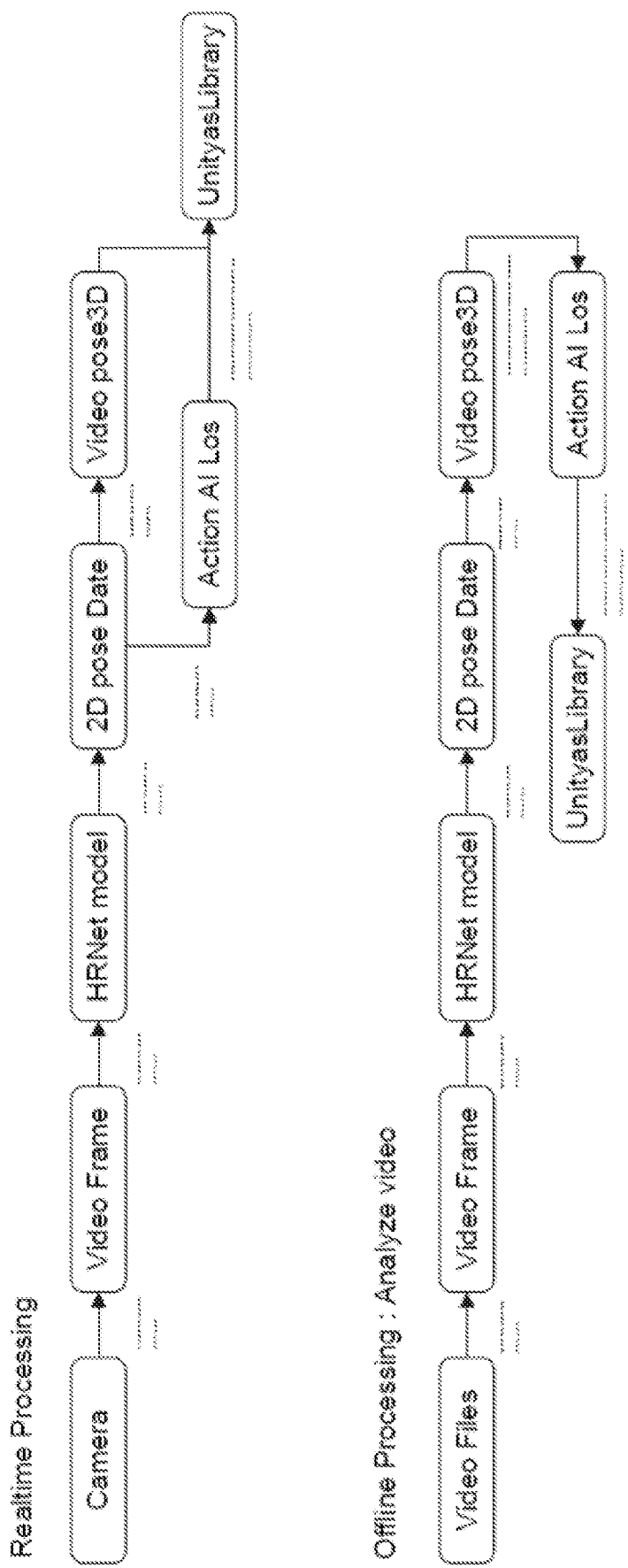
FIG. 11 illustrates generating a 3D avatar at a biomechanical analytics computer system, in accordance with the embodiments disclosed herein.

FIG. 11 illustrates generating a 3D avatar at a biomechanical analytics computer system, in accordance with the embodiments disclosed herein.

In real-time processing, the camera or other sensor may generate image or video frames of the human movement. The captured image or video frames may be stored in a 2D format and/or compared with an library of predetermined poses (e.g., HR-net*, open pose, Google pose net, etc.). The output of the comparison may determine 2D pose data and/or context information associated with the pose. The information may generate one or more image frames that correspond to motion performed by a 3D avatar.

In offline processing, the image or video frames may be received in a 2D format (e.g., from a data store, from a camera or sensor, etc.) and/or compared with an library of predetermined poses (e.g., HR-net*, open pose, Google pose net, etc.). The output of the comparison may determine 2D pose data and/or context information associated with the pose. The information may generate one or more image frames that correspond to motion performed by a 3D avatar.

FIG. 12 illustrates a data store storing watch list data for a 3D avatar, in accordance with the embodiments disclosed herein. The data store may include watch list information, including a watch list identifier (ID), user ID, score, date, point of view, zoom level, and one or more trackers.

FIG. 13 illustrates a data store storing tracker data for a 3D avatar, in accordance with the embodiments disclosed herein. The data store may include tracker information, including a tracker identifier (ID), tracker name, category, description to define the tracker, tracker type (e.g., dynamic or static), and/or measurement unit.

FIG. 14 illustrates a data store storing watch list and tracker data for determining 3D movements by the biomechanical analytics computer system, in accordance with the embodiments disclosed herein. The data store may correlate one or more watch list IDs with one or more tracker IDs. A minimum value, maximum value, and position may also be stored corresponding with the one or more watch list IDs and one or more tracker IDs.

Figure 15:
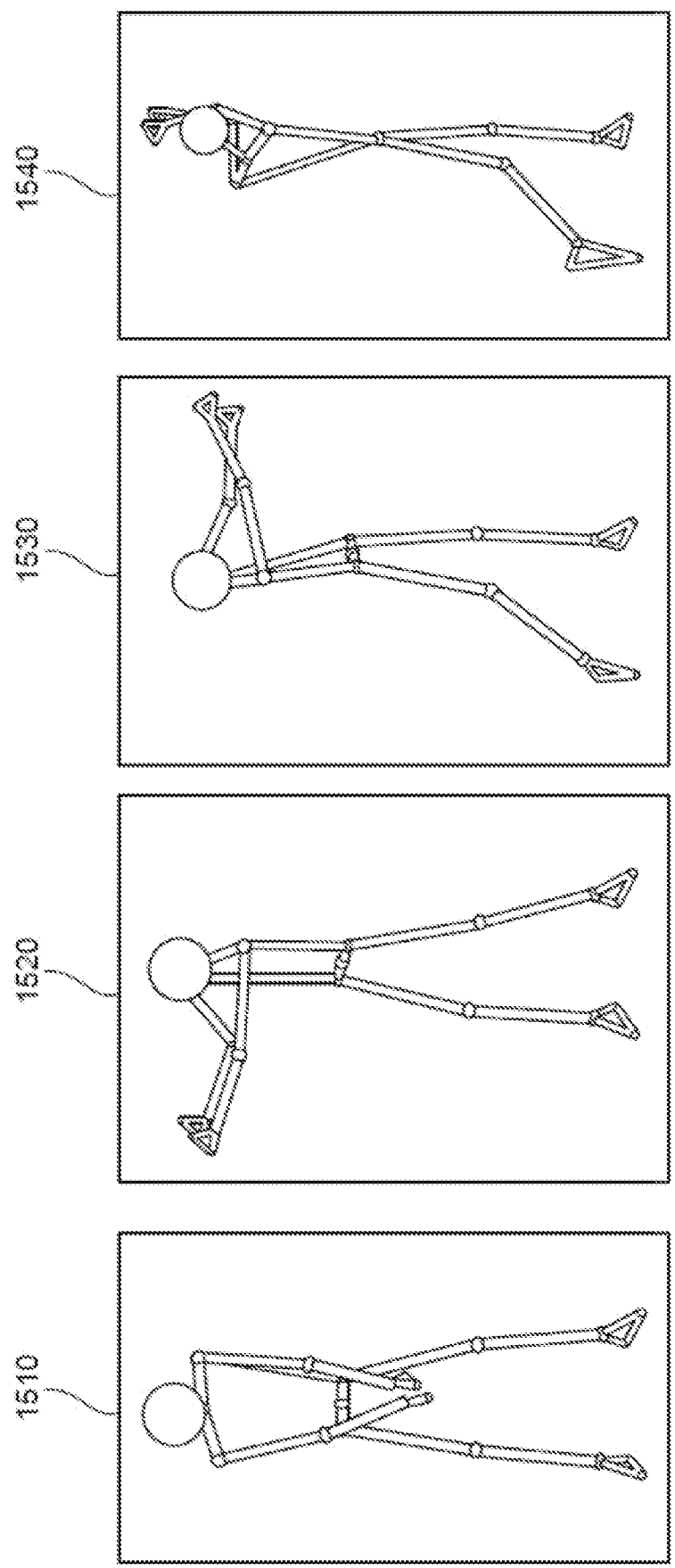
FIG. 15 illustrates a series of avatars provided to a user interface of user device, in accordance with the embodiments disclosed herein.

FIG. 15 illustrates a series of avatars provided to a user interface of user device, in accordance with the embodiments disclosed herein. In this illustration, biomechanical analytics computer system 102 may analyze the data discussed throughout the disclosure to generate a 3D avatar from images or video stored in analytics data store 122. The images generated of 3D avatar, illustrated as first image 1510, second image 1520, third image 1530, and fourth image 1540, may illustrate an actual swing produced by an athlete user or a predicted swing output generated by machine learning module 112. For example, first image 510 may show a user preparing to take a swing or, in other embodiments, may show an alignment of the user's hips that should be adjusted at this portion of the swing in comparison to previous swings that are analyzed by the system. In other words, first image may show the athlete user a graphical representation of how they should be standing in relation to this portion of the swing. Each of the components of the swing may be recorded, analyzed, and provided as output to the user interface of user device 130.

Figure 16:
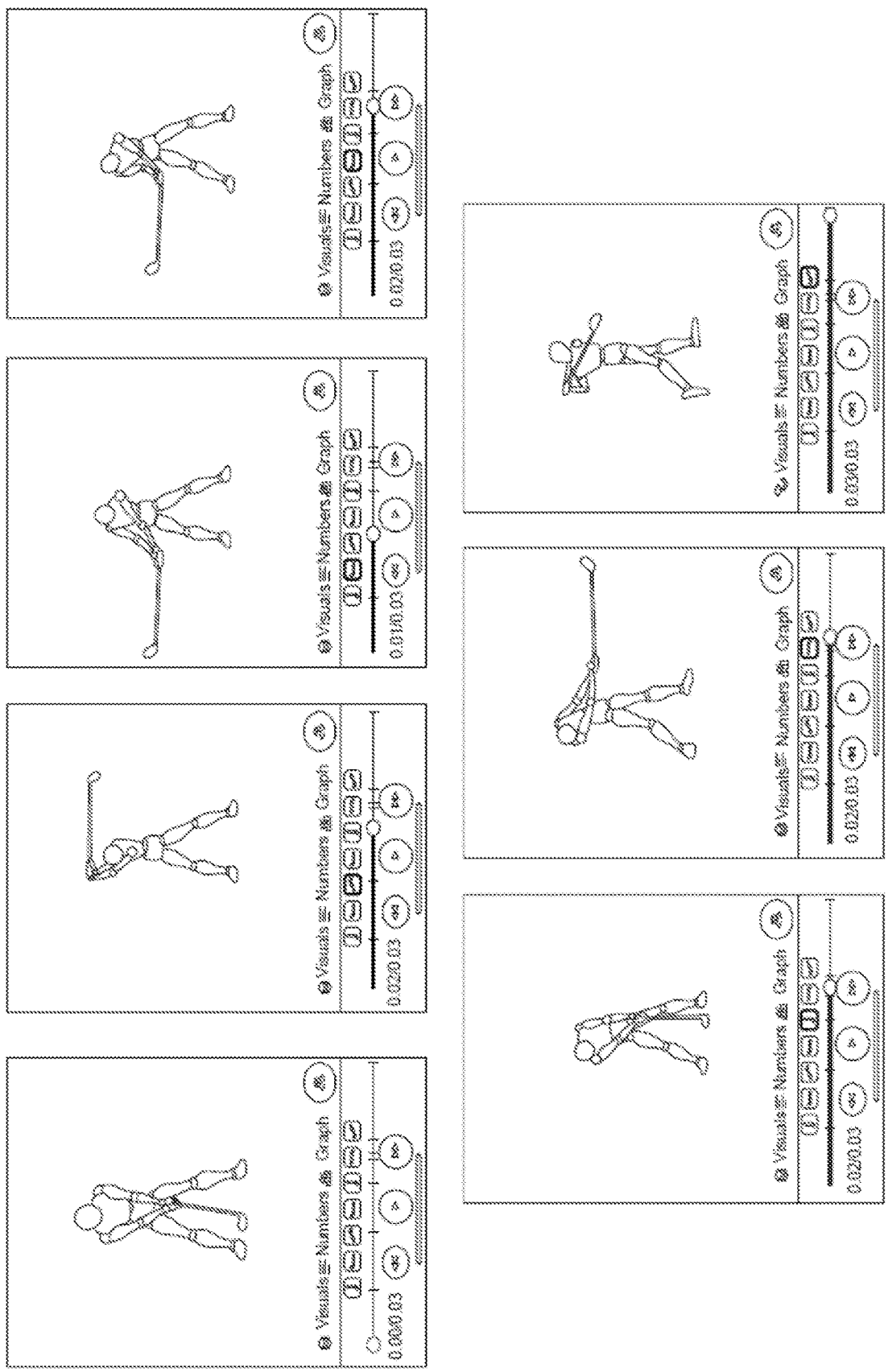
FIG. 16 illustrates a series of avatars with an object provided to a user interface of user device, in accordance with the embodiments disclosed herein.

FIG. 16 illustrates a series of avatars with an object provided to a user interface of user device, in accordance with the embodiments disclosed herein. In this illustration, biomechanical analytics computer system 102 may analyze the data discussed throughout the disclosure to generate a 3D avatar from images or video stored in analytics data store 122. As discussed with FIG. 15, the images generated of 3D avatar may illustrate an actual swing produced by an athlete user or a predicted swing output generated by machine learning module 112. Each of the components of the swing may be recorded, analyzed, and provided as output to the user interface of user device 130.

In some examples, the generated avatar may be holding the recommended object, as illustrated in FIG. 16. The generated movements of the 3D avatar may be adjusted when holding and not holding the object to account for the changes in movement caused by the different objects incorporated with the user's movement.

Figure 17:
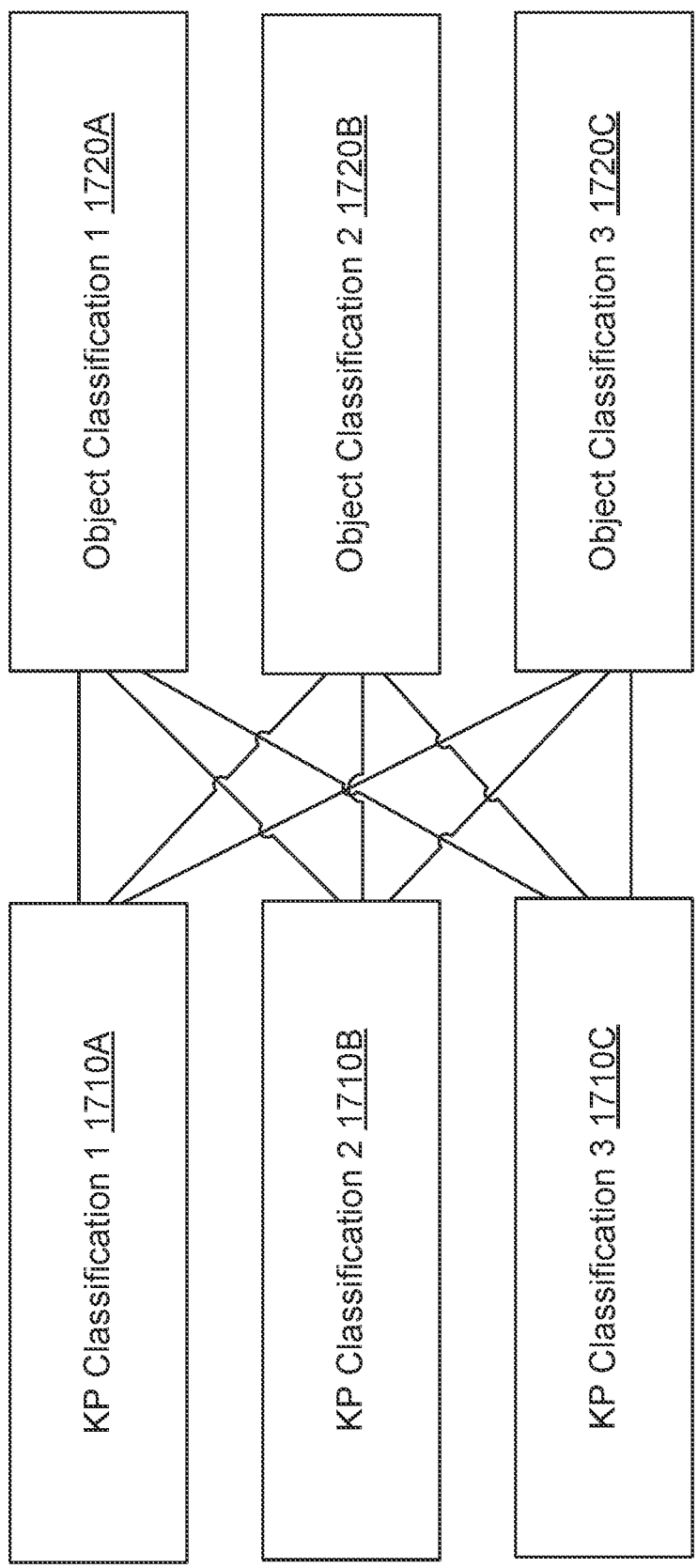
FIG. 17 illustrates matching KPs and tracker classifications with object classifications, in accordance with the embodiments disclosed herein.

FIG. 17 illustrates matching KPs and tracker classifications with object classifications, in accordance with the embodiments disclosed herein. The systems described herein can match the KPs or tracker classifications 1710 (illustrated as first KP classification 1710A, second KP classification 1710B, third KP classification 1710C) with object classifications (illustrated as first object classification 1720A, second object classification 1720B, third object classification 1720C). For example, using the stored 3D coordinates of the avatar and the object, the object can be added and removed from the view. The avatar's 3D coordinates may be adjusted as well, which can each correspond with one or more KPs or trackers. In some examples, the KPs can be recalculated on the fly depending what or if object being used.

In some examples, a few aspects of the swing may effect club fitting more than other aspects of the movement, including length of the shaft, flex of the shaft (how flexible or stiff), the kick point of the shaft (the shaft can be stiffer or more flexible at high, mid, or low point along the shaft by design), weight of the overall club, weight of the shaft, loft of the club head (how many degrees from vertical is the club face at rest), lie angle of the club head (angle between the bottom of the club head and the shaft), Center of Mass of the club head, or Center of Mass of the overall club.

One or more of these features can be used to optimize result of a golfer's shot when using the club and there are several aspects of the golfer's body and swing that go into determining the best fit club. For example, golfer's height and wingspan (e.g., corresponding with a first set of KPs) or the distance from the ground to the wrist when the arm is hanging straight down (e.g., corresponding with a second set of KPs) can inform how long of a club or other object fitting they need.

As an illustrative example, a golfer's swing speed (measured by things like "hose) speed" "shaft angular speed" "ball speed" and "mid hands speed") may help determine how stiff of a shaft they need and how heavy of a club they need. As another example, how the golfer's mid hands sway and lift and at what speed they sway and lift from the top of the backswing to halfway point in the downswing can determine how stiff the shaft should be and where the kick point should be. As another example, the golfer's side bend of the shoulders and relative position of the center of chest to the ball position can determine what degree loft their club head should be (for the driver).

In some examples, multiple objects may be tested and measured to determine effect on the user's movement. For example, if a user's swing changes when the golfer uses club A vs. club B with different specifications, the changes in the swing can be correlated to the output of the swing (e.g., distance or accuracy) to help determine whether one club is better for the golfer than the other. The swing changes could include swing speed (e.g., hosel speed, mid hands speed, shaft angular speed, ball speed) or path of the club or hands (mid hands path, hosel path), or lead wrist angle.

Figure 18:
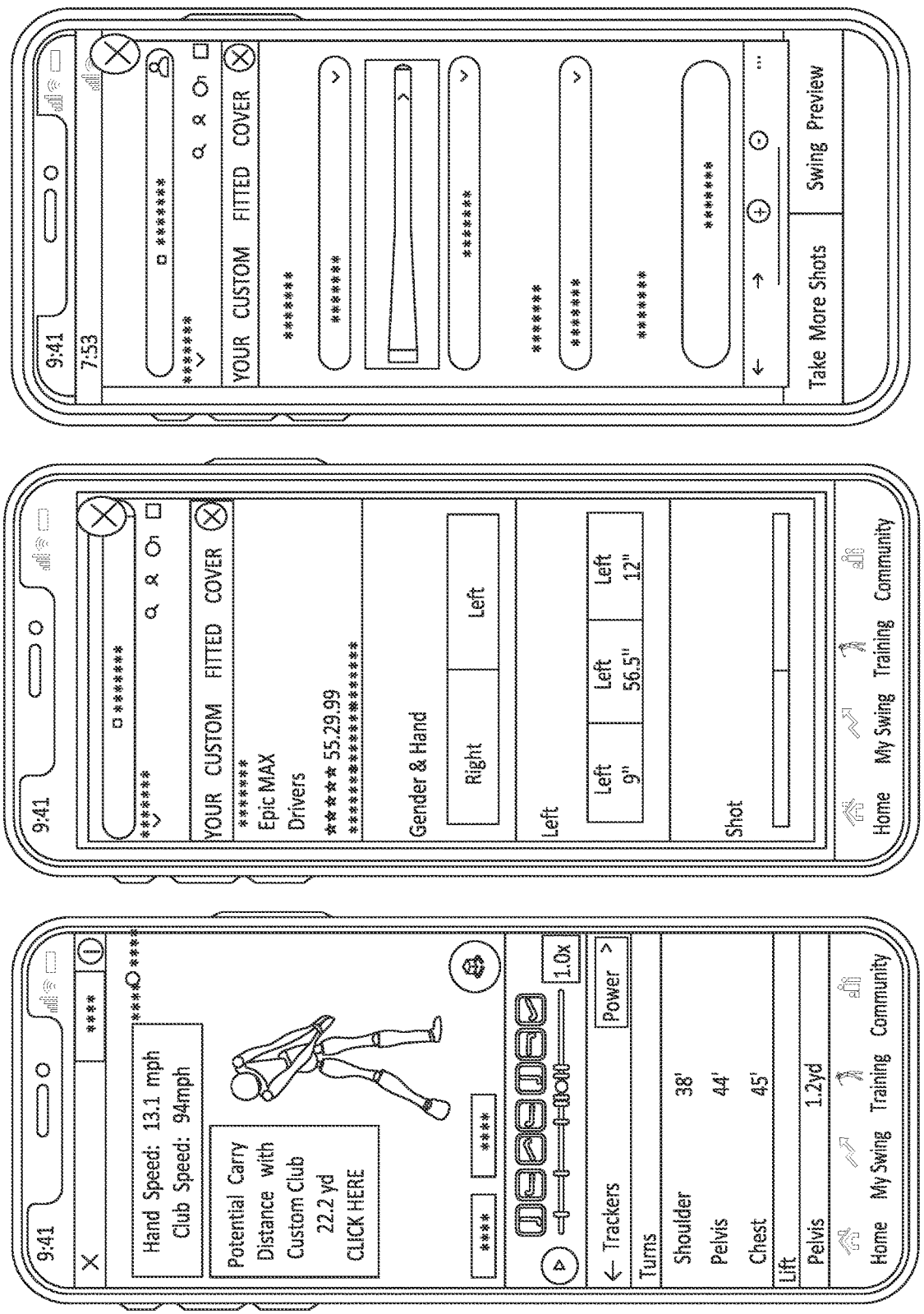
FIG. 18 provides illustrative user interfaces for object fitting using quantitative biomechanical-based analysis, in accordance with the embodiments disclosed herein.

FIG. 18 provides illustrative user interfaces for object fitting using quantitative biomechanical-based analysis, in accordance with the embodiments disclosed herein. For example, the user interfaces may comprise a hand speed, club speed, measurement of rotating movements of a user's body, or other quantitatively-measured information. The user interface may provide the information with a series of images of the user (e.g., received from the user device) or a series of generated images of an avatar mimicking the user's movement. The quantitatively-measured information may be associated with an object to improve the quantitatively-measured information and allow the user to initiate a payment transaction or purchase of the object from a merchant's website.

Figure 19:
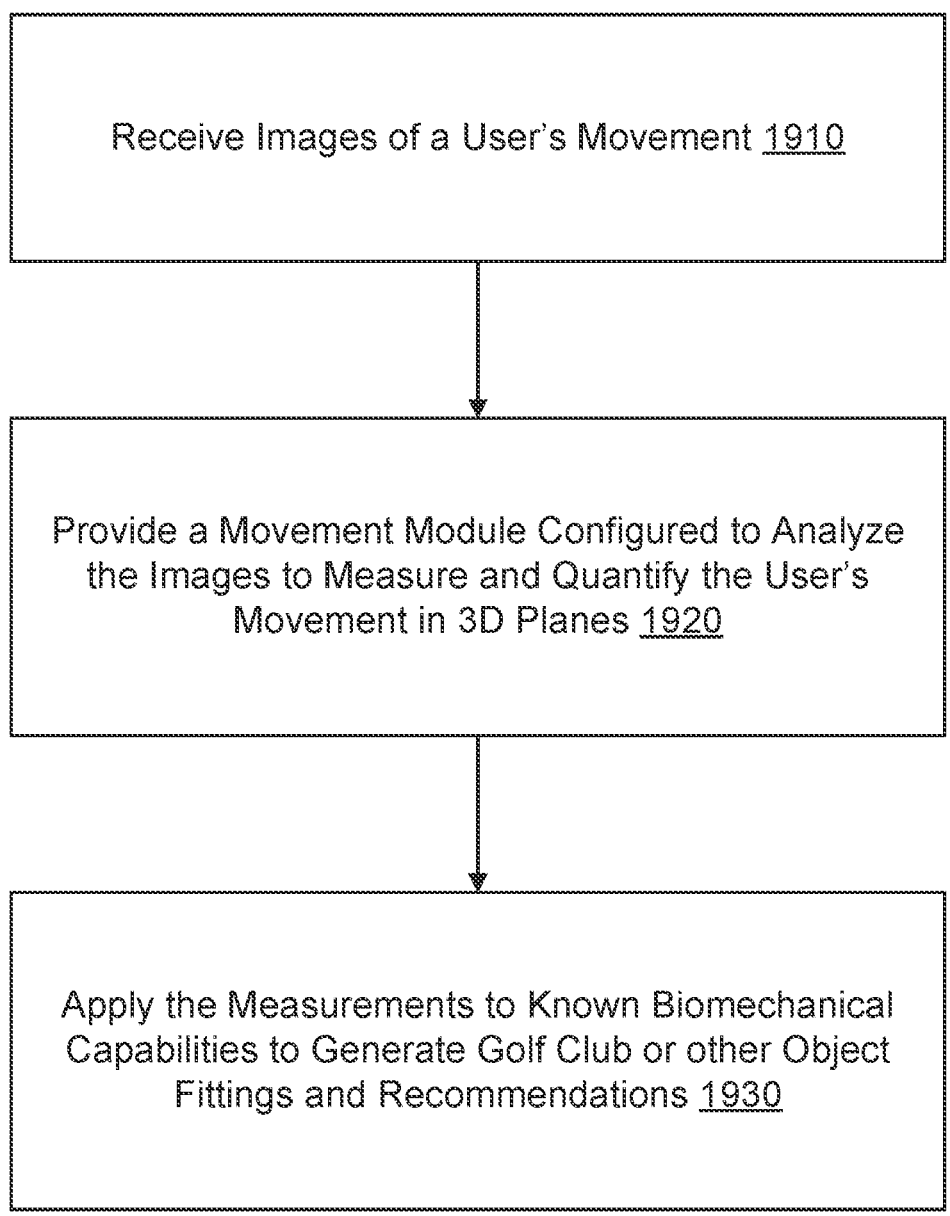
FIG. 19 illustrates a process for applying biomechanical analysis to images of a user's movement during performance of an activity involving movement of a golf club or other object to generate computer-generated 3D avatars, in accordance with the embodiments disclosed herein.

FIG. 19 illustrates a process for applying biomechanical analysis to images of a user's movement during performance of an activity involving movement of a golf club or other object to generate computer-generated 3D avatars, in accordance with the embodiments disclosed herein. The method may be implemented by machine readable instructions executed by processor 104 of biomechanical analytics computer system 102 of FIG. 1.

At block 1910, images of a user's movement may be received. For example, biomechanical analytics computer system 102 may receive, from at least one image capture device including user devices 130 or sensors 132 of FIG. 1, images of a user's movement during performance of an activity.

At block 1920, a movement module may be provided. The movement module may be configured to analyze the images to measure and quantify the user's movement in three-dimensional planes.

At block 1930, the measurements may be applied to known biomechanical capabilities to generate golf club or other object fittings and recommendations.

In some examples, biomechanical analytics computer system 102 of FIG. 1 makes measurements of quantifiable aspects of an actor's performance, including particular movements relating to particular body parts.

Figure 20:
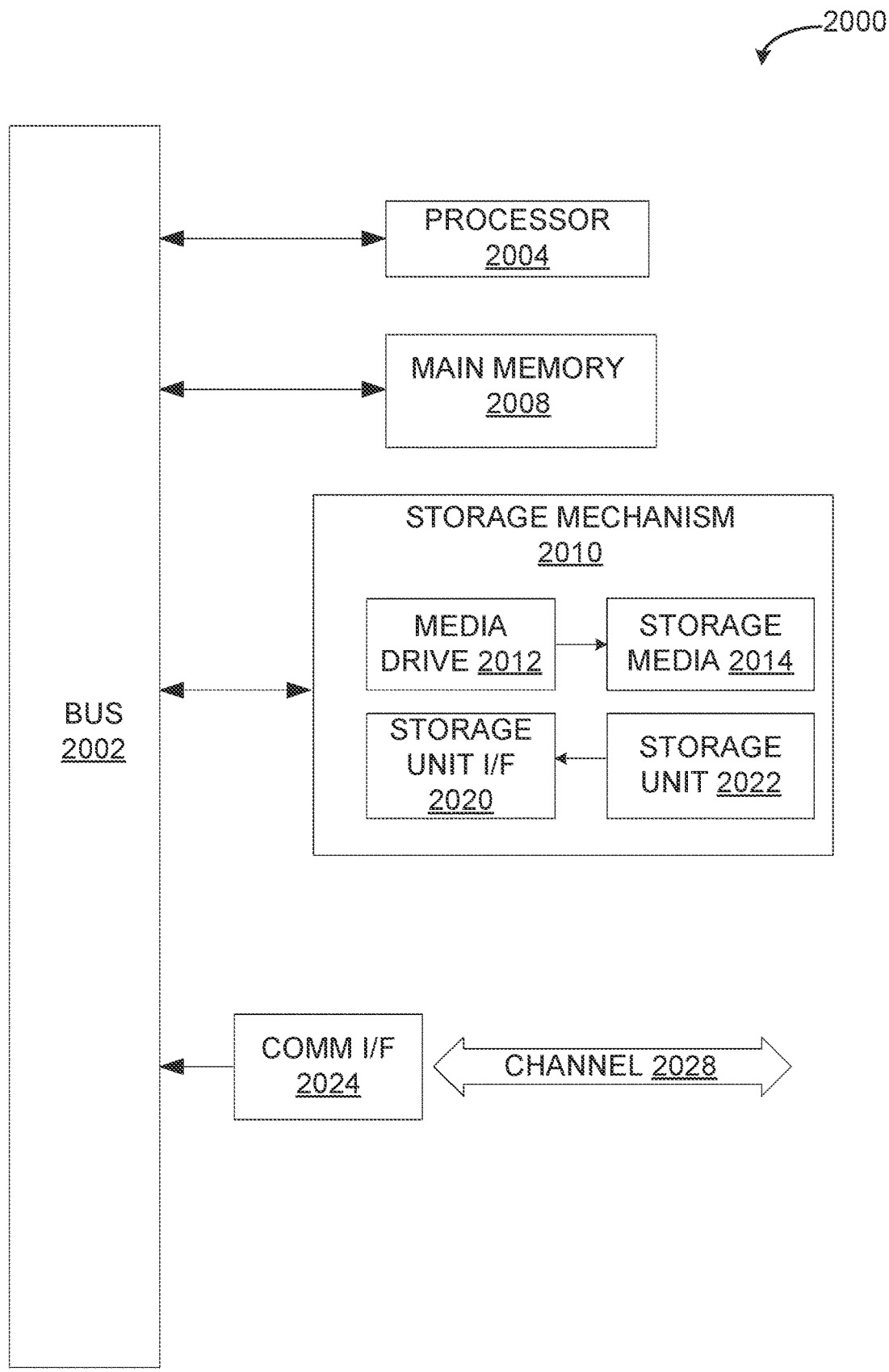
FIG. 20 is an example of a computing system that may be used in implementing various features of embodiments of the disclosed technology.

In some examples, biomechanical analytics computer system 102 of FIG. 1 quantitatively analyzes a user's movement of predetermined body parts during certain phases of a golf swing or other action, including transition from one portion of the action to another, in relation to a golf swing or other object used as part of the action.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 20. Various embodiments are described in terms of this example logical circuit 2000. After reading this description, it will become apparent to a person skilled in the relevant art how to implement the technology using other logical circuits or architectures.

Referring now to FIG. 20, computing system 2000 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 2000 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 2000 might include, for example, one or more processors, controllers, control engines, or other processing devices, such as a processor 2004. Processor 2004 might be implemented using a general-purpose or special-purpose processing engine such as, for example, a microprocessor, controller, or other control logic. In the illustrated example, processor 2004 is connected to a bus 2002, although any communication medium can be used to facilitate interaction with other components of logical circuit 2000 or to communicate externally.

Computing system 2000 might also include one or more memory engines, simply referred to herein as main memory 2008. For example, preferably random-access memory (RAM) or other dynamic memory, might be used for storing information and instructions to be executed by processor 2004. Main memory 2008 might also be used for storing temporary variables or other intermediate information during execution of instructions to be executed by processor 2004. Logical circuit 2000 might likewise include a read only memory ("ROM") or other static storage device coupled to bus 2002 for storing static information and instructions for processor 2004.

The computing system 2000 might also include one or more various forms of information storage mechanism 2010, which might include, for example, a media drive 2012 and a storage unit interface 2020. The media drive 2012 might include a drive or other mechanism to support fixed or removable storage media 2014. For example, a hard disk drive, a floppy disk drive, a magnetic tape drive, an optical disk drive, a CD or DVD drive (R or RW), or other removable or fixed media drive might be provided. Accordingly, storage media 2014 might include, for example, a hard disk, a floppy disk, magnetic tape, cartridge, optical disk, a CD or DVD, or other fixed or removable medium that is read by, written to, or accessed by media drive 2012. As these examples illustrate, the storage media 2014 can include a computer usable storage medium having stored therein computer software or data.

In alternative embodiments, information storage mechanism 2040 might include other similar instrumentalities for allowing computer programs or other instructions or data to be loaded into logical circuit 2000. Such instrumentalities might include, for example, a fixed or removable storage unit 2022 and an interface 2020. Examples of such storage units 2022 and interfaces 2020 can include a program cartridge and cartridge interface, a removable memory (for example, a flash memory or other removable memory engine) and memory slot, a PCMCIA slot and card, and other fixed or removable storage units 2022 and interfaces 2020 that allow software and data to be transferred from the storage unit 2022 to logical circuit 2000.

Logical circuit 2000 might also include a communications interface 2024. Communications interface 2024 might be used to allow software and data to be transferred between logical circuit 2000 and external devices. Examples of communications interface 2024 might include a modem or soft modem, a network interface (such as an Ethernet, network interface card, WiMedia, IEEE 802.XX or other interface), a communications port (such as for example, a USB port, IR port, RS232 port, Bluetooth® interface, or other port), or other communications interface. Software and data transferred via communications interface 2024 might typically be carried on signals, which can be electronic, electromagnetic (which includes optical) or other signals capable of being exchanged by a given communications interface 2024. These signals might be provided to communications interface 2024 via a channel 2028. This channel 2028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2008, storage unit 2020, media 2014, and channel 2028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 2000 to perform features or functions of the disclosed technology as discussed herein.

Although FIG. 20 depicts a computer network, it is understood that the disclosure is not limited to operation with a computer network, but rather, the disclosure may be practiced in any suitable electronic device. Accordingly, the computer network depicted in FIG. 20 is for illustrative purposes only and thus is not meant to limit the disclosure in any respect.

Figure 21:
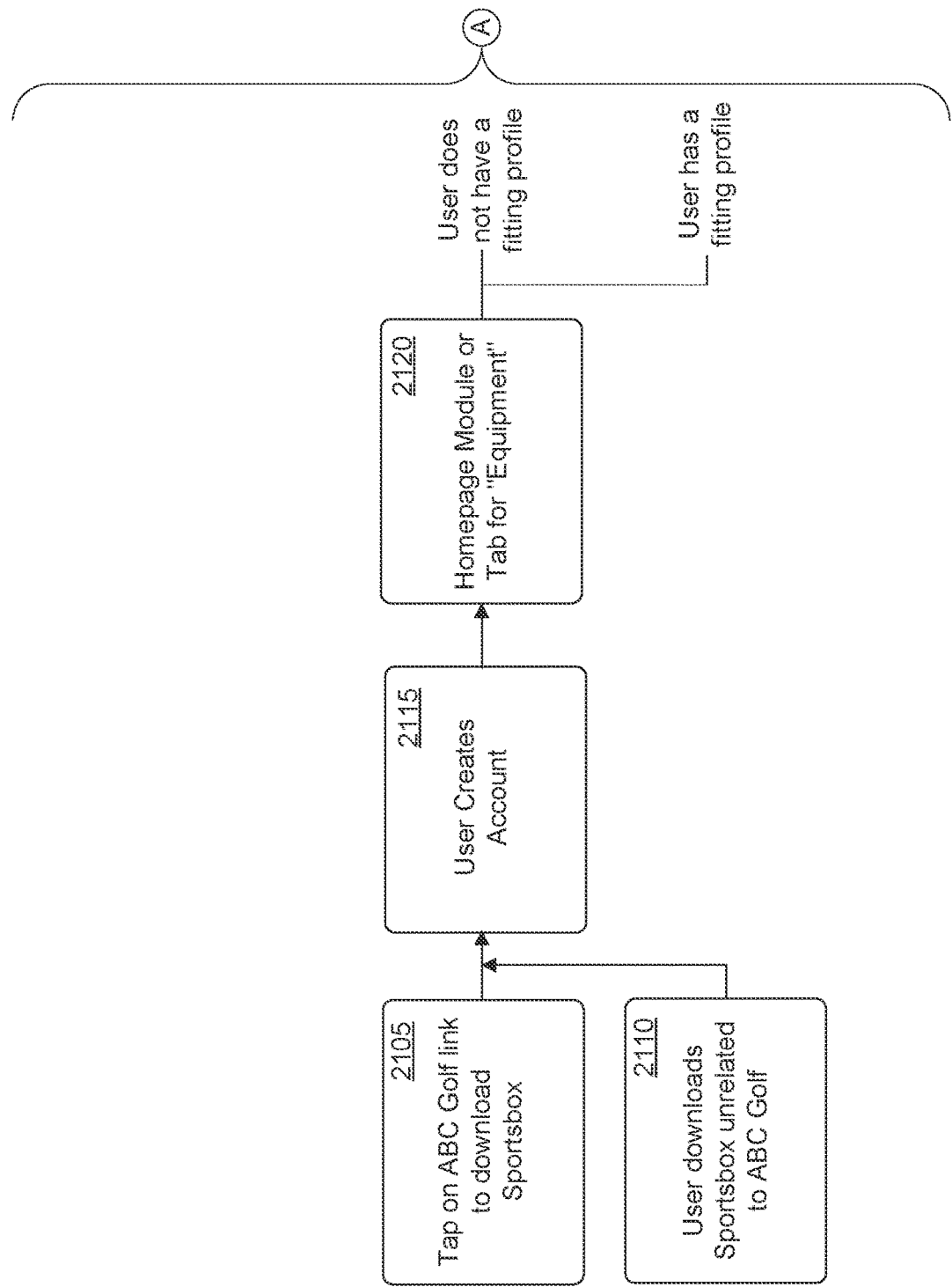
FIG. 21 provides an illustrative process for initiating a transaction for the object, in accordance with the embodiments disclosed herein.
Figure 21:
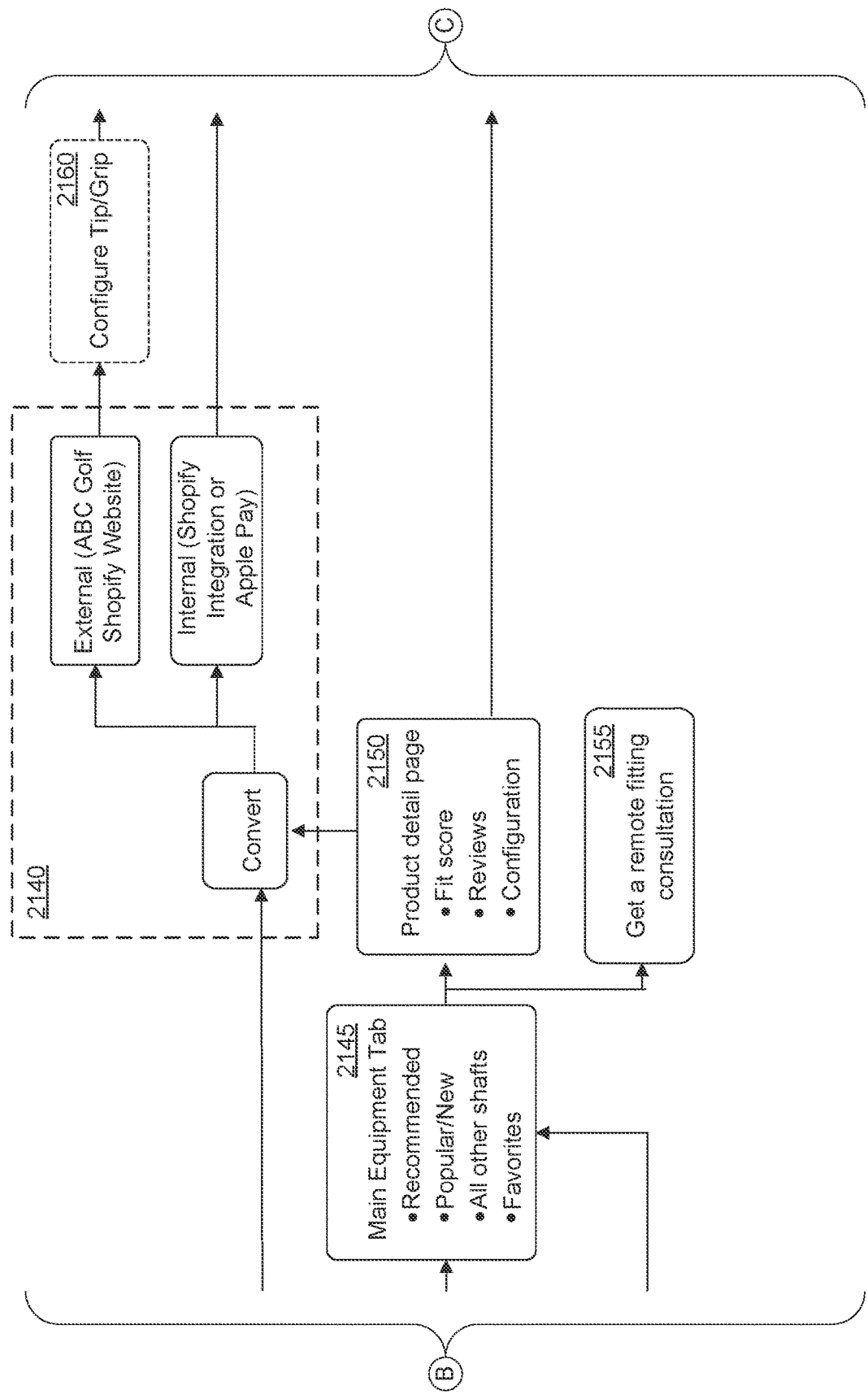
Figure 21:
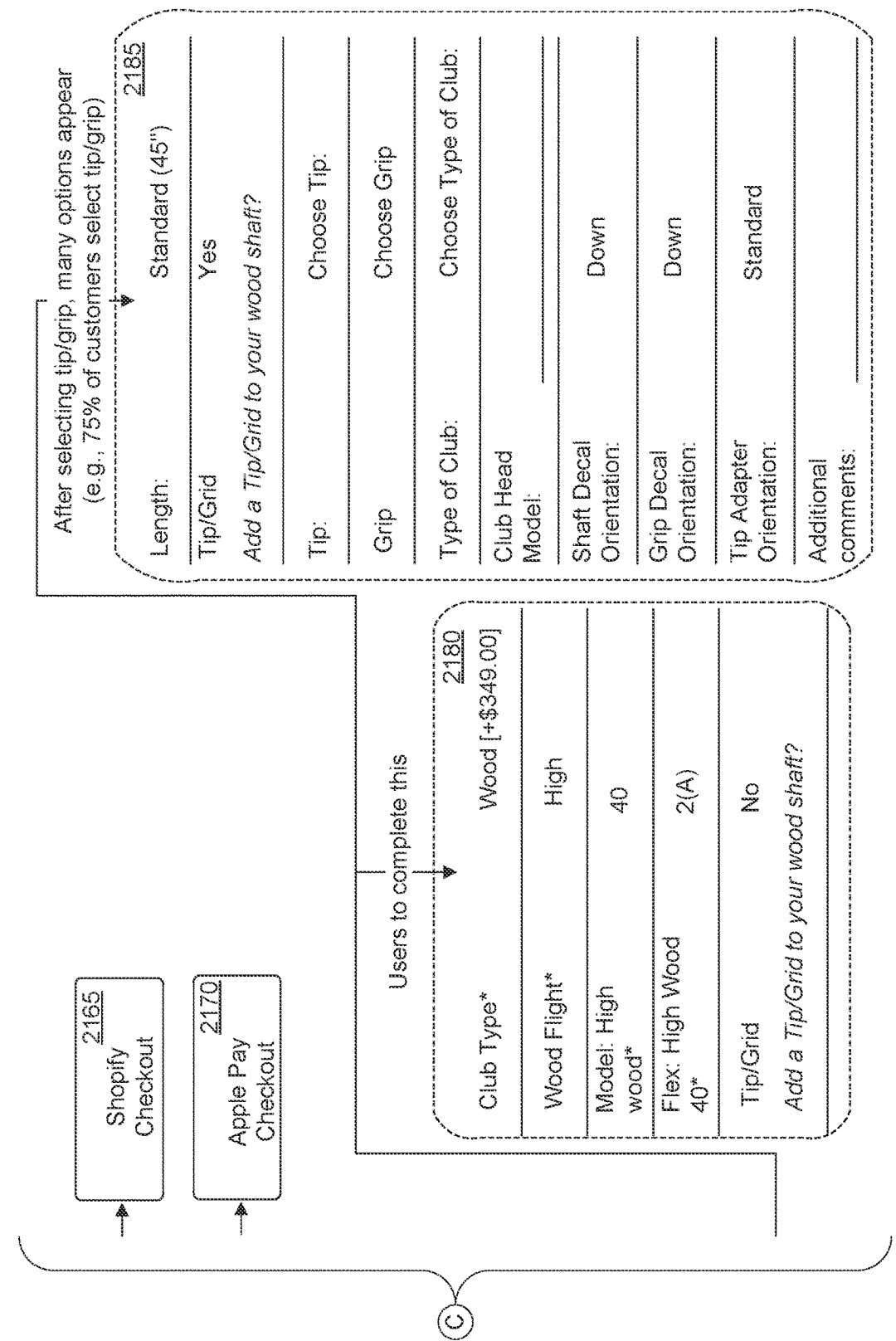

FIG. 21 provides an illustrative process for initiating a transaction for the object, in accordance with the embodiments disclosed herein. In this example, the system may initiate a payment transaction through a series of steps and interactions with the user device. The payment transaction may be associated with a manufacturer or merchant (used interchangeably, illustrated as "ABC Golf"), the user device (e.g., user device 130 illustrated in FIG. 1), and the system described herein (e.g., biomechanical analytics computer system 102 illustrated in FIG. 1).

At block 2105, a user may tap on a link associated with the merchant and biomechanical analytics computer system 102. For example, the user may direct the user device to access a website associated with the merchant. The user may initiate a download process using a link at the website associated with the merchant that downloads a software application to the user device. The software application may direct the user device to biomechanical analytics computer system 102.

At block 2110, a user may download a software application unrelated to the merchant. For example, the user may direct the user device to access a website that is not associated with the merchant. The user may access a link provided at the website to allow the user to download the software application to the user device to direct the user device to biomechanical analytics computer system 102.

At blocks 2105 and 2110, the link may be provided using various methods. For example, the link may be provided on a social media website, a merchant or manufacturer website, or various object pages that offer the object for purchase.

At block 2115, the user may create an account. For example, the software application may be downloaded to the user device and provide a link to biomechanical analytics computer system 102. Access to the system may be permitted using an authentication process. The user may create a user account and provide credentials pursuant to the authentication process. Upon authentication, the user may access the system. The user may not need to subscribe to the system and may only provide authentication credentials with each access to the system.

At block 2120, upon accessing the system, a homepage may be provided. For example, biomechanical analytics computer system 102 may include a homepage module or tab that provides objects to the user interface. The objects may be selectable to provide additional information about each of the objects. The homepage module or tab may provide links to initiate a payment transaction for each of the objects.

When an object is selected, the system may provide the various paths for accessing the additional information. The selection of the path may be based on whether the user has a fitting profile or does not have a fitting profile. The fitting profile may be associated with the classification process described in FIG. 17 and throughout the disclosure. In some examples, a user that has a fitting profile may be directed to the equipment tab of the software application that is identified at block 2145.

At block 2125, the system may initiate a process to generate a fitting profile when the user does not have a fitting profile. The process may correspond with a fitting experience onboarding that instructs the user what they will do, how they will do it, and why they should trust the software application. In some examples, the process may include video or other information from other users that have created a fitting profile.

At block 2130, the system may initiate a fitting experience. During this process, the user may perform a series of movements (e.g., five swings of a golf club, three pre-swing routines, or other series of movements) and the system can analyze the series of movements, as a series of images. The series of images may be used to generate a series of avatars or identify a recommended object to improve the movement identified in the images, as described throughout the disclosure.

At block 2135, the analysis may be complete and a "best fit" product webpage may be provided by the system. The webpage may include a description of the fitting experience or the results of the fitting experience. For example, the description may identify how the system made the recommendation for the particular object or other description of the analysis. In some examples, the system may provide a video, text/review, scientific credentials, or other identifiers that identify why the object would be recommended and why the user should rely on or trust the recommendation from the system.

From block 2135, the process may proceed to block 2140 or block 2145. At block 2140, the process may initiate a payment transaction to convert the object to a purchased item. The payment transaction may be conducted by an external website (e.g., a website that is external to the software application and associated with the merchant) or an internal website (e.g., using a embedded payment functionality at the software application like Shopify® Integration or Apple ° Pay). When the payment transaction is conducted by an external website, additional configuration options may be provided (block 2160) prior to completing the purchase at the site checkout (block 2165 and block 2170).

At block 2145, the process may provide additional information about objects available from the merchant. The additional information may be provided on an equipment tab of the software application. Information may include a recommended object (e.g., based on the series of movements, based on an overall recommendation that is not associated with a particular user, or other popular or new objects that are recommended for purchase) or a favorite object based on some criteria. In some examples, the information may include any available objects that are offered by the merchant.

At block 2150, the process may provide a detail page for a specific object. The additional information may be provided on a detail page of the software application. Information may include a fit score (e.g., how well the object fits with the movements of the user to improve the movement of the user), reviews about the object, a configuration option (e.g., adjusting a length, grip, or other characteristics of the object), or other information associated with the object and ordering the object. In some examples, the configuration may be limited to three to five options per object. If a user selects a tip and grip, they may be directed to additional options, including the type of clubhead and other information that is configurable for the object.

At block 2155, the process may provide a remote fitting consultation as described elsewhere herein. In some examples, the analysis of the movement of the user may be provided to a second user (electronically transmitted to a coach or club fitting professional) or analyzed in real time for a fitting consultation of a particular object.

At block 2180, the process may provide information about the selected object. The process can prompt users to provide configuration information. For example, a user can select a tip and grip for a golf club. Based on the configuration information provided by the user, additional options can be provided to the user.

At block 2185, the process may provide information about the selected object. The process can provide additional options to the user based on configuration information provided by the user.

Figure 22:
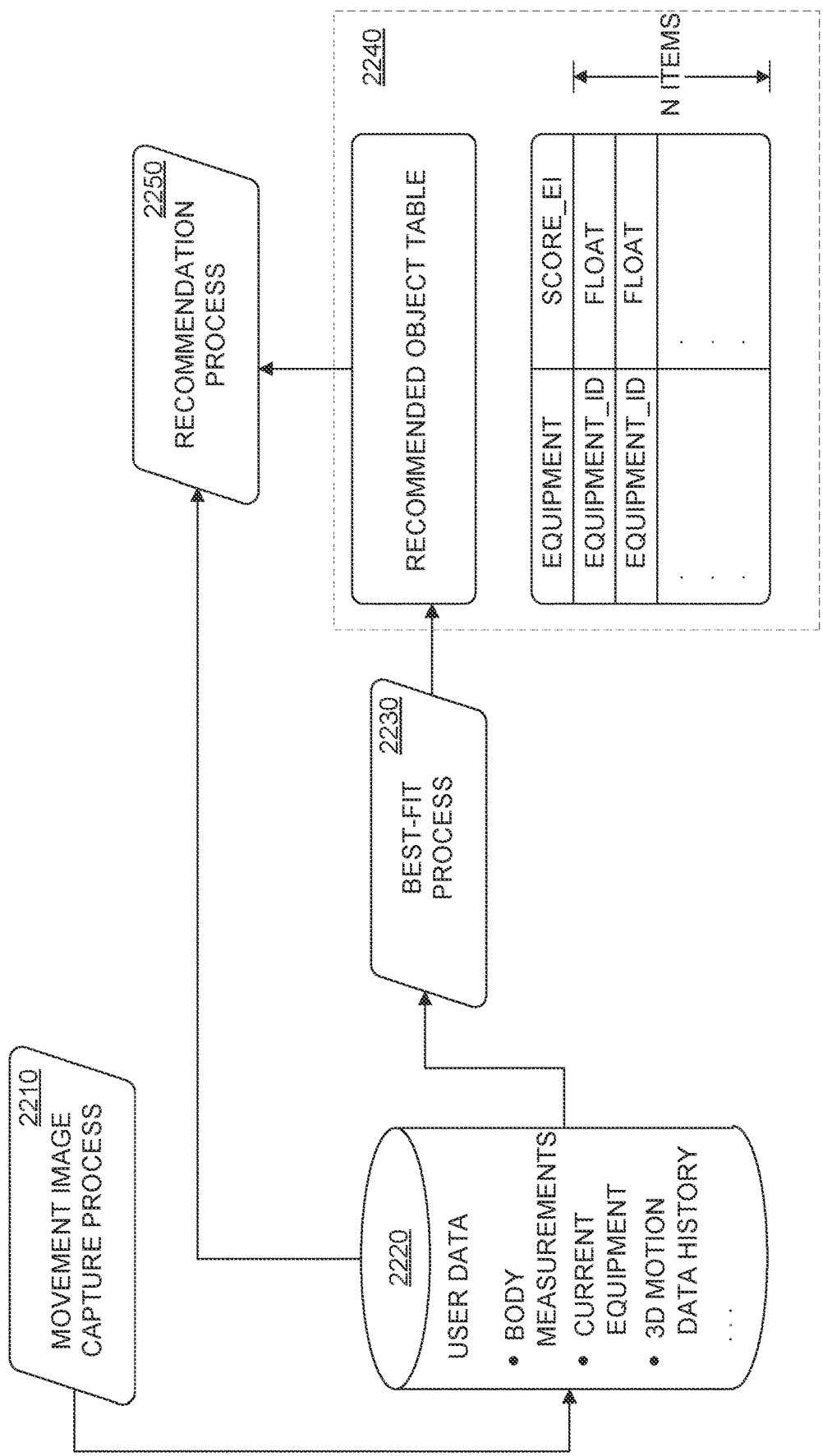
FIG. 22 provides an illustrative web server, data structure, and system components, in accordance with the embodiments disclosed herein.

FIG. 22 provides an illustrative web server, data structure, and system components, in accordance with the embodiments disclosed herein. The components illustrated herein may communicate with or replace components illustrated in FIG. 1.

At block 2210, a movement image capture process may be executed. For example, the user may perform an activity (e.g., five swings or a threshold number of swings, pre-shot routine, practice swings, or other movement associated with the activity) and the user device may capture a series of images. The series of images may be provided to a software application implemented locally at the user device or may be implemented remotely from the user device. When implemented remotely, the user device may transmit the series of images to a remote server.

At block 2220, the series of images may be stored as user data. The user data may comprise, for example, body measurements, current equipment, 3D motion data history, or other user data. In some examples, the series of images may be analyzed in order to measure body components of the user that is displayed in the series of images. Other implementations may allow the user to provide body measurements through a user interface and may be stored as user data. The series of images may also be analyzed to identify the current equipment/object that is utilized by the user. The analysis may be implemented by comparing the object with a set of stored objects and identifying the object in use, or by implementing other image analysis processes.

At block 2230, a best fit process may be executed. For example, the system may correlate the components of the swing with an object that is recommended to optimize and improve the analyzed movement.

In some examples, the best fit of the object may be matched to the user's movement. A few aspects of the movement may effect fitting more than other aspects of the movement, including length of the shaft/object, flex of the shaft/object (how flexible or stiff), the kick point of the shaft/object (the shaft can be stiffer or more flexible at high, mid, or low point along the shaft by design), weight of the overall club/object, weight of the shaft/object, loft of the club head (how many degrees from vertical is the club face at rest), lie angle of the club head (angle between the bottom of the club head and the shaft), center of mass of the club head/object, or center of mass of the overall club/object.

One or more of these features can be used to optimize a result of the user's movement when using the object, including an analysis of the user's body and swing/movement that go into determining the best fit club/object. For example, a user's height and wingspan (e.g., corresponding with a first set of KPs) or the distance from the ground to the wrist when the arm is hanging straight down (e.g., corresponding with a second set of KPs). These and other body measurements can inform a recommended length of a club/object.

At block 2240, a recommended object table may be generated. The recommended object table may correlate an object identifier to a score mapping. The recommended object table may comprise "N" number of items.

At block 2250, the recommendation may be generated. An illustrative process of generating the recommendation is provided with FIG. 23.

Figure 23:
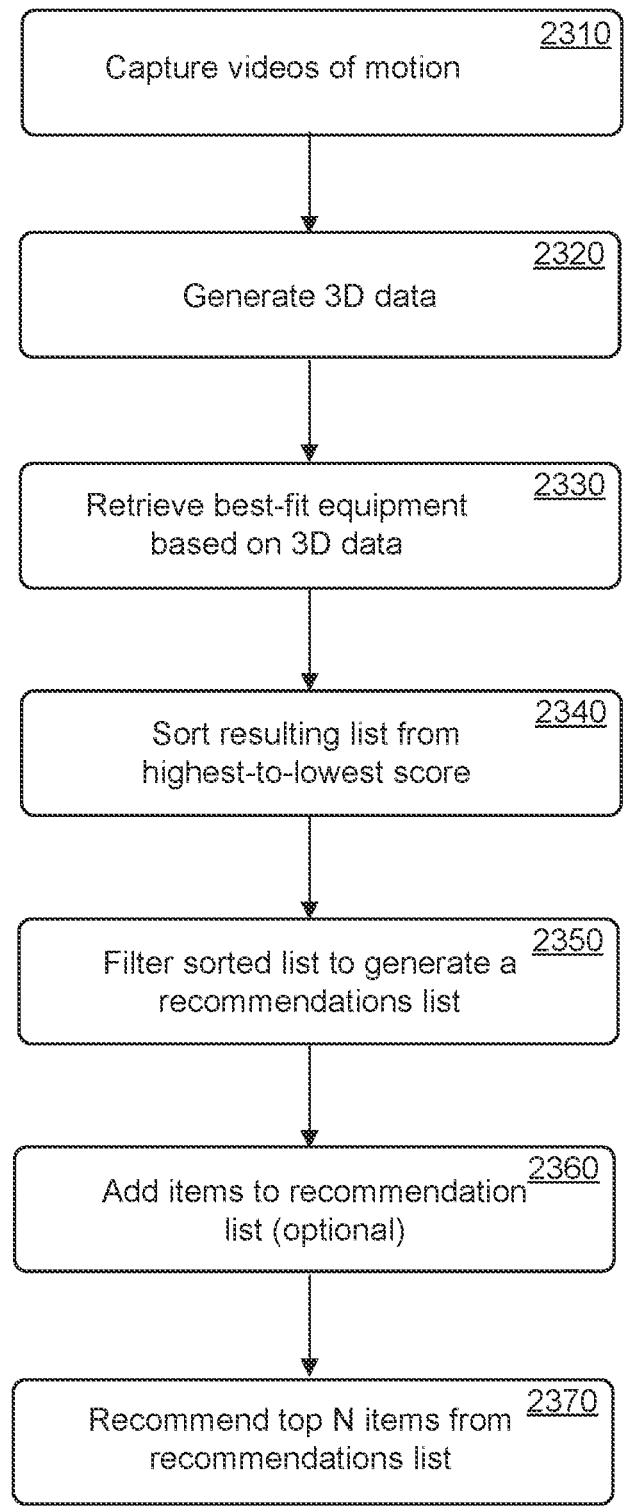
FIG. 23 provides an illustrative process to generate a recommendation for an object, in accordance with the embodiments disclosed herein.

FIG. 23 provides an illustrative process to generate a recommendation for an object, in accordance with the embodiments disclosed herein. The process illustrated herein may be performed by biomechanical analytics computer system 102 illustrated in FIG. 1 or FIG. 22, or other systems described herein.

At block 2310, a series of images may be recorded. For example, the system may capture multiple videos of motion performed by the user.

At block 2320, the system may generate 3D data. For example, the 3D data may include hand speed, shaft angular speed, tempo, wrist angle release speed, hand sway and lift, arc length, ball speed, or other 3D data.

At block 2330, the system may retrieve the object corresponding with the best fit based on the 3D data. The object may correspond with the object identifier matching the score in the recommended item table, based on process described throughout. In some examples, the 3D data may be used to categorize the users swing/movement across various attributes of the movement. For example, the attributes of the movement may include a swing speed, transition load pattern, release pattern and timing, or other features of the movement.

The matching made the based on various characteristics of the object as well. For example, the characteristic may comprise a club length, clubhead loft, club why angle, shaft weight, shaft stiffness, kick point of the shaft, or other characteristics of the object.

At block 2340, the system may sort the resulting list of objects from highest to lowest scores. For example, a first object may correspond with a first score and a second object corresponding with a second score may be placed above the first object when the second score is greater than the first score.

At block 2350, the system may filter the sorted list to generate a recommendations list. For example, a top "N" number of objects may be stored and the remaining objects may be deleted or removed from the list. The "N" number of objects that are filtered may be set as a value in a user profile.

At block 2360, the system may add additional items to the recommendation list. For example, the items may include a list of preset items (e.g., sponsored items, popular items, or other items that may not be identified during the initial recommendation phase). The list may be resorted with the additional items.

At block 2370, the system may provide a top "N" items from the recommendation list to the user interface. The items may be sorted. In some examples, the item may be provided with a link to initiate a purchase transaction for the item from a merchant.

Figure 24:
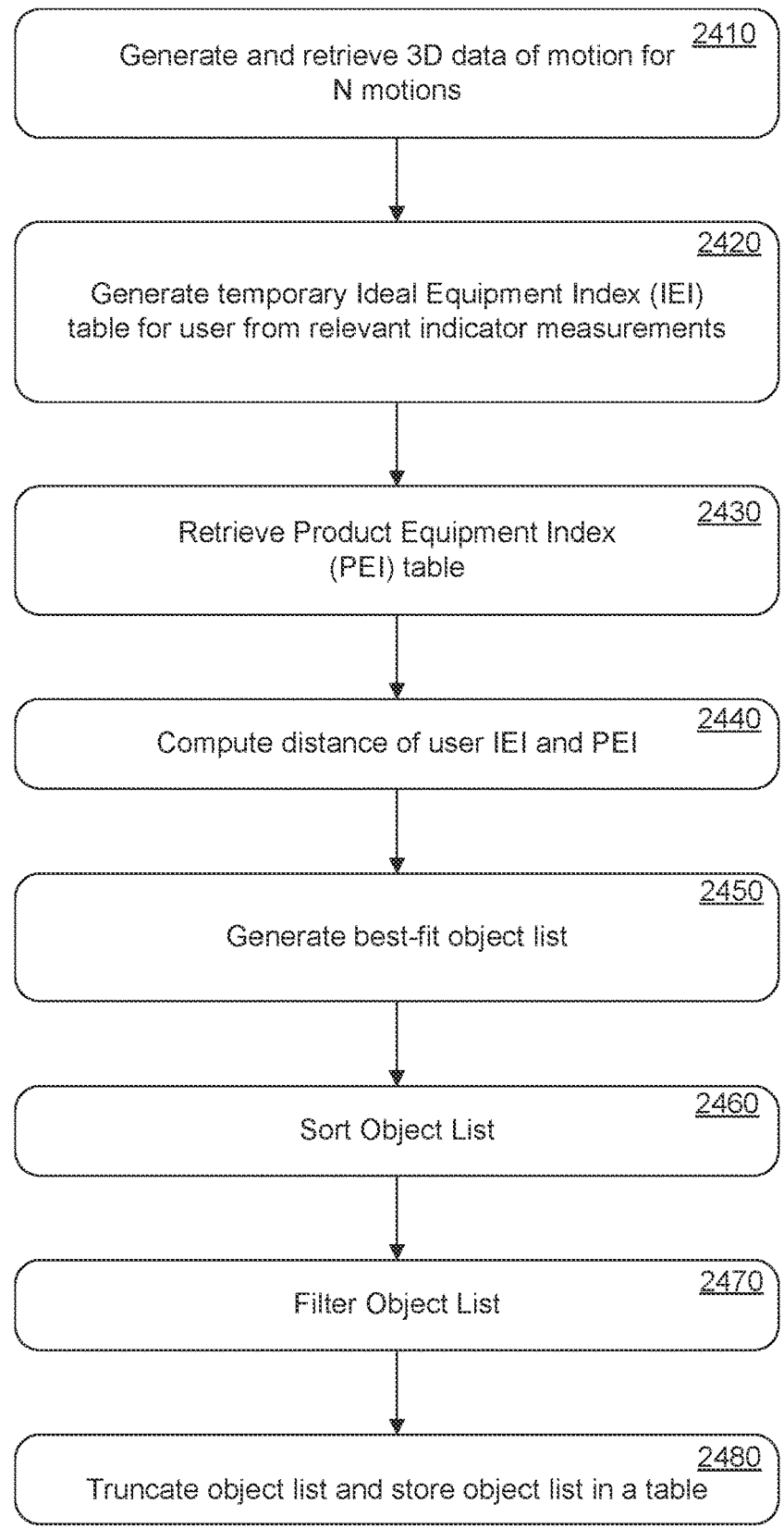
FIG. 24 provides an illustrative process for generating a best-fit equipment data table, in accordance with the embodiments disclosed herein.

FIG. 24 provides an illustrative process for generating a best-fit equipment data table, in accordance with the embodiments disclosed herein. The process illustrated herein may be performed by biomechanical analytics computer system 102 illustrated in FIG. 1 or FIG. 22, or other systems described herein. Illustrative data tables corresponding with the process illustrated in FIG. 24 are provided in FIG. 25.

At block 2410, the system may generate and retrieve 3D data of motions for "N" motions. The data table corresponding with the 3D data of motions is illustrated at 2510 of FIG. 25. For example, the 3D data may correspond with an indicator and the measurement may correspond with a numerical value (e.g., float value).

In this context, indicators are single values that may be selected from existing KP/trackers or computed from the data from KP/trackers. Indicators may be calculated to determine information about the performance of the user in that particular swing.

At block 2420, the system may generate a temporary ideal equipment index (IEI) table for the user from relevant indicator measurements. For example, the user's movement may be measured in accordance with each of the KPs/trackers along the 3D planes. The value for each KPs/trackers may be stored in a table, where the KPs/trackers may be correlated with the type of activity/movement. A temporary IEI table may be generated for the user from the KP/tracker measurements. In some examples, temporary IEI table may provide theoretical measurements that adjust the values from the user's recorded/analyzed movement in order to maximize the effectiveness of the movement (e.g., hit the ball farther or more accurately toward the hole/goal). The temporary IEI table may be generated by a trained machine learning (ML) model that provides adjusted each of the values of the KPs/trackers to improve the overall movement.

Figure 25:
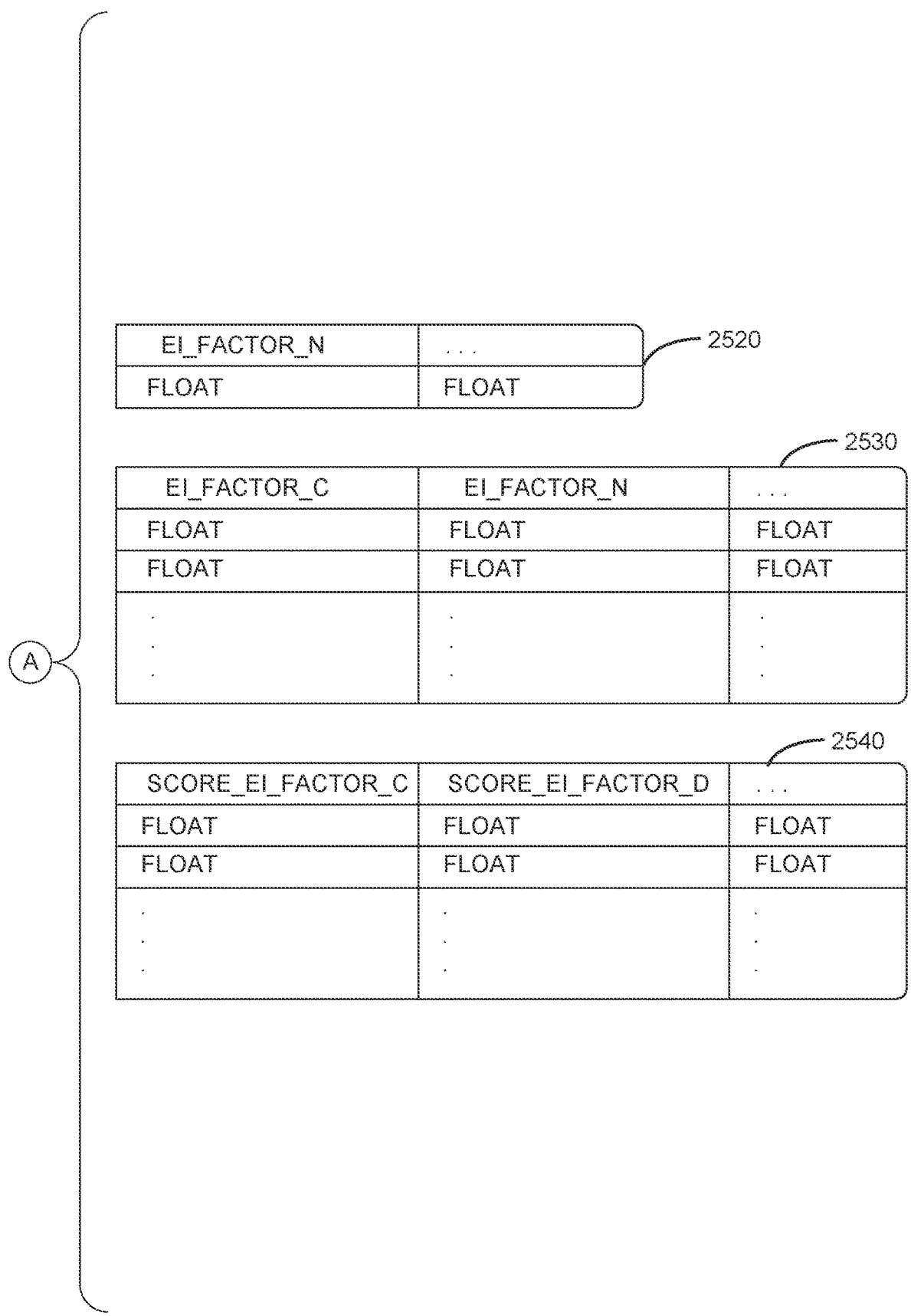
FIG. 25 provides illustrative data tables, in accordance with the embodiments disclosed herein.

The data table corresponding with the temporary ideal equipment index (IEI) table is illustrated at 2520 of FIG. 25. For example, the IEI table may include a set of characteristics and a corresponding numerical value (e.g., float value) for each characteristic.

At block 2430, the system may retrieve product equipment index (PEI) table. For example, once the temporary IEI table is determined, a PEI table may be retrieved. In some examples, the PEI table may identify the values of each potentially recommended object that are ideal for that object. The PEI table may be manually-generated. In some examples, the table may be generated and updated automatically using a trained machine learning (ML) model. For example, the ML model may connect outcomes (e.g., ball and club speed, distance, and other factors illustrated in the series of images) with indicators and optimized equipment values.

The data table corresponding with the product equipment index (PEI) table is illustrated at 2530 of FIG. 25. For example, the PEI table may include a list of objects. For each object, the object may correspond with a set of characteristics and a corresponding numerical value (e.g., float value) for each characteristic.

At block 2440, the system may compute the distance between the values in the lEl and PEI tables. The distance formula may include, for example, a machine learning (ML) model that calculates distance between cluster values for implementing unsupervised learning. The distance formula may be chosen based on the type of data that is stored in the tables. This may include a Hamming, Euclidean, and Manhattan distance formulas.

The data table corresponding with the distance between the values in the lEl and PEI tables is illustrated at 2540 of FIG. 25. For example, the table may include a list of objects. For each object, the object may correspond with a set of characteristics and a corresponding score provided as a numerical value (e.g., float value) for each characteristic.

At block 2450, the system may generate a best fit object list. For example, the distance values may be provided as input to a second machine learning (ML) model, where the second ML model applies weights to values corresponding with each KPs/trackers that may provide greater or lesser effect on the overall recommendation of the object. A list of recommended objects may be provided as output for the second ML model, where each object corresponds with a confidence score. The recommended objects may be sorted (block 2460) and filtered (block 2470) using the confidence score and provided to the user as recommended objects.

The data table corresponding with the best fit object list is illustrated at 2550 of FIG. 25. For example, the table may include a list of objects and scores. The score may be provided as a numerical value (e.g., float value).

At block 2480, the system may truncate the object list and stored in a table. For example, the list may be truncated in accordance with a predetermined value (e.g., top five objects based on the score).

Figure 26:
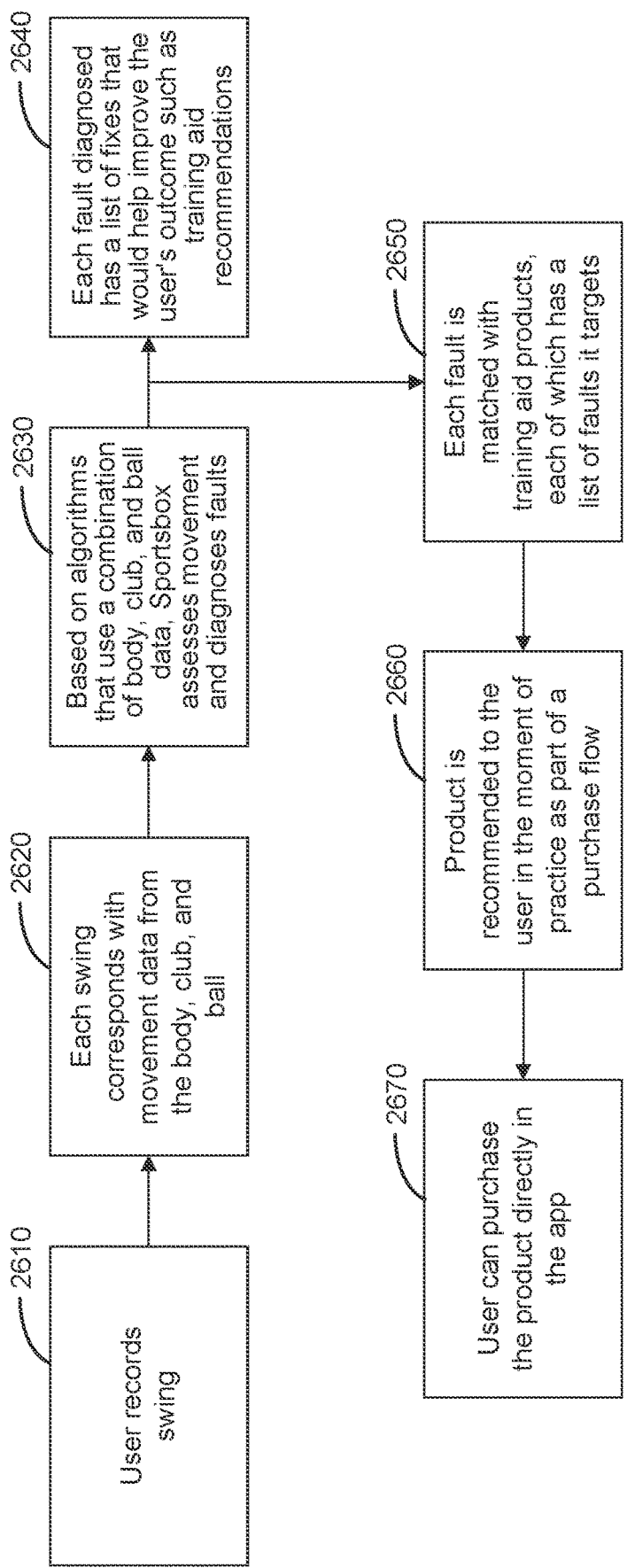
FIG. 26 provides an illustrative process for associating a movement flaw with an object and transaction, in accordance with the embodiments disclosed herein.

FIG. 26 provides an illustrative process for associating a movement flaw with an object and transaction, in accordance with the embodiments disclosed herein. The process illustrated herein may be performed by biomechanical analytics computer system 102 illustrated in FIG. 1 or FIG. 22, or other systems described herein.

In this illustration, the system may assess the movement flaws of the user and match the flaws with products that will best fit their needs for improvement. The process may support object fitting recommendations to help the user improve their movements for the activity (e.g., improving a swing and ball placement based on the outcome of the swing).

At block 2610, the system receives a series of images that were recorded by the user device while the user was performing the movement.

At block 2620, the system generates movement data of the particular movement. The movement data may correspond with the user's body and various objects in the image, including a club and a ball.

At block 2630, the system assesses a combination of body, club, and ball data to diagnose faults, such as swing flaws. The system can assess the data based on the algorithms disclosed herein (e.g., biometric analysis) to diagnose the faults.

At block 2640, the system provides a list of fixes for each diagnosed fault. The list of fixes may help improve the user's outcome. Examples of this may include recommendations associated with the list of fixes and information to address each diagnosed fault.

At block 2650, the system matches identified faults with a training aid object or service. For example, at least some of the training aid objects or services may correspond with a list of faults that the training aid object or service targets. The training aid objects can include training aid products for addressing the list of faults.

At block 2660, one or more recommendations are generated based on the training aid objects and/or services and displayed via a user interface of the user device. For example, training aid products can be recommended as part of a purchase flow provided through the system.

At block 2670, the system provides access to purchase the object in the software application. The user interface may include a display element that enables the user to select one or more of the recommended training aid objects and/or services displayed via the user interface and initiate a purchase from the interface. Data regarding user selections from the software application may be provided to an ecommerce application to facilitate a purchase of the selected items training aid objects and/or services.

Figure 27:
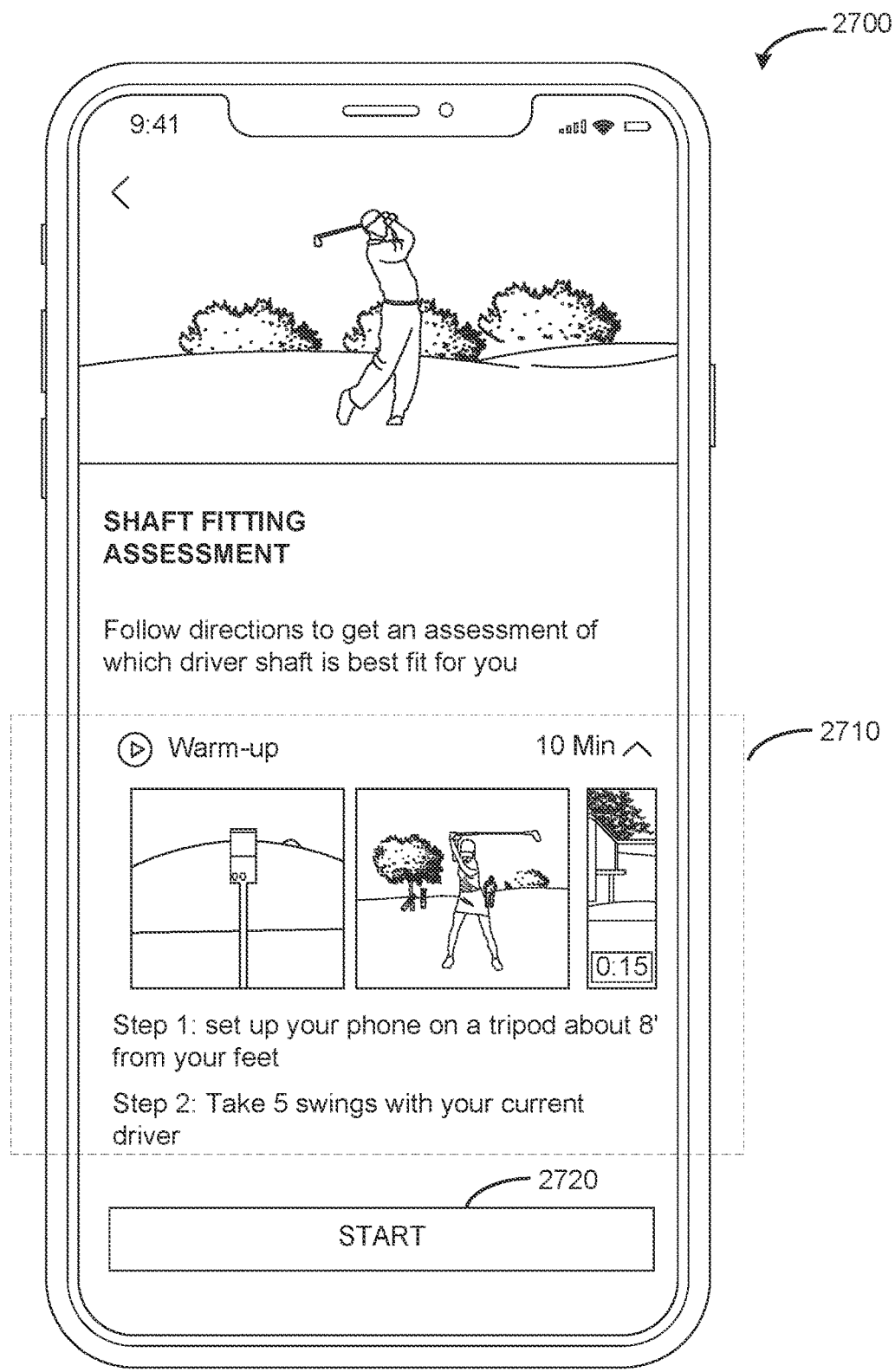
FIG. 27 provides an illustrative user interface for object fitting using quantitative biomechanical-based analysis, in accordance with the embodiments disclosed herein.

FIG. 27 provides an illustrative user interface 2700 for object fitting using quantitative biomechanical-based analysis, in accordance with the embodiments disclosed herein. In example 2700, the software application provides one or more user interface to guide the user to capture a series of images of their movement using a device to enable an assessment of one or more aspects of the object and its fit or suitability for the user (e.g., shaft fitting for a golf club or other fit or suitability for other objects).

User interface 2700 may include a user interface portion 2710 that includes a series of instructions to user which may include instructions for a warm up period (e.g., a certain number of swings or a time period for warm up). The instructions provided by user interface portion 2710 may include text, audio, videos and/or other types of instructions. The instructions may include a sequence of steps to help the user capture a series of images of the movement. User interface portion 2710, the system may display to the user how to implement the object fitting assessment. The object fitting assessment may be provided for a specific object or object type and a particular type of assessment. As one example, the user interface may display instructions for the user to follow to get an assessment of which driver shaft is a best fit for the user. In this case, the assessment type is fitting of a shaft, the object type is a golf club and the specific object is a driver. For example, the user interface may direct the user to set up their device on a tripod a certain distance (e.g., eight-feet or other distance) from the user's body. The user interface may also instruct the user to perform certain actions (e.g., a certain series of swings) with their current driver to enable the application to capture quantitative biomechanical as described herein.

A user interface element 2720 may be included to provide controls (e.g., a start button to start recording the series of images and/or other controls (e.g., to stop, pause, or otherwise control the recording and/or other data capture).

Figure 28:
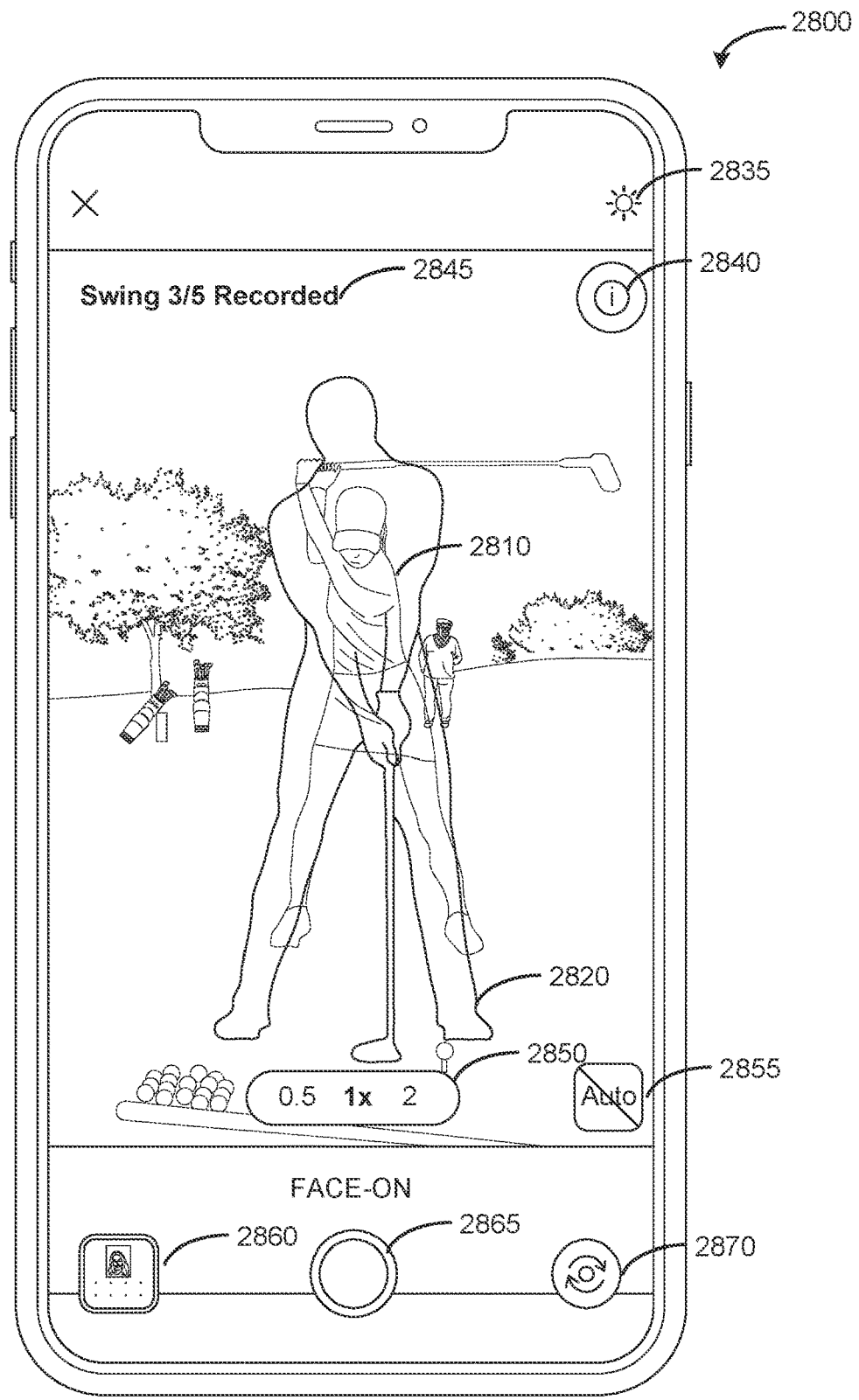
FIG. 28 provides an illustrative user interface for object fitting using quantitative biomechanical-based analysis, in accordance with the embodiments disclosed herein.

FIG. 28 provides an illustrative user interface 2800 for object fitting using quantitative biomechanical-based analysis, in accordance with the embodiments disclosed herein. In this example, a real-time or recorded image of the user 2810 may be overlaid or otherwise simultaneously displayed with an avatar 2820. Both the image of the user and the avatar may be performing the movement. The user interface may also provide a tool 2830 to record the movement of the user 2810 as the series of movements which can be stored as user data.

A user interface element may be included to provide controls to adjust brightness on a user device. When the element is selected/activated, the screen of the user device may increase the brightness to provide more light to the screen (e.g., for high light environments). When the element is deactivated, the screen of the user device may increase the contrast to darken the screen (e.g., for low light environments).

User interface element 2840 may be included to provide information on interacting with the user interface. The information may be pre-stored in a data store and provided at the user interface.

User interface element 2845 may be included to provide feedback associated with the series of recorded images. Each complete swing or movement that is recorded (e.g., between a backswing and finish) may be identified by the system and used to increment user interface element 2845.

User interface element 2850 may be included to provide controls to adjust a size of the real-time or recorded image of the user 2810 and the avatar 2820.

User interface element 2855 may be included to provide controls to automatically capture a series of images of the user. When the user interface receives an interaction with user interface element 2855, the automatic capture feature may be toggled (e.g., to turn the feature off or on).

User interface element 2860 may be included to provide access to user information associated with the user 2810. For example, the user information can include account information, previously recorded images, previously recorded swings or movements, and the like.

User interface element 2865 may be included to provide controls to capture an image or a series of images. When the element is selected/activated, the screen of the user device may increase the brightness to provide more light to the screen (e.g., for high light environments). When the element is deactivated, the screen of the user device may increase the contrast to darken the screen (e.g., for low light environments).

User interface element 2870 may be included to provide controls to switch between a set of cameras that are incorporated with the user device. When the element is selected/activated, the front-facing camera may be activated and when the element is selected/activated a second time, the front-facing camera may be deactivated and the back-facing camera may be activated, and vice versa.

Figure 29:
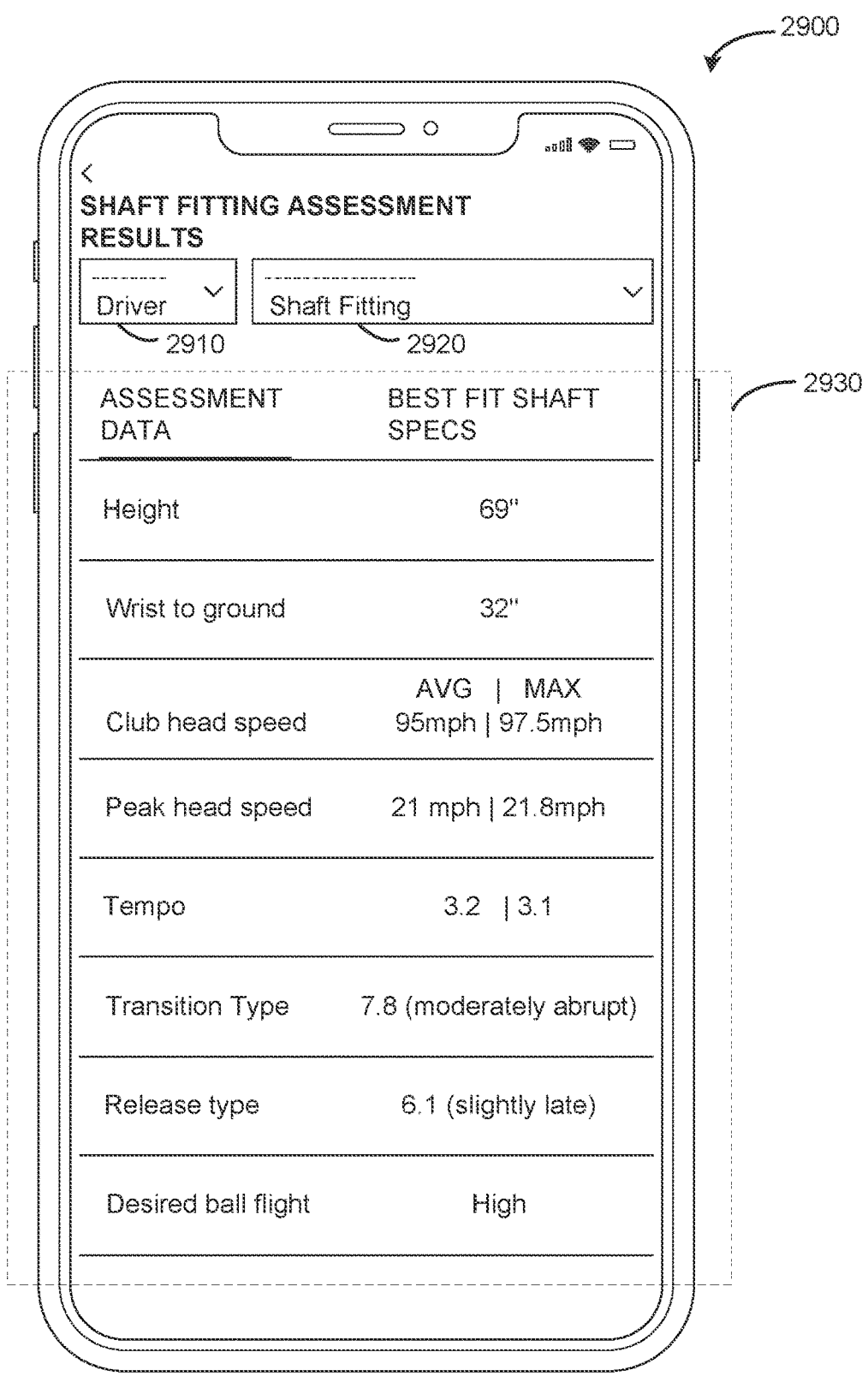
FIG. 29 provides an illustrative user interface for object fitting using quantitative biomechanical-based analysis, in accordance with the embodiments disclosed herein.

FIG. 29 provides an illustrative user interface 2900 for object fitting using quantitative biomechanical-based analysis, in accordance with the embodiments disclosed herein. In this example, user interface 2900 provides user interface elements in first display portion 2910, second display portion 2920, and third display portion 2930. For example, user interface elements may provide controls to select an object and provide information about the object.

For example, a first display portion 2910 may display the object type and/or specific object. As shown, the first display portion 2910 illustrates that the object is a driver (e.g., a specific golf club), but as shown by the arrow, other object types or specific objects can be selected for which results can be displayed. A second display portion 2920 may display an assessment type. As shown, the assessment type is shown as a shaft fitting but as shown by the arrow, other assessment types can be selected for which results can be displayed. A third display portion 2930 provides the object fitting results or assessment data associated with the selected object in the first display portion 2910 and the second display portion 2920. For example, the object fitting results may include recommended characteristic values of an ideal object, including height, wrist to ground measurement, clubhead speed (average or maximum), peak head speed (average or maximum), tempo (average or maximum), release type, and desired ball flight.

Figure 30:
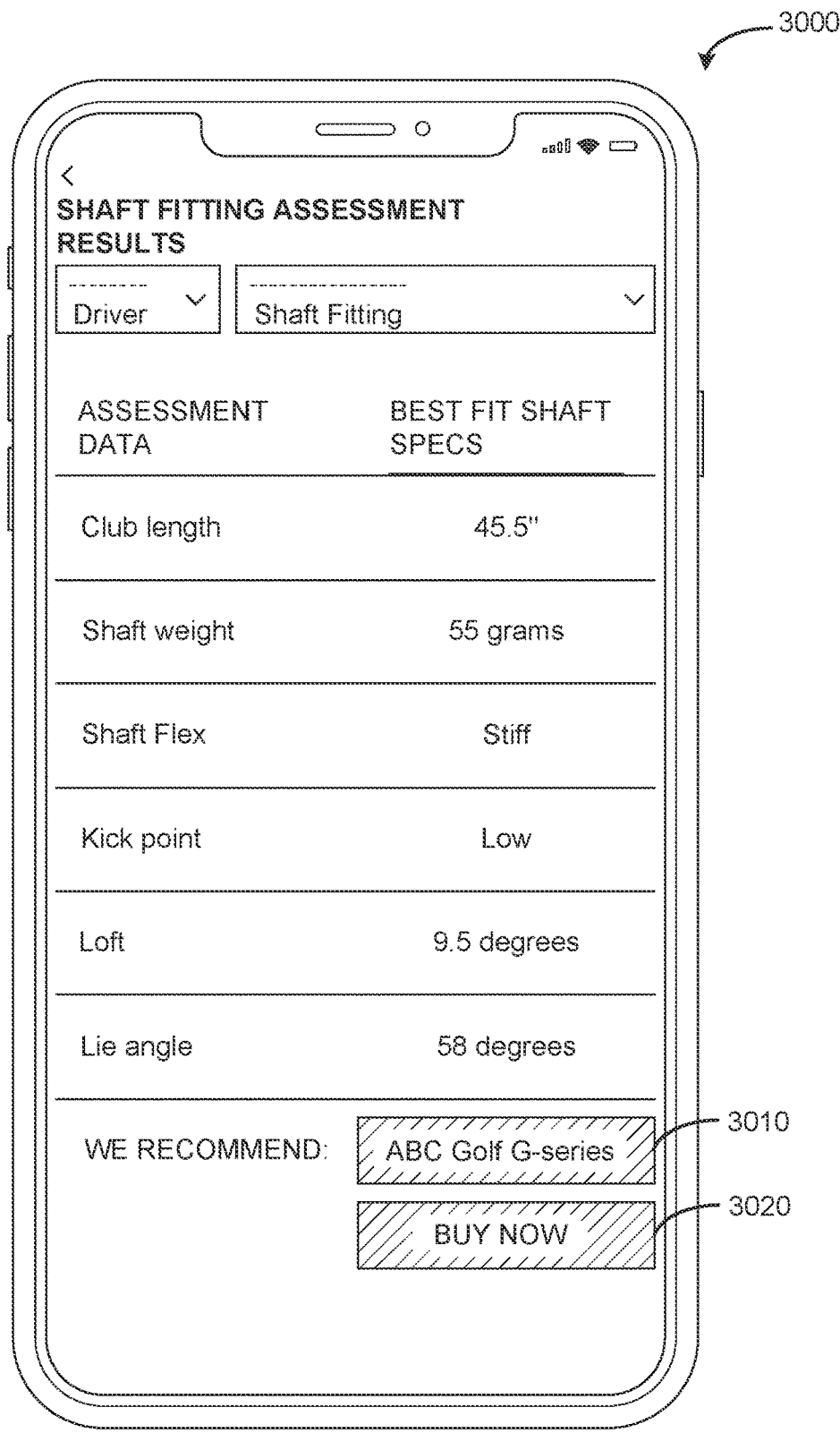
FIG. 30 provides an illustrative user interface for object fitting using quantitative biomechanical-based analysis, in accordance with the embodiments disclosed herein.

FIG. 30 provides an illustrative user interface 3000 for object fitting using quantitative biomechanical-based analysis, in accordance with the embodiments disclosed herein. In this example, a continuation of the object fitting results from FIG. 29 may be provided at the user interface. The object fitting results or assessment data may include additional recommended characteristic values of an ideal object, including club length, shaft weight, shaft flex, kick point, loft (in degrees), and lie angle. The user interface may also include first link 3010 to identify the object that most closely corresponds with the ideal object and second link 3020 to initiate a purchase transaction for the object that is offered by a merchant. In some examples, first link 3010 may direct the user to a detailed description page of the recommended object and second link 3020 may direct the user to a merchant's webpage to purchase the recommended object.

Figure 31:
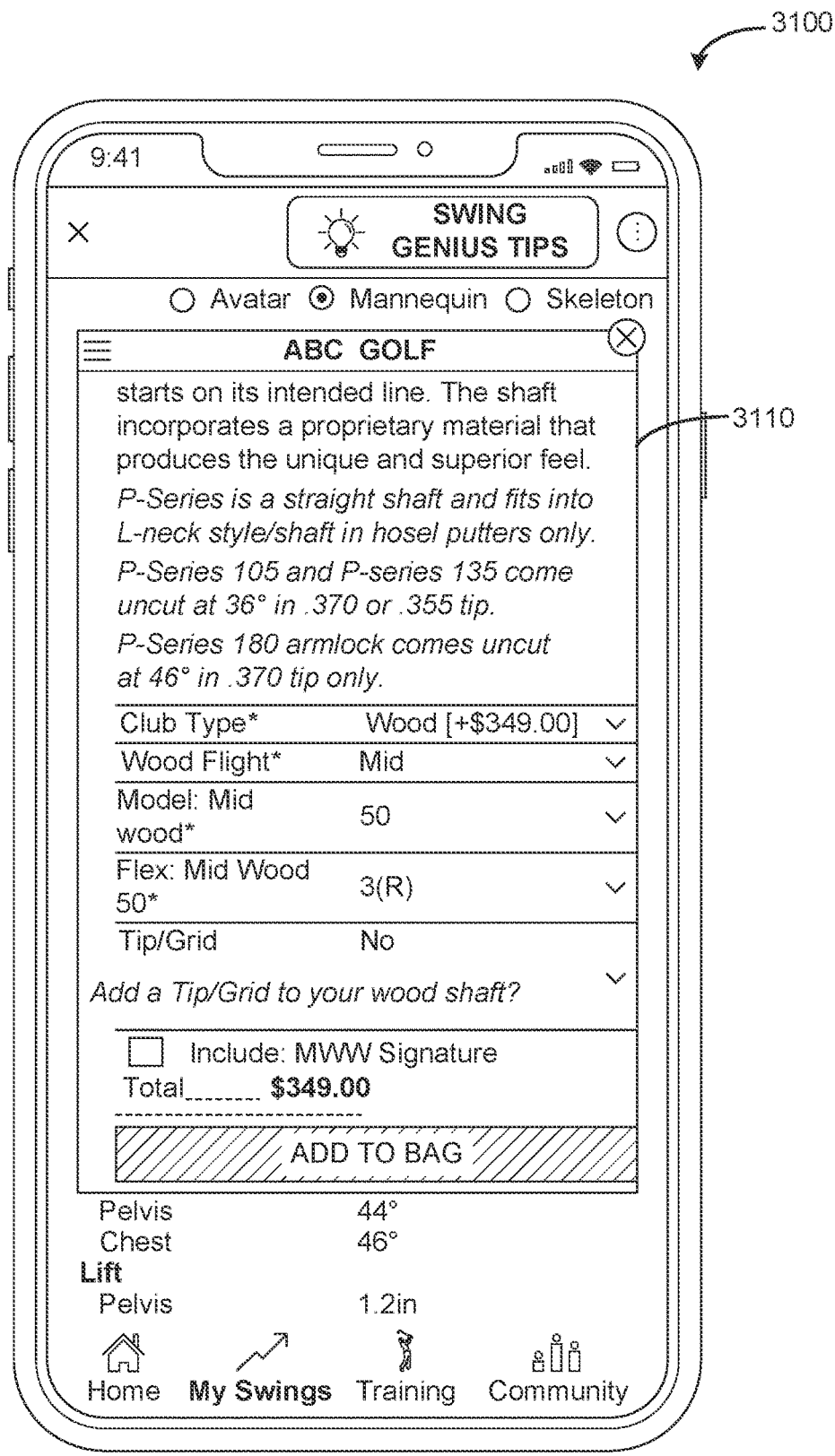
FIG. 31 provides an illustrative user interface for object fitting using quantitative biomechanical-based analysis, in accordance with the embodiments disclosed herein.

FIG. 31 provides an illustrative user interface 3100 for object fitting using quantitative biomechanical-based analysis, in accordance with the embodiments disclosed herein. In this example, the user interface displays a description 3110 from the merchant website of the recommended object. The description 3110 may be associated with the particular object recommended in response to the assessment. The description 3110 may be stored in a data store and accessed to provide to the user interface.

Object Fitting

Various aspects of the invention, as described above, can provide technological improvements to custom fitting for equipment (e.g., sports equipment such as golf clubs) for users. Under conventional approaches, custom fitting for equipment require users to personally visit a fitting professional for an in-person assessment. For example, in the case of a golf club fitting, a user must visit a golf shop and demonstrate a swing to a fitting professional. The fitting professional can make a qualitative assessment based on the demonstrated swing. In some cases, the fitting professional can rely on measurements from various tools, such as a launch monitor, to supplement the qualitative assessment. For example, a launch monitor can obtain measurements related to ball flight (e.g., launch angle, direction, spin rate, carry distance, hangtime) and point of impact (e.g., face angle, attack angle).

Conventional approaches to custom fitting for equipment have significant drawbacks. For example, as described above, an in-person assessment is qualitative and may not be accurate. Additionally, because custom fitting relies on in-person assessments, they cannot be meaningfully be facilitate through an online or mobile ecommerce experience. Furthermore, while some tools, such as the launch monitor described above, can provide measurements to supplement the in-person assessment, these tools generally fail to provide measurements related to the biomechanics of a user.

Thus, conventional approaches face various problems with regard to custom fitting for equipment.

Various aspects of the invention provide improved approaches to custom fitting for equipment that overcome the aforementioned and other problems. As an overview of these aspects, the invention provides for quantitative measurements of biomechanical properties of a user and custom fitting for equipment for the user based on the measurements. The measurements of the user can be measured using a recording (e.g., video) of the user, which the user can provide through an application (e.g., mobile app, web app). The application can run on a user device, such as user device 304 of FIG. 3. In the recording, the user can demonstrate one or more movements. The invention provides for biomechanical analysis of the user using the recording of the user. The biomechanical analysis can be performed by a system, such as biomechanical analytics computer system 102 of FIG. 1, biomechanical analytics computer system 306 of FIG. 3, and biomechanical analytics computer system 902 of FIG. 9. The biomechanical analysis can involve measurements of kinematic parameters, physical attributes, physical quantities for different portions of the one or more movements demonstrated by the user in the recording. Based on the biomechanical analysis, recommendations for custom fitted equipment can be provided with the user. The recommendations can include information from the biomechanical analysis to illustrate the bases for the recommendations. In some instances, a user can initiate a purchase transaction of the recommended object. For example, a mobile application, website, or other application for object recommendations may be accessible from a merchant website or other source. The user may perform the required activity (e.g., five swings or a threshold number of swings, pre-shot routine, practice swings, or other movement associated with the activity) and the user device may capture a series of images. Components of the swing can be correlated with an object recommended to optimize and improve the analyzed movement. A product detail page associated with the recommended object can be provided to initiate the purchase transaction. For example, the product detail page can provide a description of the recommended object and its characteristics, in addition to a price. The user can add the recommended object to an electronic shopping cart and provide account information to purchase the object. When the purchase transaction is submitted, a transfer of funds request from the user's account to the merchant's account may be issued, and the merchant's account can be instructed to initiate a shipping/fulfillment process to provide the recommended object to the user. A confirmation of the purchase transaction can be provided, and the shipping/fulfillment process can be initiated. The user can be redirected back to a user interface to capture additional images of the user's performance of the activity.

For example, a user interested in custom fitted golf clubs can use a mobile application to record videos of the user performing golf swings. Biomechanical analysis can be performed on the golf swings. In this example, the biomechanical analysis can involve determination of swing speed, transition style, and release style for the golf swings. Based on the biomechanical analysis, recommendations for golf equipment can be generated for the user. The recommendations can include, for example, golf clubs with golf club shafts fitted for the user. The recommendations can also include information related to why the golf club shafts were fitted for the user. For example, the recommendations can indicate that, based on the tempo of the golf swings, the transition type of the golf swings, and the release type of the golf swings, appropriate golf club shafts were fitted for the user. The user can purchase the golf clubs with the fitted golf shafts based on the recommendations. As illustrated in this example, the invention provides for custom fitting for equipment using quantitative measurements. By using quantitative measurements, the invention provides users with objective recommendations rather than subjective recommendations from a fitting professional. Further, the invention allows users to forgo in-person assessments and receive recommendations for equipment remotely.

It should be understood the invention is not limited to a mobile application. For example, features of the invention can be provided through a non-mobile computing platform, such as a desktop Windows platform. The computing platform can be communicatively coupled with one or more cameras through which the a user can record one or more performances or movements. A non-mobile computing platform may be useful in established settings, such as at a sporting goods store, where a fitter can help a customer with object fitting recommendations, a coaching facility, where a coach can help an athlete with biomechanical analysis and object fitting recommendations, or other enterprise facility. For example, a coach can use the application to perform a biomechanical analysis on performances or movements of athletes recorded at a coaching facility. The coach can use the application to determine whether the athletes need new equipment and provide object fitting recommendations for the new equipment. This allows the coach to provide more services to the athletes and avoid sending the athletes to a different location for the new equipment. Furthermore, through repeated coaching sessions and biomechanical analyses of the athletes, the application can indicate to the coach that the performances or movements of the athletes have changed, potentially warranting an object fitting recommendation for new equipment. In this way, the application not only provides advantages in object fitting, but can provide advantages as a supplement to techniques in coaching athletes.

In some instances, aspects of the inventions can be provided through an SDK and integrated with an existing system. For example, aspects of the inventions can be provided as a plug in to a launch monitor. Information captured by the launch monitor can be used as supplemental information for the biomechanical analysis.

One aspect of the invention relates to generating a recording (e.g., video) of a user for custom fitting for equipment based on biomechanical analysis. The recording can be generated through an application (e.g., mobile app, web app) by which the user can record one or more movements or access one or more previously recorded movements. The application can be run on a user device, such as the user device 304 of FIG. 3. The application can provide, through a user interface, a prompt to instruct the user on one or more movements to perform for custom fitting for equipment. For example, as illustrated in the user interface 2700 of FIG. 27, a user can be instructed to perform golf swings for custom fitting of a golf shaft. In this example, the user is instructed to perform five swings for purposes of the custom fitting. As another example, a user can be instructed to perform forehand swings and backhand swings with a tennis racket for custom fitting of a new tennis racket. The user can be instructed to perform a series of forehand swings and a series of backhand swings for recording. Based on videos of the series of forehand swings and videos of the series of backhand swings, recommendations for tennis rackets can be provided to the user.

The application can prompt the user to generate new recordings for biomechanical analysis. In some instances, the application can prompt the user to generate the new recordings based on a determination that one or more movements in a series of recorded movements are anomalous. For example, biomechanical analysis of the series of recorded movements can determine that measurements associated with one recorded movement is outside a threshold range from an average of the measurements for the series of recorded movements. The user can be prompted to generate new recordings of the same movements as the series of recorded movements to confirm the one recorded movement is anomalous. In some instances, the application can prompt the user at regular intervals to generate new recordings as updates for how the user performs a movement. Based on the new recordings and previous recordings, changes to the way a user performs a movement can be determined. Determination of these changes can cause a recommendation for a change in equipment to be generated for the user. For example, a user can be prompted to record videos of a series of golf swings for custom fitting of golf clubs. The user can be provided with recommendations for golf clubs based on biomechanical analysis of the series of golf swings in the videos. At a later time, the user can be prompted to record new videos of a series of golf swings. Biomechanical analysis can be performed on the new videos of the series of golf swings. In this example, changes to the user's golf swings can be determined based on the biomechanical analysis of the new videos and the previous videos. Based on the changes, recommendations for new golf clubs may be provided to the user.

In some instances, the application may generate a simulation of the user's swing and/or determine a difference in performance for one or more recommendations. For example, if the user selects a club fitting for a golf club driver, the system may use one or more prior swings of the user to make the recommendation using the user's existing driver. A simulation of the user's swing using one or more of the recommended drivers can be generated. Based on the simulation the application can generate a display of the user's swing (e.g., via a 3D avatar) with the existing driver and a display of the user's simulated swing (e.g., via a 3D avatar) with the recommended driver. These displays may be presented simultaneously via a user interface so the user can see the difference(s). Additionally, performance measuring equipment may be used to assess that actual result of a user swinging an existing golf club and generate a simulation of the user's performance to assess that actual result of a user swinging the recommended golf club to project the performance increase for the user.

One aspect of the invention relates to performing biomechanical analysis of observed actions in a recording of a user. In some instances, the biomechanical analysis can be performed by a system, such as biomechanical analytics computer system 102 of FIG. 1, biomechanical analytics computer system 306 of FIG. 3, and biomechanical analytics computer system 902 of FIG. 9. In some instances, the biomechanical analysis or functions that enable the biomechanical analysis can be performed by a user device, such as the user device 304 of FIG. 3. In general, the biomechanical analysis involves measurement of kinematic parameters for one or more portions of the one or more movements. The kinematic parameters can relate to, for example, position, velocity, acceleration, speed, momentum, angle, time, and other quantitative parameters of various components, such as body parts, equipment, and objects associated with the one or more movements. For example, in the golf domain, a biomechanical analysis can involve measurement of back swing time, down swing time, total swing time, wrist speed, wrist angle, and chest turn speed. Biomechanical analysis in other domains can involve different measurements. For example, in the tennis domain, a biomechanical analysis can involve measurement of forehand back swing time, forehand forward swing time, backhand back swing time, backhand forward swing time, forehand wrist speed, backhand wrist speed, forehand wrist angle, backhand wrist angle, forehand swing angle, and backhand swing angle. Based on the measured kinematic parameters, a biomechanical analysis can determine one or more styles associated with the one or more movements. The one or more styles can be associated with ranges associated with variations of how the one or more movements can be performed. Numerical values that represent the variation in the one or more styles to which the one or more movements most closely correspond can be determined as part of the biomechanical analysis. For example, in the golf domain, a biomechanical analysis can involve a determination of numerical values for transition style and swing style to quantitatively measure how closely a golf swing corresponds with variations in golf swings.

One aspect of the invention relates to custom fitting of equipment based on biomechanical analysis of a user. The custom fitting can be based, at least in part, on correlations between values determined for kinematic parameters, representations of styles, or other determinations from the biomechanical analysis and values for equipment parameters. The correlations can indicate extents to which the values determined from the biomechanical analysis are related (e.g., linearly related) to values for equipment parameters. In some instances, a value for an equipment parameter can be correlated to a value determined from a biomechanical analysis. A value for an equipment parameter can be positively correlated to a value determined from a biomechanical analysis so that as the value determined from the biomechanical analysis increases or decreases, the value for the equipment parameter likewise increases or decreases. A value for an equipment parameter can be negatively correlated to a value determined from a biomechanical analysis so that as the value determined from the biomechanical analysis increases or decreases, the value for the equipment parameter decreases or increases. For example, in the golf domain, a value for maximum club speed can be correlated with a value for flex. In this example, the correlation indicates that a user with a faster swing benefits from a stiffer golf shaft. In some instances, a value for an equipment parameter can be correlated with multiple values determined from a biomechanical analysis. The value for the equipment parameter can, for example, be determined based on a function of the multiple values determined from the biomechanical analysis. In some instances, the custom fitting can be based on a predetermined set of relationship between swing pattern components and golf club parameters. For example the swing pattern components may include various swing motion data such as swing speed, transition style, and release style (among others). At least some of the swing pattern components may be components of the swing prior to impact with a golf ball. The swing patterns components may be matched with golf club parameters such as shaft weight, shaft flex and kick point. Other swing pattern components and/or golf club (or component) parameters may be used. The use of quantified swing motion data provides a more reliable basis to perform object fitting and leads to more accurate and scientific results rather than guess work.

Swing data may be processed to make a quantitative biomechanical-based analysis of observed actions and a predetermined set of relationships between swing pattern components, e.g., various swing motion data such as swing speed, transition style, and release style (among others) with the golf club (or other object) parameters. The swing patterns components may be matched with golf club (or component) parameters such as shaft weight, shaft flex and kick point of a set of objects available (golf clubs). Based on the analysis, one or more of the objects can be recommended to the user. Through an application or a website, the user can select one or more of the recommended objects and the application or the website can display an option for the user to purchase the one or more selected objects. Based on at least the product identifier of the selected objects, the system can initiate a transaction for those objects to facilitate purchase of the objects.

The custom fitting can be based, at least in part, on machine learning methodologies. One aspect of the invention relates to training a machine learning model (e.g., neural network, multilayer feed forward network) to generate values for equipment parameters based on values determined from a biomechanical analysis of a user. The training data can be based on users performing movements and biomechanical analyses of those movements. An instance of training data can include data, such as kinematic parameters, styles, and other values, from a biomechanical analysis of a user performing a movement and data, such as equipment parameters, of equipment recommended to the user. For example, an instance of positive training data can include data from the biomechanical analysis and data of equipment that allowed the user to demonstrate improvements in a subsequent biomechanical analysis or that the user indicated to be better to use (e.g., more comfortable, easier to use). An instance of negative training data can include data from the biomechanical analysis and data of equipment that caused the user to demonstrate declines in in a subsequent biomechanical analysis or that the user indicated to be worse to use (e.g., less comfortable, harder to use). As another example, instances of training data can be based on biomechanical analyses of a user performing a movement with different equipment (e.g., different golf clubs). The user can identify which equipment is preferable (e.g., more comfortable, easier to use) over other equipment, or rank the equipment in order of preference. The machine learning model can be trained based on the instances of training data to generate a recommendation for the equipment the user identified as most preferable. For example, in the golf domain, training data can be obtained from a number of golfers performing golf swings for biometric analysis. The golfers can be provided with a set of different golf clubs and perform a set number of golf swings with each golf club. The golfers can indicate which golf clubs were their favorite. Data from biometric analyses of the golfers performing golf swings with golf clubs other than those indicated to be favorites can be provided to a machine learning model. The machine learning model can be trained to recommend a golf club with equipment parameters of the golf clubs indicated to be favorites based on the data from the biometric analyses. In training, the recommendations, or values for equipment parameters, generated by the machine learning model can be evaluated for accuracy using various approaches, such as mean absolute error (MAE) or root mean squared error (RMSE). For example, a mean absolute error can be measured between the values for equipment parameters generated by the machine learning model and the values for equipment parameters of an equipment a user identified as preferable. The machine learning model can be trained to reduce the mean absolute error and increase accuracy.

In some cases, machine learning models can be trained to account for variations in user skill levels (e.g., handicaps). Users performing movements at different skill levels may exhibit different levels of variability in the performance of the movements. Accordingly, the invention provides for training different models corresponding with different skill levels. The training can include indicating, in instances of training data, a skill level associated with the user. A model for a skill level can be trained using instances of training data associated with users of the skill level for which the model is trained. For example, in the golf domain, a model for lower handicap users (e.g., 0-4 handicap, 0-8 handicap) can be trained based on instance of training data associated with lower handicap users.

One aspect of the invention relates to using a trained machine learning model to generate recommendations for custom fitted equipment for a user. Values determined from a biometric analysis of movements performed by a user can be provided to the machine learning model. The machine learning model can generate values for equipment parameters based on the values determined from the biometric analysis. Recommendations for equipment can be generated based on the values for equipment parameters.

In some instances, recommended objects are correlated to a user's movements by computing the distance between an ideal equipment index (IEI) and a product equipment index (PEI). For example, the user's movement may be measured in accordance with each of the KPs/trackers along the 3D planes. The value for each KPs/trackers may be stored in a table, where the KPs/trackers may be correlated with the type of activity/movement. A temporary IEI table may be generated for the user from the KP/tracker measurements. In some examples, temporary IEI table may provide theoretical measurements that adjust the values from the user's recorded/analyzed movement in order to maximize the effectiveness of the movement (e.g., hit the ball farther or more accurately toward the hole/goal). The temporary IEI table may be generated by a trained machine learning model that provides adjusted each of the values of the KPs/trackers to improve the overall movement. Once the temporary IEI table is determined, a PEI table may be retrieved. In some examples, the PEI table may identify the values of each potentially recommended object that are ideal for that object. The PEI table may be manually-generated. The system may compute the distance values between the values in the IEI table and the PEI table values for the potentially recommended objects. The distance values may be provided as input to a second machine learning model, where the second ML model applies weights to values corresponding with each KPs/trackers that may provide greater or lesser effect on the overall recommendation of the object. A list of recommended objects may be provided as output for the second ML model, where each object corresponds with a confidence score. The recommended objects may be sorted/filtered using the confidence score and provided to the user as recommended objects. The IEI table and the PEI table can be generated based on various equipment databases. In this way, the recommended objects can be adapted to an available set of equipment, such as those that are currently in stock at a sporting goods store.

One aspect of the invention relates to providing recommendations for custom fitted equipment to a user. A recommendation can be provided to a user device, such as the user device 304 of FIG. 3, to a user. The recommendation can include measurements from a biometric analysis of the user. For example, user interface 2900 of FIG. 29 illustrates example measurements of a biometric analysis that is provided to a user seeking custom fitted golf clubs. The example measurements in this example are provided as results of a shaft fitting assessment (e.g., the biometric analysis). The recommendation can include values for equipment parameters generated based on the biometric analysis. For example, user interface 3000 of FIG. 30 illustrates example values for equipment parameters provided to a user seeking custom fitted golf clubs. As illustrated in these examples, providing the measurements from the biometric analysis and the values for equipment parameters generated based on the biometric analysis provides the user with an objective basis for the recommendation provided to the user. The recommendation can facilitate purchase of equipment recommended to the user. For example, user interface 3000 of FIG. 30 illustrates a link 3020 to initiate a purchase transaction.

In some aspects of the invention, recommendations for custom fitted equipment to a user can be based on different sets of equipment or objects. For example, if a first retailer, manufacturer or other entity offers a certain set of golf clubs (or other objects) the set of objects available (golf clubs), an object identifier (model name and version, SKU or other identifier) along with the object parameters (e.g., golf club parameters such as shaft weight, shaft flex and kick point) for the objects can be stored for that entity. A person may visit an online website or otherwise remotely access the system associated with that entity. The website may present a webpage with an option for the user to browse the objects available via that entity. The website may display one or more options for the user to obtain a remote custom fitting. Upon selecting that option, the user may be prompted to download an application to a phone or other mobile device if the user does not already have the applications. The website or application may prompt the user to perform one or more swings which can be captured by the application as described herein.

In some cases, a user can search for objects and make certain selections to narrow down the types of objects/components in which the user is interested. For example, the user can select a golf club driver or just a golf club shaft. Based on the user selection(s), swing data, including the swing pattern components and the associated parameters of the objects relevant to the user selection(s), can be processed to provide object fitting recommendations from the set of objects available from the entity and which meet the user's selection(s).

The various aspects of the invention provides for guidance of a user through biometric analysis, recommendation for equipment, and facilitation of purchases for recommended equipment. For example, a user can obtain an assessment of movements, such as golf swings, based on biometric analysis. The assessment can be provided based on recordings of the movements, which can be captured through a mobile application, a web application, or other application or system. The recordings can be converted to 3D data to measure, for example, sway, rotation, and other 3D parameters for the assessment. In some instances, the assessment can utilize additional data, such as from a launch monitor, in addition to the 3D data. In some instances, the assessment can be performed as a separate process and recommendation for equipment can be provided based on a data file of the assessment. The recommendation for equipment can be generated based on the assessment, including the 3D data, and a database of available objects (e.g., SKUs). In this example, the 3D data can correlate with characteristics (e.g., flex, kick point, etc.) of the available objects in the database to determine which of the available objects are to be recommended to the user. This recommendation can, for example, be provided through a mobile application, a web application, or other application or system associated with a retailer with the available objects being the items the retailer has in stock or available for sale. The recommendation for equipment can be provided with options to purchase recommended equipment. In this example, the recommendation for equipment can include one or more buy buttons for the recommended equipment. The user can click or select the one or more buy buttons to facilitate a purchase process for the selected equipment. As illustrated in this example, the invention provides for quantitative analysis of a user's movements without a specialized facility or a professional. Furthermore, the quantitative analysis is based in science and can provide improved assessment over a less objective analysis. As such, users can rely on recommendations generated based on the quantitative analysis to purchase equipment that has been vetted through an objective and scientific process.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the shaft a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system configured for performing object fitting recommendations in connection with an online system, the system comprising:
    one or more hardware processors; and
    a memory configured for storing instructions, which when executed, cause the system to:
        receive, from a user device, a sequence of 2D images of a user's movement using a first object;
        analyze the sequence of 2D images to generate 3D data of the user's movement;
        perform a quantitative, biomechanical-based analysis of the user's movement from the 3D data to generate biomechanical values;
        compare the biomechanical values to target values and known biomechanical capabilities to determine a recommendation for a second object; and
        display information about the second object on a graphical user interface with an actionable display element from which the second object can be selected for purchase;
    wherein the instructions further cause the system to assess an actual result of the user's movement using the first object and generate a simulation of the user's movement using the second object.

2. The system of claim 1, wherein the instructions further cause the system to:
    generate a user interface for object fitting using quantitative biomechanical-based analysis; and
    provide instructions at the user interface to guide a user to capture a series of images of the user's movement using an image capture device.

3. The system of claim 1, wherein the instructions further cause the system to: correlate objects to the user's movements by computing a distance between an ideal equipment index (IEI) and a product equipment index (PEI).

4. The system of claim 1, wherein the online system comprises an online ecommerce server and a database of objects available via the online ecommerce server, wherein the instructions further cause the system to select the second object from a set of available objects.

5. The system of claim 1, wherein the user's movement comprises a golf swing and the first object is a golf club and the instructions further cause the system to: prompt the user to remotely record via a user device and remotely transmit to an online server, one or more golf swings as the sequence of 2D images.

6. The system of claim 1, wherein the instructions further cause the system to add the second object to an electronic shopping cart upon a user selecting the actionable display element associated with the second object.

7. The system of claim 1, wherein the instructions further cause the system to determine a recommendation for specific components for the second object.

8. The system of claim 7, wherein the second object comprises a golf club and the specific components comprise a shaft flex and a shaft kick point.

9. The system of claim 7, wherein the second object comprises a golf club and the specific components comprise a shaft flex, a shaft weight and a shaft kick point.

10. The system of claim 7, wherein the second object comprises a golf club and the specific components comprise a shaft flex and a shaft weight.

11. The system of claim 7, wherein the second object comprises a golf club and the specific components comprise a shaft weight and a shaft kick point.

12. The system of claim 1, wherein the instructions further cause the system to make a quantitative biomechanical-based analysis of observed actions and a predetermined set of relationships between swing pattern components and object parameters.

13. The system of claim 12, wherein the swing pattern components comprise golf swing speed, transition style, and/or release style.

14. The system of claim 12, wherein the object parameters comprise one or more of a golf club shaft weight, shaft flex or kick point.

15. The system of claim 12, wherein the swing pattern components comprise golf swing speed, transition style, and/or release style and the object parameters comprise one or more of a golf club shaft weight, shaft flex or kick point.

16. The system of claim 1, wherein the user's movement is a golf swing and the first object is a first golf club and the second object is a second golf club, the system further comprising a database of historical data that correlates golf swings and performance associated with the golf swings, including a resulting distance and/or accuracy of the golf swings.

17. The system of claim 16, wherein the instructions further cause the system to provide a recommendation based on predetermined relationships of identified golf club parameters and quantitative measurements of a user's performance during different portions of the user's golf swing prior to impact of a golf club.

18. The system of claim 1, wherein the instructions further cause the system to assess actual results of a user swinging a first golf club and to recommended a second golf club based on a projected performance of the user swinging the second golf club.

19. The system of claim 1, wherein the instructions further cause the system to provide a recommendation based on predetermined relationships of identified object parameters and quantitative measurements of a user's performance during different portions of the user's movement during performance of an activity.

* * * * *